(12) United States Patent
Frey et al.

(10) Patent No.: US 6,505,210 B1
(45) Date of Patent: Jan. 7, 2003

(54) FEDERATION OF NAMING CONTEXTS ACROSS MULTIPLE AND/OR DIVERSE UNDERLYING DIRECTORY TECHNOLOGIES

(75) Inventors: Jeffrey A. Frey, New Paltz, NY (US); Timothy J. Hahn, Vestal, NY (US); Theodore R. Maeurer, Poughkeepsie, NY (US); Gary S. Puchkoff, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/332,301

(22) Filed: Jun. 14, 1999

(51) Int. Cl.[7] .............................................. G06F 12/00
(52) U.S. Cl. .................... 707/103 R; 709/310; 709/320
(58) Field of Search ............... 707/1–206; 709/100–332

(56) References Cited

U.S. PATENT DOCUMENTS

| | | | | |
|---|---|---|---|---|
| 5,317,739 A | | 5/1994 | Elko et al. | 395/650 |
| 5,561,809 A | | 10/1996 | Elko et al. | 395/800 |
| 5,706,432 A | | 1/1998 | Elko et al. | 395/200.08 |
| 5,752,027 A | * | 5/1998 | Familiar | 707/100 |

OTHER PUBLICATIONS

Smith et al., "Conciliation: The Adaptation of Independently Developed Components", 1998.*
http://www.cse.ogi.edu/~/hicran/Conciliation.pdf, as cached in www.google.com.*
http://citeseer.nj.nec.com/smith98conciliation.html.*
http://www.tssp.co.uk/Literature/Supplements/CORBA.htm.*
http://sting.web.cern.ch/sting/OLE–CORB A.html.*
"Support for Enterprise JavaBeans in Component Broker," C.F. Codella, D.N. Dillenberger, D.F. Ferguson, R.D. Jackson, T.A. Mikalsen and I. Silva–Lepe, IBM Systems Journal, vol. 37, No. 4, http://www.research.ibm.com/journal.sj/374/codella.html., Jul. 1, 1998.
"Schema for Representing CORBA Object References in an LDAP Directory," V. Ryan, R. Lee, S. Seligman, Sun Microsystems, Inc., Aug. 25, 1999, http://search.ietf.org/internet–drafts/draft–ryan–corba–schema–02.txt.
"CORBA A Guide To Common Object Request Broker Architecture," Ron Ben–Natan, McGraw Hill, 1995.

* cited by examiner

Primary Examiner—David Jung
(74) Attorney, Agent, or Firm—Lily Neff, Esq.; Andrew J. Wojnicki, Jr., Esq.; Heslin Rothenberg Farley & Mesiti P.C.

(57) ABSTRACT

Resolution of a compound name of an object may indicate that a disjunction exists within the object name. This disjunction represents a foreign binding indicating that the resolve cannot be completed on one system or an alias name of the object. When a disjunction in the object name is identified, the object associated with the disjunction is obtained. Thereafter, a resolve operation on that object is performed using at least a portion of the object name.

33 Claims, 29 Drawing Sheets

FEDERATION OF NAMING CONTEXTS ACROSS MULTIPLE AND/OR DIVERSE UNDERLYING DIRECTORY TECHNOLOGIES

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"ACCESSING LOCAL OBJECTS USING LOCAL ACCESS PROXIES," by Frey et al., Ser. No. 09/332,818 (Docket No. PO9-99-041);

"EMPLOYING MANAGEMENT POLICIES TO MANAGE INSTANCES OF OBJECTS," by Frey et al., Ser. No. 09/332,303 (Docket No. PO9-99-035);

"DELEGATING INSTANCE MANAGEMENT FUNCTIONS TO UNDERLYING RESOURCE MANAGERS," by Frey et al., Ser. No. 09/332,706 (Docket No. PO9-98192);

"PROVIDING COMPOSED CONTAINERS AND DATA OBJECTS TO SUPPORT MULTIPLE RESOURCES," by Frey et al., Ser. No. 09/332,703 (Docket No. PO9-99042);

"FACILITATING WORKLOAD MANAGEMENT BY USING A LOCATION FORWARDING CAPABILITY," by Frey et al., Ser. No. 09/332,302 (Docket No. PO9-99-043);

"ENSURING A GIVEN TRANSACTIONAL UNIT OF WORK ARRIVES AT AN APPROPRIATE SERVER INSTANCE," by Clark et al., Ser. No. 09/330,796 (Docket No. PO9-99-044);

"PERFORMING NAME RESOLUTION OF COMPOUND NAMES WITHIN A SINGLE CALL TO A RESOLVE METHOD," by Frey et al., Ser. No. 09/332,305 (Docket No. PO9-99-037);

"MAPPING OF NAME SPACE OBJECT IDENTITIES TO DISTINGUISHED NAMES," by Frey et al., Ser. No. 09/332,704 (Docket No. PO9-99-039);

"A TRANSACTIONAL NAME SERVICE," by Frey et al., Ser. No. 09/333,058 (Docket No. PO9-99-040);

"REGISTRATION OF OBJECT FACTORIES UNDER MULTIPLE INTERFACE NAMES," by Frey et al., Ser. No. 09/332,462 (Docket No. PO9-99-036); and "SEPARATING PRIVILEGED FUNCTIONS FROM NON-PRIVILEGED FUNCTIONS IN A SERVER INSTANCE," by Aman et al., Ser. No. 09/333,059 (Docket No. PO9-99-045).

TECHNICAL FIELD

This invention relates, in general, to object-oriented computing environments and, in particular, to providing a distributed, object-oriented computing environment that is reliable, secure, transactional and workload managed.

BACKGROUND ART

Object-oriented technology continues to be an increasingly important tool for use in building portable application code that can be readily used and reused. A basic premise of object-oriented technology is the use of objects. An object is a run-time entity with a specific set of instance methods and variables associated therewith.

In an effort to enhance the usability, portability, reliability and interoperability of objects, certain standards have been created. One group responsible for such standardization is referred to as the Object Management Group (OMG), which is a consortium of different corporations, businesses and users interested in promoting object-oriented technology.

The Object Management Group has taken great steps in its standardization efforts. For example, the OMG is responsible for the creation of an object request broker (ORB), which is used to provide communications between clients and servers of a computing environment. The ORB is based upon an architecture touted by OMG and referred to as the Common Object Request Broker Architecture (CORBA).

One goal of the OMG is to provide distributed object-oriented applications and systems that coincide with the needs and desires of the ever-changing computing industry. This goal includes supporting multi-vendor, global heterogeneous networks.

Although efforts have been made to meet the goals of the Object Management Group, and of the object-oriented industry as a whole, further enhancements are still needed. For example, a need exists for a distributed object-oriented computing environment that is reliable, secure, transactional and workload managed.

SUMMARY OF THE INVENTION

The shortcomings of the prior art are overcome and additional advantages are provided through the provision of a method of resolving names of objects of a computing environment. The method includes, for instance, identifying a disjunction in an object name to be resolved; obtaining an object associated with the disjunction; and performing a resolve operation on the object using at least a portion of the object name.

In one example, the disjunction represents at least one of a foreign binding and an alias name of the object.

In a further example, the resolve operation is performed on one system of the computing environment and the identifying the disjunction is performed on another system of the computing environment. Further, the one system may have a different implementation of a CORBA architecture than the other system.

In another aspect of the present invention, a system of resolving names of objects of a computing environment is provided. The system includes, for example, means for identifying a disjunction in an object name to be resolved; means for obtaining an object associated with the disjunction; and means for performing a resolve operation on the object using at least a portion of the object name.

In yet a further aspect of the present invention, a system of resolving names of objects of a computing environment is provided. The system includes, for instance, at least one computing system of the computing environment adapted to identify a disjunction in an object name to be resolved, to obtain an object associated with the disjunction, and to perform a resolve operation on the object using at least a portion of the object name.

In yet another aspect of the present invention, an article of manufacture including at least one computer usable medium having computer readable program code means embodied therein for causing the resolving of names of objects of a computing environment is provided. The computer readable program code means in the article of manufacture includes, for example, computer readable program code means for causing a computer to identify a disjunction in an object name to be resolved; computer readable program code means for causing a computer to obtain an object associated with the disjunction; and computer readable program code means for causing a computer to perform a resolve operation on the object using at least a portion of the object name.

The present invention advantageously enables the traversing of foreign junctions in, for instance, a name space in a manner that does not compromise performance and is not dependent on the knowledge of the underlying directory technology used.

Additionally, the number of hops required to resolve names that include junctions to foreign naming contexts or to aliases is minimized.

Additional features and advantages are realized through the techniques of the present invention. Other embodiments and aspects of the invention are described in detail herein and are considered a part of the claimed invention

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with the principles of the present invention, an infrastructure is provided that supports an object-oriented, component-based programming model and provides for a computing environment that is distributed, reliable, secure, transactional, and workload managed.

Figure 1:
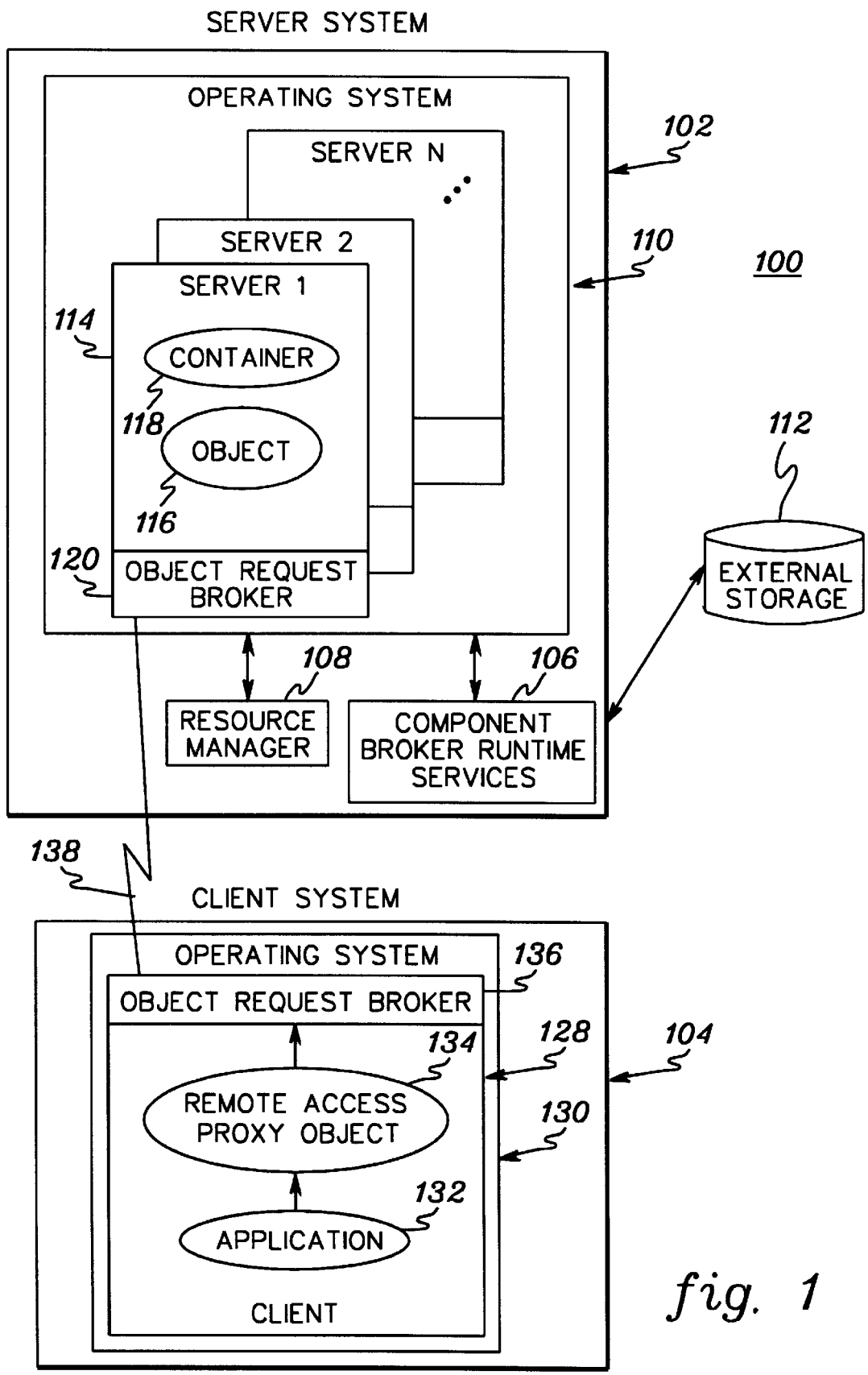
FIG. 1 depicts one example of a computing environment incorporating and using the capabilities of the present invention.

One embodiment of a computing environment incorporating and using the capabilities of the present invention is depicted in FIG. 1. Computing environment 100 includes, for instance, one or more server systems 102 coupled to one or more client systems 104. In the example described herein, server system 102 and client system 104 are based on the Enterprise Systems Architecture (ESA)/390, offered by International Business Machines Corporation (Armonk, N.Y.), and described in "Enterprise Systems Architecture/390 Principles of Operation", IBM Publication No. SA22-7201-05, Sixth Edition (Sept. 1998), which is hereby incorporated herein by reference in its entirety. In other examples, however, one or more of the server systems and/or the client systems may be based on other architectures, including, but not limited to, a UNIX architecture. Further, a server system of one architecture may be coupled to a server system and/or a client system of another architecture.

In addition to the above, in one embodiment, at least one server system 102, as well as one or more of the client systems, support object-oriented programming and object-oriented concepts. Object-oriented programming and concepts are described, for example, in *CORBA A Guide To Common Object Request Broker Architecture*, by Ron Ben-Natan, McGraw-Hill Publishers (1995), and *Object-Oriented Programming Using SOM and DSOM*, by Christina Lau, Van Nostrand Reinhold Publishers (1994), both of which are hereby incorporated herein by reference in their entirety. CORBA is further described in "CORBA 2.2/IIOP Specification," available at WWW.OMG.ORG/library/C2INDX.HTML, which is hereby incorporated herein by reference in its entirety.

Server system 102 includes, for instance, component broker runtime services 106, which provide the infrastructure and capabilities for various aspects of the present invention. In one example, component broker runtime services 106 include, for instance, systems management services, managed object framework interfaces, naming services, Life Cycle services, transactional services, interface repository services, and location service agent services. These services, as well as others, are used to implement aspects of the present invention, as described below. Component broker runtime services may be included in, for instance, a component broker product. The component broker product may also include and/or implement various aspects of the present invention. One embodiment of various features of a component broker is described in "Component Broker Programming Reference Release 2.0," IBM Publication No. SC09-2810-04 (Dec. 1998); "Component Broker Programming Guide Release 2.0," IBM Publication No. GO4L-2376-04 (Dec. 1998); and "Component Broker Advanced Programming Guide Release 2.0," IBM Publication No. SC09-2708-03 (Dec. 1998), each of which is hereby incorporated herein by reference in its entirety. Component broker and/or component broker runtime services may be sold separately or packaged with an operating system.

Server system 102 also includes one or more resource managers 108, which own and control a set of resources within the computing environment; and at least one operating system 110, which controls the operation of the server system.

One example of a resource manager is a database management facility, such as DB2, offered by International Business Machines Corporation (Armonk, N.Y.). DB2 is described in "OS/390 Version 5 Release Guide," IBM Publication No. SC26-8965-01 (Jun. 1997), which is hereby incorporated herein by reference in its entirety. Data managed by DB2 may be stored on external storage 112 (e.g., direct access storage devices (DASD)) coupled to server system 102.

One example of operating system 110 is the OS/390 or Multiple Virtual Storage (MVS) operating system offered by International Business Machines Corporation (Armonk, N.Y.). OS/390 is described in "MVS Programming: Assembler Services Guide," IBM Publication No. GC28-1762-01, Second Edition (September 1996), and "MVS Programming: Assembler Services Reference," IBM Publication No. GC28-1910-01, Second Edition (September 1996), each of which is hereby incorporated herein by reference in its entirety.

In accordance with one aspect of the present invention, operating system 110 includes at least one instance of a server 114, which is, for example, a software process defined within server system 102. Each server instance is in one or more address spaces and is defined using, for example, one or more graphical user interfaces (GUI) provided by component broker runtime services 106. The graphical user interface(s) provides options, which enable the server instance to be named and to be associated with certain characteristics (e.g., is the server instance to be secure, workload managed, etc.). The information presented on the GUI is stored in a database, such as a DB2 database. Subsequent to defining the server, the server is created by using, for instance, an address space create, which pulls the requisite information from the DB2 database.

Server instance 114 includes various components such as, for example, one or more objects 116, one or more containers 118, and at least one object request broker (ORB) 120. Each of the components of server instance 114 is described in further detail below.

Object 116 is a run-time entity (e.g., application code) with a specific set of instance methods (i.e., functions to be performed on the object) and instance variables (used to store data specific to the object) associated therewith.

Figure 2:
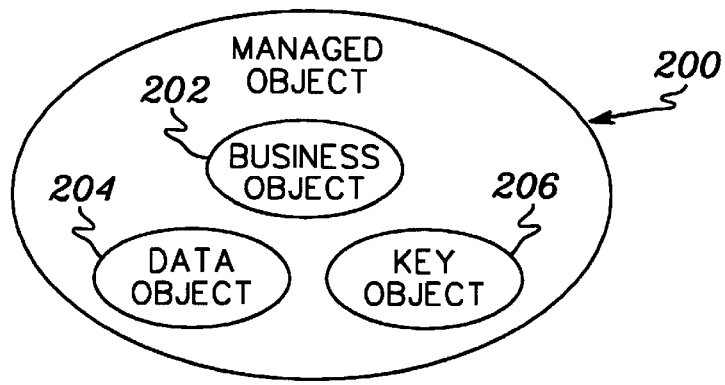
FIG. 2 depicts one example of a managed object, in accordance with the principles of the present invention.

One example of an object is a managed object 200 (FIG. 2), which includes various components, such as a business object 202, a data object 204 and a key object 206. Managed object 200 is created via a managed object framework, which includes a set of interfaces that is inherited. Pieces of the managed object framework are inherited by the business object, when it is created, which enables the business object to reside in server instance 114. As one example, business object 202 inherits an interface from the managed object framework called "managed object with data object." This provides data object 204.

Data object 204 is a helper object to the business object. It is not exposed to the user of the business object. Included within the data object is the means to reference the data (e.g., SQL for DB2 data). That is, the data object includes a schema map. It is the object responsible for going to the database, retrieving the requested information, and passing the information on to the business object.

A set of methods is introduced on the "managed object with data object" interface, which includes, for instance, an initForReactivation method, a initForCreation method, an uninitForPassivation method and an uninitForDestruction method. These methods are driven on the business object after or before the container performs a function. It is the container that manages the object in virtual memory. These methods are used to tell the business object what the container has done and to give the business object a chance to do processing as a result of the container managed event.

In particular, the initForReactivation and initForCreation methods are used to bring a virtual memory image of a managed object into memory and to initialize it, as described further below. The uninitForPassivation method is used to remove the image of a managed object from virtual memory; and the uninitForDestruction method is used to delete a managed object from the backing store (e.g., the DB2 database), also described further below.

The implementer of the business object is responsible for implementing the above-described methods. For example, assume an application developer wishes to build an implementation of a business object of Type A. The application developer uses an interface for Type A that inherits the "managed object with data object" interface. That interface provides the inheritance for the four methods, for which the application developer has provided implementations.

The application developer also provides an implementation for key object 206, which is associated with the business object. The key object includes a key value used to identify the managed object from other managed objects within a home collection.

In one embodiment, all of the provided implementations are compiled, linked and packaged into a dynamic linked library (DLL). The DLL is supported by an object referred to as a home collection object built by a systems management application.

In particular, each managed object lives in a home, which is identified by a name and has a defined set of properties associated therewith. The relationship between the home and information in the DLL is represented by a set of systems management metadata in the form of data definition language (DDL). The DDL includes, for instance, the name of the home, the properties of the home, and the name of the container (described below) that is going to support the DLL. Additionally, the DDL includes the name of the business object class, the name of the data object class, and the name of the primary key class. The DDL package is imported into a systems management application. The systems management application ensures that the named container exists (i.e., there is a systems management definition) and then builds the home collection object to support the DLL. The home inherits from the container that it is attached to, so there is a merge of the home and the container. Thus, there is a merge of the metadata.

Returning to FIG. 1, server instance 114 also includes one or more containers 118. A list of the containers associated with the server instance is built and stored in, for instance, a DB2 database during creation of the server instance. In one example, each server instance has a root container that is bootstrapped to the server instance and manages any other containers associated therewith. Similar to the server instance itself, each container is defined using, for example, one or more graphical user interfaces provided by component broker runtime services 106. Using the GUI, the container is named and any policies associated therewith (as described below) are defined. Once again, the definition is stored in DB2. Additionally, the relationship between the server instance and the container is stored in DB2.

Each container is used to locate one or more managed or business objects (referred to herein simply as objects) that are associated with the container. That is, the container is considered a home to the one or more objects. The container is able to locate an object using the object key provided to the container by, for instance, object request broker 120. If the object is not in virtual memory, the container brings the object into virtual memory from storage (e.g., a database) and materializes the object. The container then passes the virtual address of the object to object request broker 120, since it was the object request broker that passed the object key to the container. When the ORB receives the address, it can then dispatch methods onto that object.

Object request broker 120 is responsible for managing communications between a server instance and a remote client. In particular, the ORB receives requests from a remote client, determines the object that is being requested and drives the requested method on that particular object. In order to locate the object, the object request broker passes the object key to the container, which then locates the object for the object request broker.

A remote client is located, for instance, in client system 104, which includes one or more clients or client instances 128 managed by at least one operating system 130. Operating system 130 is, for example, the OS/390 operating system offered by International Business Machines Corporation. In other examples, operating system 130 is Windows NT, AIX or any other operating system that can be employed with the present invention.

A client includes, for example, one or more applications 132, one or more remote access proxy objects 134 and a client object request broker 136.

Figure 3:
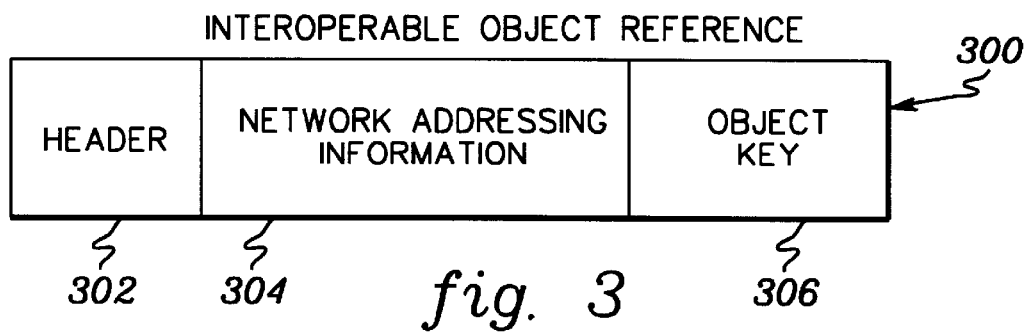
FIG. 3 illustrates one example of an interoperable object reference used in accordance with the principles of the present invention.

Application 132 initializes requests to objects located within a server instance 114 of server system 102. Each request includes an interoperable object reference 300 (FIG. 3), which provides the identity of the object and the identity of the server instance in which the object resides. In particular, interoperable object reference 300 includes, for instance, a header 302 providing information regarding the object, including its type; network addressing information 304 providing location information for the server instance housing the object; and an object key providing the identifier (i.e., key) of the object.

When an application issues a request, the request is intercepted by remote access proxy object 134, which is coupled to the application and to ORB 136. The remote access proxy object gives the client application the illusion that the client application is driving a method on a local object instead of a remote object. The remote access proxy object passes the request to ORB 136, which forwards the request to ORB 120 of a given server instance via, for instance, a TCP/IP connection 138. ORB 136 knows which server instance to send the request to, since the server instance is identified in network addressing information 304 located within the interoperable object reference, which is passed with the request.

The interoperable object reference is provided to the client as a result of a response to a request by the client or as some inbound parameter. For example, the interoperable object reference may be provided to the client by a naming service, as described further below. When the interoperable object reference is imported into the client-side ORB, the client-side ORB recognizes it as an object reference and interrogates it to determine what should be done with the reference. Since it is an object reference, ORB 136 builds a remote access proxy object, associates the addressing information with the proxy and hands the virtual address of the remote access proxy object to the application that wants to use it. Thus, when the application drives the object, it talks to the proxy, which proceeds to the client-side ORB. The client-side ORB then uses the network addressing information stored in the IOR of the proxy object to locate the server instance, and to pass to the server instance the object key as opaque data. Thus, the proxy object, which resides in a client, represents a network-wide reference to the target objects which resides in a remote server instance.

As described above, the remote access proxy object is used to drive the client-side object request broker in order to deliver method requests to the target object, which resides physically in another address space somewhere in the network. Because the client application does not use an actual virtual memory address of the target server object, the life cycle of the physical object resident in the server instance can be independent of the number of outstanding client references to the object.

However, in the case where the client (i.e., the requester) of the target object resides physically in the same address space as the target object itself, it is common practice to represent the reference to the target object with a virtual memory pointer, since there is no requirement for an object request broker interaction. ORBs are conventionally used only to provide communication across different application processes (i.e., across different address spaces), not to facilitate communication within the same application server process (i.e., the same address space). Therefore, for the local access case, the life cycle of the target object is tightly bound with the tracking of the outstanding local references to the object.

There are a number of problems associated with binding the life cycle of the target object with the outstanding local references. First, the principle of local/remote transparency is broken, since the local references to an object behave differently than the remote references. Second, the approach constrains the management of the virtual memory resident copy of the target object and makes memory residency dependent on the number of outstanding local references. Third, since physical copies of the target object are tied directly with a virtual address pointer in the client application, certain instance management policies which determine such things as activation, and isolation level at various execution contextual boundaries cannot be implemented, since there can be no assurance that reference to the object will not be used by multiple units of work running in difference execution contexts. In other words, separate cached copies of the target object cannot be provided by the instance management component (e.g., container) of the server instance (described below), since shared use of the reference results in shared use of a single cached copy of the object.

Based on the foregoing, a need exists for the decoupling of the local object references from the management of virtual memory copies of the target object within the instance management container. Further, a need exists for allowing objects to be independent of (e.g., not bound) to any address pointers owned by the client application (i.e., the requester). Thus, in accordance with one aspect of the present invention, a local proxy is added to a server instance, so that any access to the target object whether remote or local within an address space is managed through a proxy.

Figure 4:
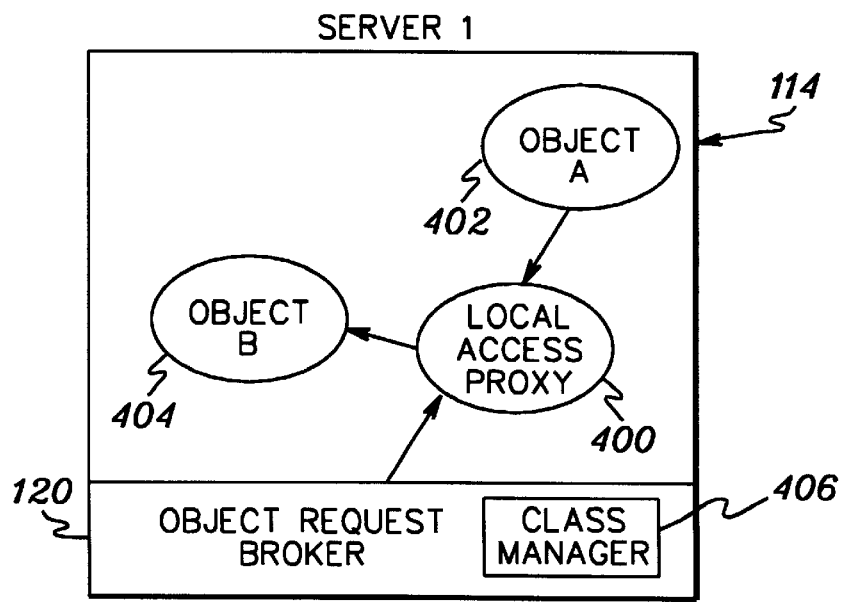
FIG. 4 depicts one example of a local access proxy located within a server instance, in accordance with the principles of the present invention.

The addition of a local proxy on a server instance for local access is depicted in FIG. 4. A local access proxy 400 enables one object 402 (e.g., a managed object or a business object) or the ORB in a server instance 114 to drive another object 404 (e.g., a managed object or a business object) in the server instance in a manner similar to an application in client 128 driving an object in server instance 114. Advantageously, this provides for local/remote transparency in that an object can be driven in the same manner regardless of whether the access is local or remote.

Figure 5:
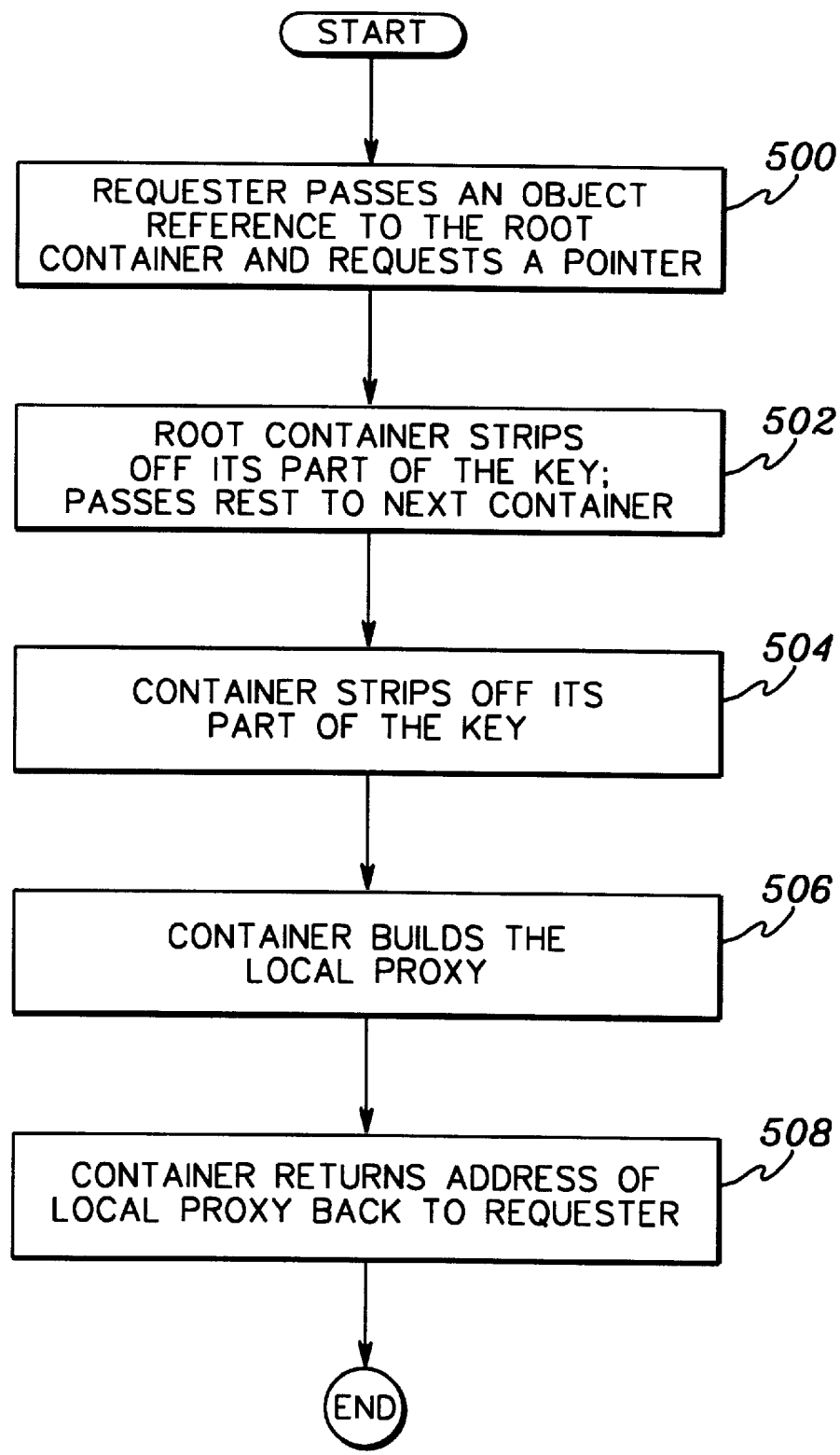
FIGS. 5–6 depict one embodiment of the logic associated with building a local access proxy for a target object, in accordance with the principles of the present invention.

One example of the logic associated with building a local proxy is described with reference to FIGS. 5–6. Initially, a requester, such as the ORB, that wishes to obtain a pointer to a managed object (e.g., Object B) from an object reference, passes an object reference to the root container and requests a managed object pointer, STEP 500 (FIG. 5). Specifically, in one embodiment, the entire object key value is passed to the root container. The object key value is the hierarchical name key path of the target managed object. For instance, an object key value might be "root/container1/123456", where "root" is the key of the root container, "container1" is the key of the container holding the managed object, and "123456" is the key of the managed object within the container.

The root container strips off its part of the key, and passes the rest of the key to the next container, e.g., container1, STEP 502. Container1 then strips off its part of the key, STEP 504.

As part of the local proxy support, container1 then builds a local access proxy, STEP 506, and returns the address of the local access proxy back to the requester, STEP 508.

Figure 6:
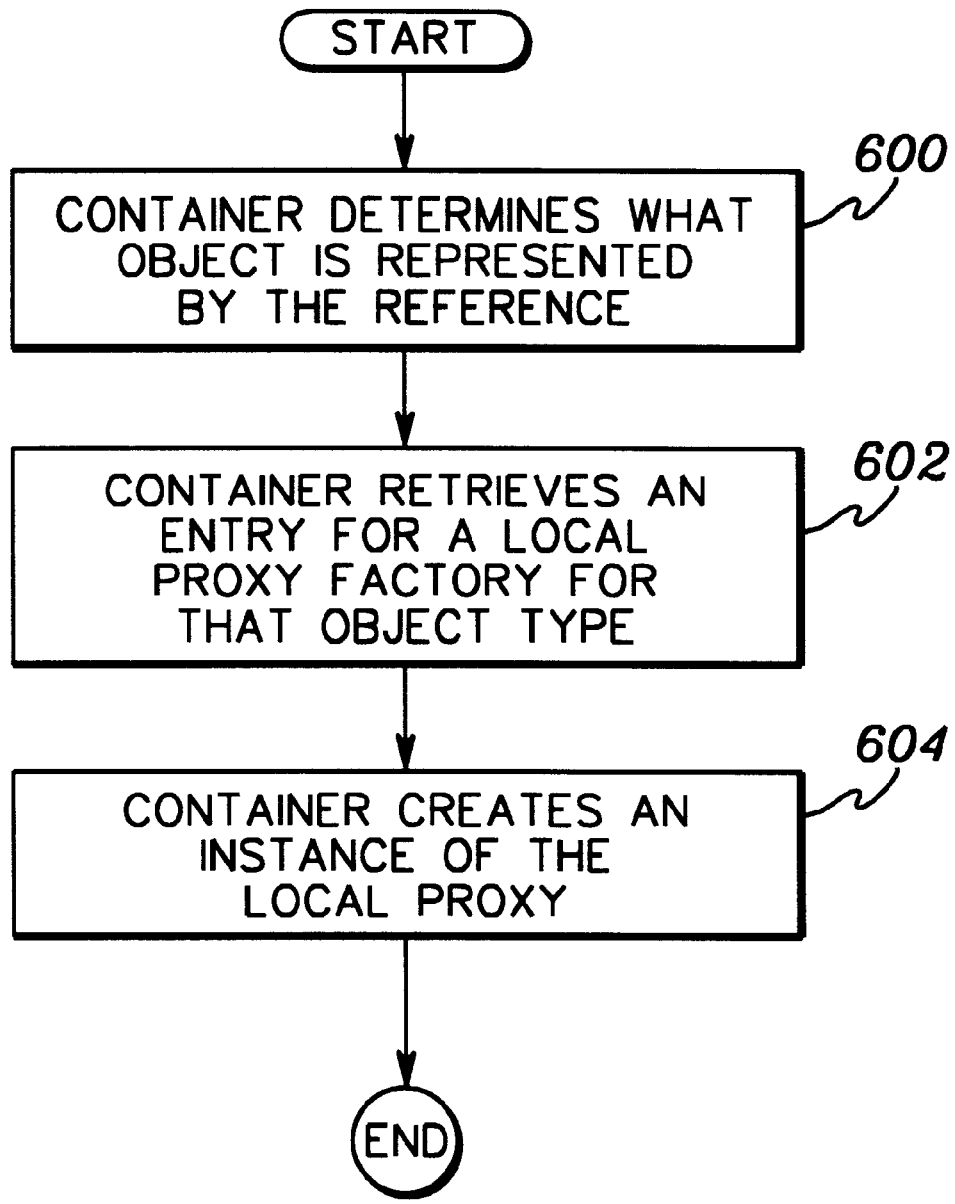

In one example, in order to build the local access proxy, the container (e.g., container1) first determines through its configured metadata the type of object being managed (e.g., Type B), STEP 600 (FIG. 6). The container goes to a class manager 406 (e.g., a table that represents a list of interface names) to retrieve any necessary information. For example, the container retrieves an entry for a local proxy factory, loaded by the DLL, to produce local proxies of Type B, STEP 602. The container drives a request to that proxy factory and obtains an instance of Local Proxy B, STEP 604. Local Proxy B is created and the address of the proxy is passed back to the calling object (e.g., the ORB). (In another example, a proxy for an object, such as Object A, did the actual calling and thus, the address of Proxy B is passed to the proxy for Object A, which then passes it to Object A).

When the requester receives the address of the local access proxy, the requester then issues another request, which now goes to the local access proxy, which communicates with the target object. In particular, in one embodiment, the local access proxy object consults with the container (e.g., container1) to obtain the actual virtual memory address of the target managed object. To obtain this address, the local access proxy passes the target object's primary key to the container.

Described in detail above is the use of local access proxies to access objects, including those resident in the same address space as the requester of the objects. In one aspect, when using local access proxies, it is generally the case that use of an object reference is to include the appropriate use of the "dupe" and "release" CORBA methods. In fact, in one embodiment, the use of "t-var" is recommended as a means to hold references to CORBA objects. This recommendation applies whether access to the managed object is local or across an ORB boundary. The VAR causes the release of the proxy, when it goes out of scope within a C++ program.

The approach described herein allows the local access proxy to dynamically switch to the appropriate target object, while allowing the container to manage its activated objects in accordance with its designated policies. In particular, the local access proxy is capable of proceeding to its container to find out what object it is to drive, which is based on the underlying context in which it is being driven (in real-time). This allows the container to manage the objects in accordance with its policies. In one example, the container is consulted, both before and after, each method dispatch of a managed object. This consultation occurs from the local proxy. The container ensures no change to the disposition of the activated managed object occurs between the "before" and "after" calls from the local proxy.

Those policies govern not only the life cycle of the in-storage copy of the object, but also the physical isolation levels implemented by managing multiple copies of the target object, each associated with a specific execution context, such as a transaction or a session. By making memory residency of the target object independent of the number of outstanding local references to the object, the container is able to page-out objects to more effectively manage server instance virtual memory, while at the same time provide the trigger mechanism to cause the page-in of the object, if the object is referenced by the client application.

Figure 7:
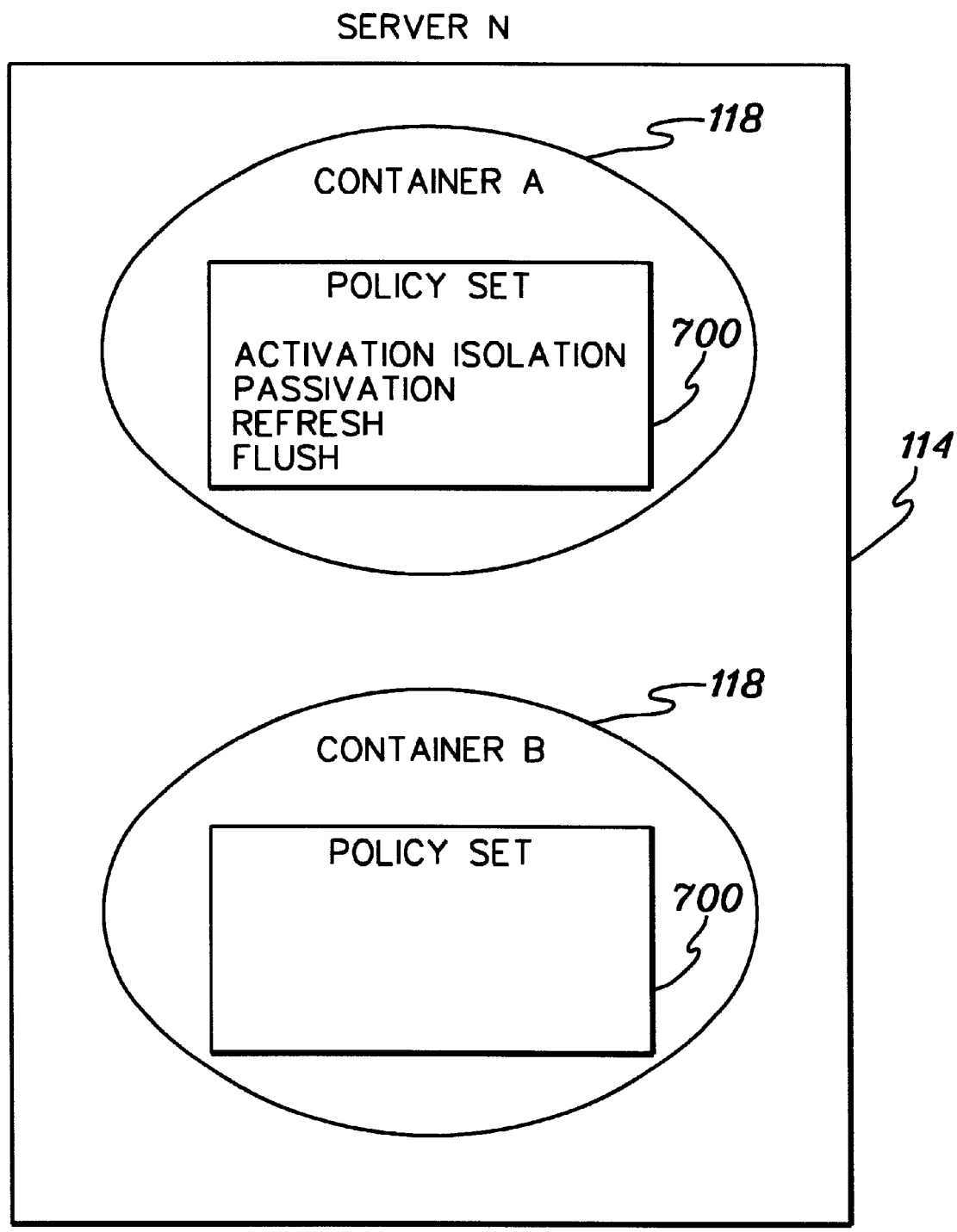
FIG. 7 depicts one example of a policy set associated with a container of a particular server instance, in accordance with the principles of the present invention.

In accordance with one aspect of the present invention, a set of management policies, selectable by the customer at object installation time is provided (e.g., when the container is defined). These policies govern the management of state coherency, isolation level and residence lifetimes of both transient and persistent objects in the virtual memory of a distributed object server, such as server instance 114 (see FIG. 7). The policies 700 are managed by one or more containers 118 and include, for instance, an activation isolation policy, a passivation policy, a flush policy and a refresh policy, each of which is described below.

Activation is the process by which a virtual memory image of a managed object (or a business object) is brought into memory and initialized via, for example, an initForReactivation method or initForCreation method. Activation is an implied action taken when creating a managed object with a managed object factory. The process of activation is architecturally independent of transaction management, session management, locking etc. Activation is the instantiation of an object image in virtual memory and the attachment of the object to either an ORB or a local access proxy, so that the object is physically ready for client driven methods.

For example, assume there is an object referred to as an employee object, Employee 1, and a method referred to as Increase Salary is to be driven on that object. Also, assume that the state of the object is persistent and lives in a database coupled to the server environment. The object has a unique identity, such as an employee serial number, which represents the primary key of the object. In particular, the primary key is part of the object key, and the object key includes a set of information that represents a hierarchical path from the root container in a given server instance down through the container that manages the particular object, e.g., the employee object. As an example, the object key for the employee object symbolically looks like the following: Root container/employee home primary key value/employee managed object primary key value.

The object key is used to activate the object, as described in the following example with reference to FIGS. 8a-8b. Initially, a client packages up a request, STEP 800. The request includes, for example, the following information: the name of the method, e.g., Increase Salary; parameters for the method; and an object key which was obtained from the interoperable object reference. The request is forwarded to a remote access proxy object (assuming the client is in a different address space than the target object), which removes the object key from the request and passes the object key and data to the server instance via an ORB, STEP 802. The ORB of the server instance receives the object key and the data.

The server ORB then demarshalls the key in order to find the object inside the server instance that the method is to be dispatched thereon. In particular, the ORB takes the object key and proceeds to the root container (the ORB knows where the root container is, since it is hardwired into the server instance) and drives a method called KeyToobj on the container, STEP 804. The ORB does this in order to locate an actual object to dispatch onto. Specifically, the ORB is looking for a virtual memory address of a real instance of an object and it is counting on the container to hand the address back to the ORB. The address that will be passed back to the ORB is, however, in accordance with one aspect of the present invention, a pointer to a local access proxy, instead of the actual object.

Figure 8A:
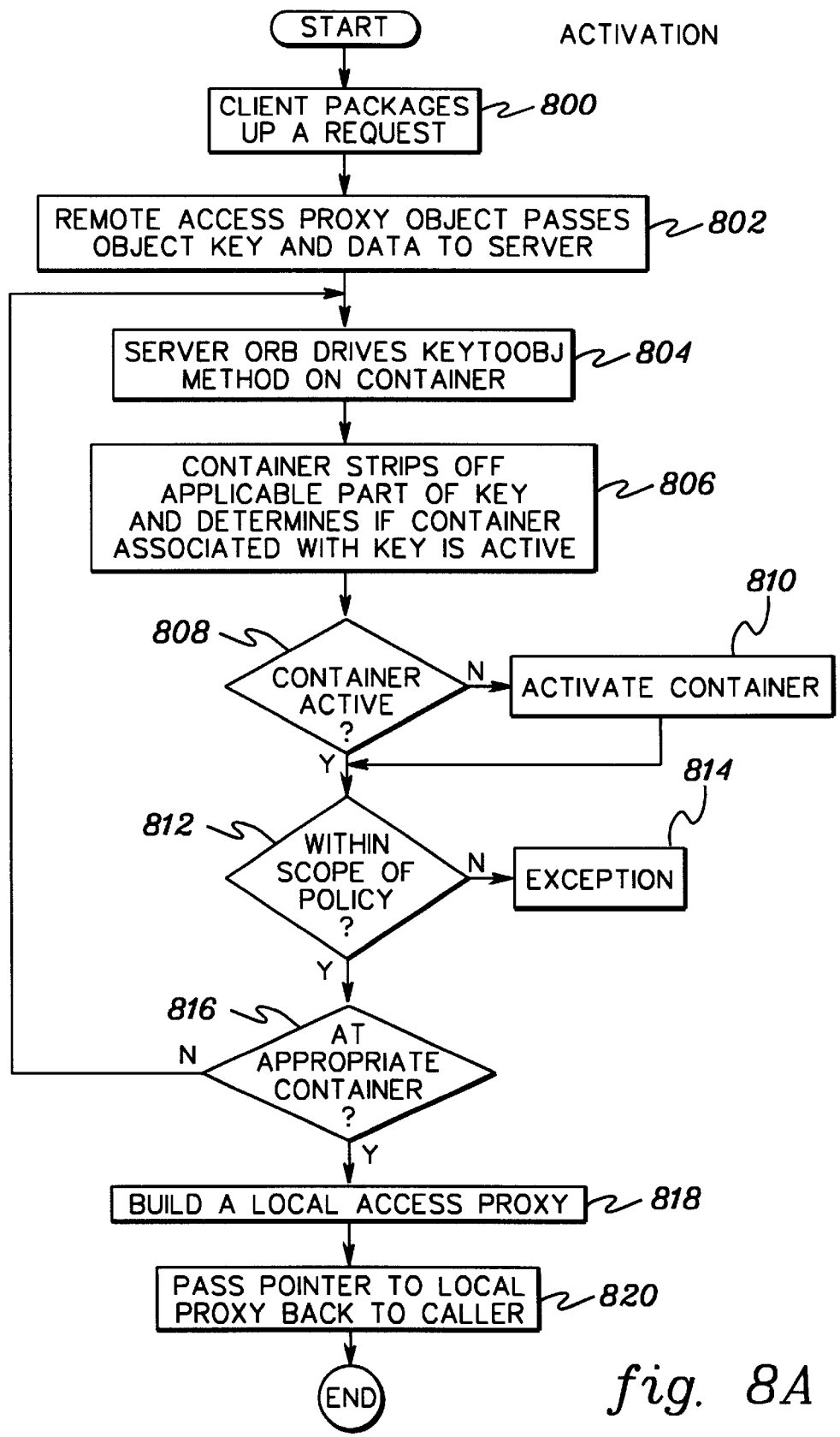
FIGS. 8a-8b depict one embodiment of the logic associated with activating a managed object, in accordance with the principles of the present invention.

Continuing with FIG. 8a, when the root container receives the object key, it strips off the object key of the object that is to be located, STEP 806. In this example, the employee home container primary key value is stripped off and the root container determines whether that employee home container is active, INQUIRY 808. In one example, the root container determines whether the container is active by taking the key value and searching a hash table for that value. If the value exists in the hash table, then the container is active.

Should the container be inactive, then it is activated, STEP 810. In one example, activation of the container is the same process as activating a managed object. The process is recursive and can occur at any level in the container tree.

If the home container is active or after it has been activated, then a further determination is made as to whether the container is within the scope of the policy associated therewith, INQUIRY 812. Again, in one example, this is accomplished by using policy information stored in the hash tables. Should the container not be within the scope of the policy, then an exception is provided, STEP 814.

However, if the container is within the scope of its policies, then a determination is made as to whether another container is to be located, INQUIRY 816. In particular, a decision is made as to whether the container for the particular key value is the currently processed container. If not, then the procedure recurses down another layer. In particular, the rest of the object key is forwarded to the container, and the KeyToObj method is driven, once again, STEP 804.

Returning to INQUIRY 816, once the appropriate container to manage the employee object in this case, is obtained, the container builds a local access proxy for this class of object, STEP 818. The container knows the class of object by the information stored in the DB2 table associated therewith. That is, the container is aware of the managed object class name, the business object class name, the policies and a local access proxy class. Thus, the container brings up a local proxy for the specific employee identified by the primary key.

Subsequently, the container passes a pointer to the local access proxy back to its caller which is the root container, in this one example, STEP 820. Once the caller receives the pointer to the local proxy, it can then dispatch the managed object through the local proxy, as described with reference to FIG. 8b.

Figure 8B:
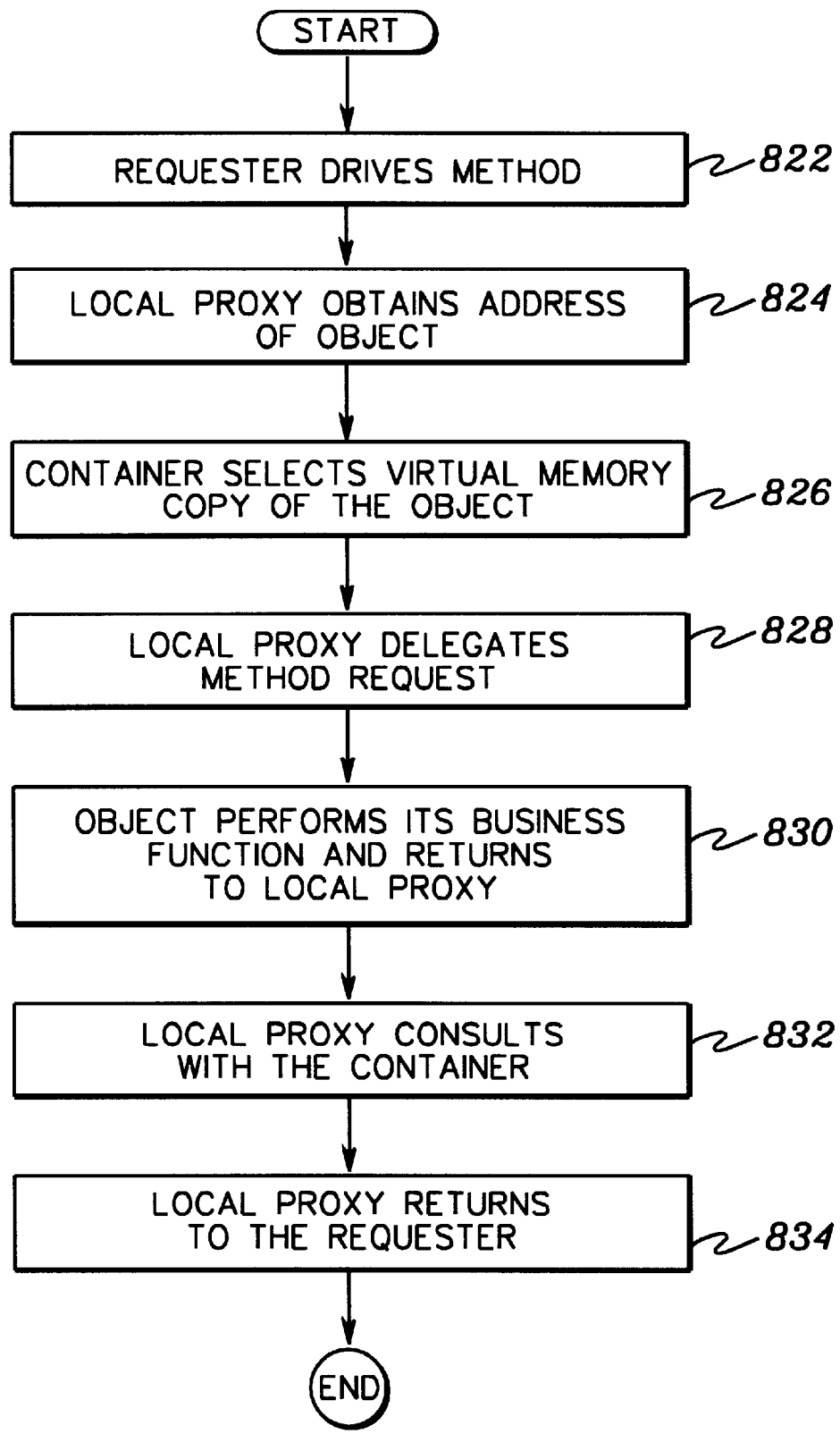

Initially, the requester drives the method represented on the local proxy, STEP 822 (FIG. 8b). Then, the local proxy consults the object's container to obtain the address of the managed object, STEP 824.

Subsequently, the container enforces its dispatching policy and selects a virtual memory copy of the object to be dispatched, STEP 826. This selection is based upon activation isolation level etc., and may result in the activation of the object. In one example, the policies are cached within the container, when the container is activated. The activation isolation policy includes, for instance, three levels: transaction level, session level and container level.

At the transaction level, a specific virtual memory image of the managed object is activated for each transaction accessing the object. Any thread of execution running in the server instance within the transaction may share the same activated managed object. This includes multiple threads, as well as different threads running on the transaction either as a result of an object request broker managed context switch or a resume operation, which made a given transaction active on the thread. However, any thread running outside of the transaction does not share the same virtual memory copy of the managed object.

At the session level, a specific virtual memory image of the managed object is activated for each session accessing the object. Any thread of execution running within the server instance within the session, including those running in different sessions, may share the same virtual memory copy of the object. However, any thread running outside of the session does not share the same virtual memory copy of the managed object.

At the container level, only one virtual memory copy of the managed object is activated at any one time within the container within the server instance. Any session and transaction running within the container may share the same virtual memory copy of the managed object. Assume, for example, that the policy is to activate an object per transaction. The container realizes that it is isolated at transaction, so the container determines which transaction it is running under. This is accomplished by consulting the transactional context hanging off of the execution thread associated with the request. If, for instance, it is determined that the transactional context is Transaction 7, then the container references the hash table (e.g., DB2 table) and uses the primary key value of the object, along with the information of Transaction 7, to determine if the object is activated in memory. If there is no object having that primary key value for Transaction 7, then the object is created.

In particular, the object can be created from scratch or the container can have pools of objects (e.g., hot cached shells of the objects) used to obtain an instance of the managed object. As one example, an instance of the managed object, the data object and the primary key object is obtained.

After obtaining the instances, the container takes the primary key value and passes that value to the primary key object. That is, the primary key object is constructed by handing it its state. The primary key object initializes itself using a FromString method. The primary key object is then handed to the data object with a call "InternalizeFromPrimaryKey". The data object retrieves whatever information it needs to identify this object. For example, the data object retrieves the primary key value so that it can go to a DB2 database with an SQL select.

Thereafter, the container drives a method on the data object called a RetrieveFromDataStore method. The data object takes the primary key value, plugs it into a select statement (e.g., SQL) because it is a retrieve method and goes out to the database, fetches the appropriate row, brings the data in, and places it in the data object. Once this is accomplished, the data object validates that the object actually exists. Thus, the data object takes the primary key and goes to the database and hands back to the container some indication that the object is out there.

Next, the container drives the initForReactivation method on the business object handing the business object the data object. The business object saves the latest data object and at that time can perform whatever function is necessary to initialize itself. The business object then returns to the container and the container passes back to the local access proxy the actual address of this activated object.

After the container selects the virtual memory copy of the object, the local proxy delegates the method request to the actual managed object, whose address was obtained from the container, STEP 828. The managed object performs its business function and returns to the local proxy, STEP 830.

Thereafter, the local proxy consults with the container again to allow the container to do any cleanup after the method execution, STEP 832. Further, the local proxy returns to the requester, STEP 834.

Figure 9:
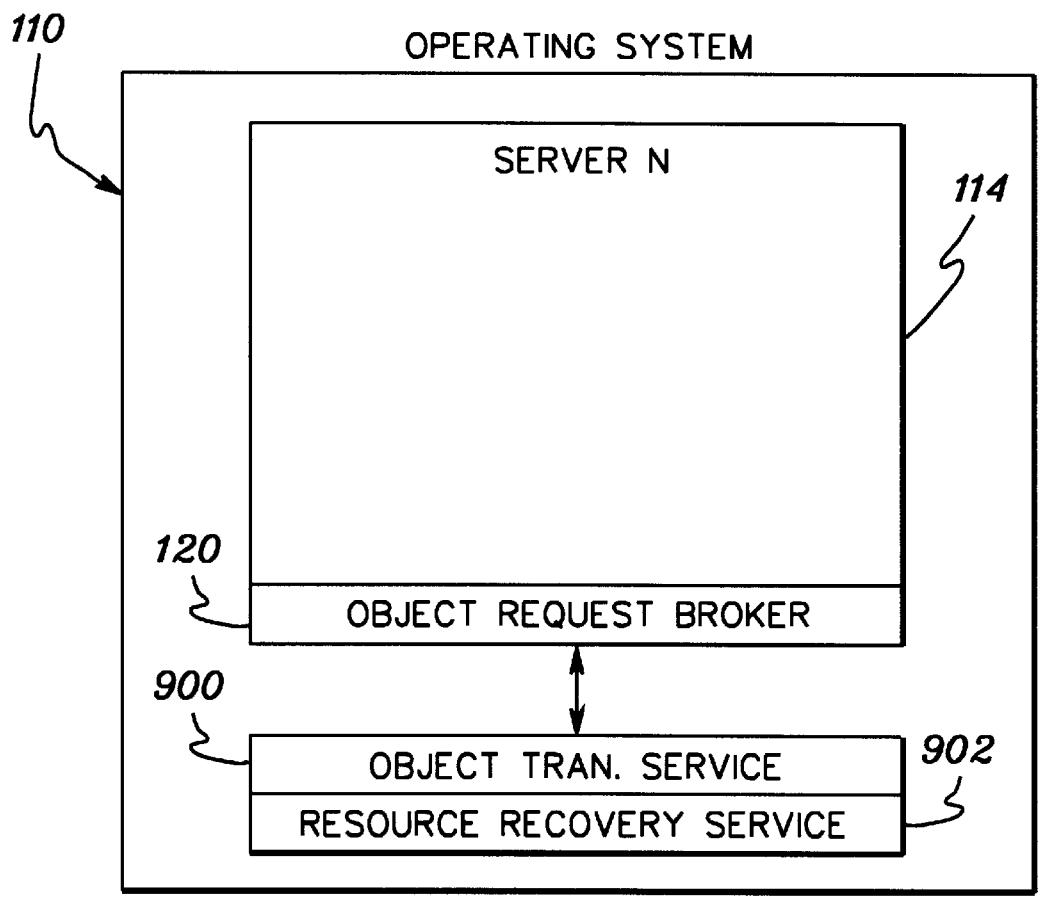
FIG. 9 depicts one example of an object transaction service and resource recovery service coupled to a server instance, in accordance with the principles of the present invention.

In addition to the above, during object activation, the container also registers itself with an object transaction service (OTS) 900 (see FIG. 9) as an OTS synchronization object. (OMG OTS is described in CORBA services specification available on the OMG web page (WWW.OMG.ORG) under technical library, and is hereby incorporated herein by reference in its entirety.) That is, the container places various information in a table associated with OTS. As shown in FIG. 9, OTS is coupled to a resource recovery service (RRS) 902 located within the operating system. Since the container is a synchronization object, it implements a "before completion" method and "after completion" method. Thus, as one example, when a transaction is ready to be committed, OTS uses the sync object to inform its objects that a commit is about to happen ("before completion") and that it has happened ("after completion").

Additionally, OTS passes the commit to RRS 902, which is responsible for driving the commit to any resource managers coupled to the server instance. It is the resource manager(s) that is ultimately responsible for performing the commit. When the commit is done, RRS returns to OTS and indicates completion.

In one embodiment, as part of a transactional commit, the objects are passivated. Passivation is the opposite of activation. Passivation is the ability to push the data back out to the database and to eliminate the virtual memory copy of the data. In particular, the before completion method on the synchronization object causes data to be pushed to the database. This enables updates to be made, prior to RRS informing the resource manager to start the 2-phase commit process.

Passivation is the act of removing an image of a managed object from virtual memory within a server instance, so as to detach it from the object request broker or the local access proxy. The use of a local access proxy gives the container the ability to passivate the object based on the appropriate policy, instead of having to keep track of the various pointers to the object. When a container decides to passivate an object, the container pushes the object's data back to the resource manager, such as DB2. The managed object is notified of passivation via an uninitForPassivation method or an uninitForDeletion method. Deletion of a managed object implies the act of passivation before the object is formally deleted. Passivation may be triggered at different times and for different reasons not relevant to the act of passivation itself. In the case of transient objects with no backing resource manager other than the container itself, passivation implies deletion of the managed object.

A management, policy associated with passivation is referred to as a passivation policy, and it includes, for instance, four options: pinned, pinned for the life of the session, pinned for the life of the transaction, and not pinned.

Pinned indicates that the managed object is never passivated. In order to make the managed object unavailable to a client driven method dispatch, the managed object is deleted (i.e., removed). Transient objects are typically pinned, although this policy may also be applied to persistent objects (e.g., objects in which their data are stored in a backing store), as well. The container may remove the activated object from virtual memory in the case where a refresh of the managed object has failed due to the object being deleted. This may occur in loosely coherent systems when a client application has deleted the managed object within a replicated server region other than the current one.

Pinned for the life of the session indicates that the managed object is passivated within a server instance, when no sessions are associated with it. Note that session suspension from the thread of execution does not result in the disassociation of the session with the managed object. Session association is the action resulting from a thread of execution running within a given session touching the managed object. That association lasts for the life of the session.

Pinned for the life of the transaction indicates that the managed object is passivated within the server instance, when no transactions are associated with it. Note that transaction suspension from the thread of execution does not result in the disassociation of the transaction with the active managed object. Transaction association is the action resulting from a thread of execution running within a given transaction touching the managed object. The association lasts for the life of the transaction.

Not pinned indicates that the managed object may be passivated at any time prior to the end of the transaction at the discretion of the container. Further, the managed object is passivated when no transactions are associated with the managed object.

In one example, prior to passivating a managed object, the object is flushed in order to push the changed essential state of a managed object to its backing resource manager. In one example, the essential state of the business object is kept in the data object and accesses to the essential state are delegated to the data object. This is known as a delegating pattern. This pattern is designated through the inheritance of the managedobjectWithDataObject interface. With this pattern, the essential state is pushed through the execution of an update operation on the data object.

However, in another example, the essential state of the business object is resident in the business object and not the data object. This is known as a caching pattern. This pattern is designated, if the business object inherits the managedObjectWithCachedDataObject interface. In this case, a synctoDataobject method is driven on the managed object just prior to driving the update data object operation. In particular, the syncToDataObject method is driven by the container to cause the business object to push its cached state to the data object before the methods on the data object are driven to further push the data to the resource manager.

In addition to the above, a managed object may be flushed several times independent of and prior to passivation. As a further example, a managed object is flushed as a result of a session checkpoint operation, if the managed object is associated with the session being checkpointed.

Other explicit flush policy options may also be provided. For example, one policy option indicates that flushing is to be performed at the end of transaction. With this policy, the data object update operation and corresponding syncTo-Datastore operation are driven each time the container recognizes the end of a registered transaction, which has been associated with the managed object. The end of transaction policy applies to each transaction accessing the instance, even if the instance has been activated under an activation isolation policy which allows multiple transactions to be running concurrently on the same shared virtual memory copy of the managed object. Therefore, a single activated managed object may be flushed multiple times within multiple concurrent transactions under the respective policy options.

As a further example, no explicit flush policy is defined. If this is the case, then the flush operation is performed at the time of passivation and as a result of a session checkpoint operation.

A managed object may also be refreshed. Managed object refresh is the logical action resulting from the execution of a retrieve operation on the data object associated with the managed object. The retrieve operation is responsible minimally for ensuring the existence of the managed object's essential state in the backing resource manager based upon its identity and as represented by the primary key value of the managed object. In addition, the retrieve method may obtain part or all of the essential state of the managed object from the associated backing resource managers. In the case of the cached managed object (i.e., a managed object with a cached data object), a syncfromDataobject operation is also driven on the managed object during refresh, after the retrieve operation has been driven against the data object. The syncfromDataobject method is the opposite of the synctoDataobject method. The syncfromDataobject method is driven by the container to request the business object to retrieve its cached essential state from the data object.

A managed object is refreshed as part of the process of being activated. In addition, the managed object may be refreshed, while in the activated state and may be refreshed a number of times before it is passivated. As an example, the managed object is refreshed as part of a session reset operation, if the managed object is associated with the session being reset.

In addition to the above, explicit refresh policy options may be provided. These options include, for example, refresh at transaction recognition, at session recognition and no policy. At transaction recognition, the data object retrieve operation and corresponding syncFromDatastore operation are driven each time the container recognizes a new transaction on the thread of execution touching the object.

At session recognition, the data object retrieve operation and corresponding syncFromDatastore operation are driven each time that the container recognizes a new session on the thread of execution touching the object. The refresh policies apply even if the object instance has been activated under an activation isolation policy which allows multiple transactions or sessions to be running concurrently on the same shared virtual memory copy of the managed object. Therefore, a single activated managed object may be refreshed multiple times within multiple concurrent transactions and sessions under the respective policy option.

When no explicit policy is defined for refresh, then refresh occurs at the time of activation.

In one embodiment, in order to define or associate any policies with the container, a systems management application provided by component broker runtime services is used. This application provides, for example, a list of the policies that can be selected for a container, and allows the appropriate policies to be chosen. The chosen policies for the designated container are then stored in a systems management repository (e.g., a DB2 database).

Figure 10:
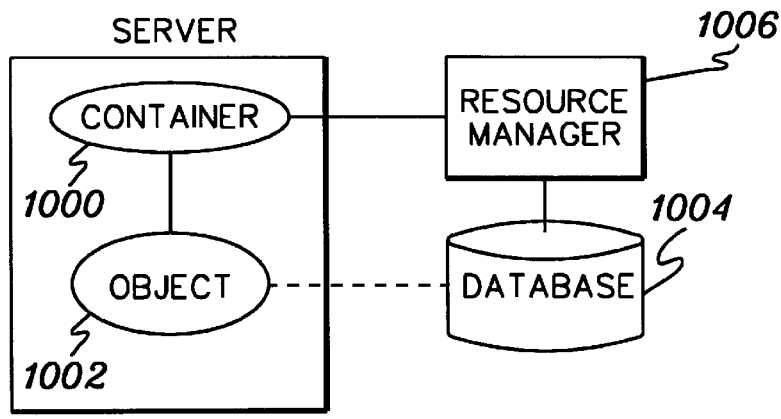
FIG. 10 depicts one example of a container managing an object, in accordance with the principles of the present invention.

Active in-memory instances of objects within a server instance are managed by a container 1000 (FIG. 10). One responsibility of the container is to provide a persistence mechanism so that an in-storage object 1002 can be populated with essential state from an external data source 1004, such as a database, and then stored back to the database, such that any changes to the object become persistent. Often times, however, the facilities provided to make an object persistent are accompanied by other related functional requirements, such as concurrency control, which is a mechanism for locking or serializing the essential state of the object, so that the contents of the object are stable and observable within the context of a given unit of activity, such as a transaction; access control, which provides security; and commit control under a transactional unit of work, which controls when changes are to be committed or rolled back. Further, it is often the case that for enterprise class data systems use of the data in a database is not exclusive to the object using it. Many times, the same data is used by various types of applications concurrently, some of which execute in more traditional types of environments, such as in CICS or IMS (offered by International Business Machines Corporation), which are outside of the scope and management of the object server instance or system. This data is typically controlled through various types of policies, which govern control of access to the data (i.e., security), sharing of the data across multiple users and systems, concurrency control of the data, and transactional recovery of the data.

Conventionally, a container is built in an object server instance based upon the premise that persistent objects live in the object server instance and are simply composed from data that lives in a database. When this view is taken, the object server instance takes on the responsibility for hosting and executing the types of policies described above. For example, typical object server implementations provide a locking service to perform concurrency control of the object within the object server instance. The object server instance assumes a similar responsibility for access control of the object. There are a number of problems associated with this approach, however. Some of these problems are enumerated below:

1) Building a scalable lock manager is complicated and error prone.
2) Building a scalable multi-system lock manager is even more complicated and error prone.
3) Because the data being used to populate the object is also being used for other purposes in the system, any locking function done in the object server domain must then be reconciled with locking done in the database management domain.
4) Many times the access control policies resident in the object server domain are replicas of the access control policies in the data management domain, adding performance degradation to the runtime and systems management cost to the customer.
5) Building a recoverable resource manager is complicated and error prone. Providing this function, including the transactional logging required to support it, in the object server is often duplicating function that is required in the data management domain anyway.
6) Providing efficient caching of the object state across transaction boundaries in the object server domain requires a reconciliation of the caching policies provided in the data management domain.

Further, in the case of a clustered systems configuration, the caching is to be reconciled across multiple systems.

In order to eliminate the above problems, various aspects of instance management are delegated from container 1000 to one or more underlying resource managers 1006, such as DB2 offered by International Business Machines Corporation (Armonk, N.Y.). In particular, the responsibility for locking (e.g., concurrency control), access control, caching across multiple systems (i.e., multisystem caching), and commitment control is delegated to the underlying data manager. As such, the object server instance is no longer considered the home for an object, but instead, is considered a temporary dispatching space for the persistent object, which is staged or cached into the object server instance from its persistent home in the database.

Thus, when a request is made by the object server instance to obtain one or more attributes of the object (e.g., for an employee object, the attributes may include name, salary, department, etc.), so that it can be composed/staged for dispatch in the object server instance virtual memory, the resource manager, instead of the container, performs and/or manages any locking, multisystem caching, access control and commitment control needed to obtain the attributes. This, in combination with instance management policy, which, for example, provides for a separate copy of the staged object in virtual memory per transaction, eliminates the need to provide concurrency control within the object server instance, since locking is typically managed at transactional boundaries within the resource (or data) manager.

The object is effectively serialized through whatever locks are held in the underlying resource manager for each of the object's attributes. Further, the locks that are held in the resource manager domain are providing concurrency control across multiple systems in a clustered configuration. It also allows the resource manager to negotiate the compatibility state of the locks in real time as other requests (either from other object servers or traditional transaction environments, such as CICS or IMS) are made for the data.

The same placement of responsibility exists with respect to security. Access control is provided by the underlying resource manager as the requests are made from the object server instance to build the object in virtual memory for use by a given user. The same placement of responsibility exists with respect to data caching and recoverable commitment control. There is no need for the object server instance to provide resource recovery and logging, since that function is pushed down to the underlying resource manager. With respect to caching, the object server instance does not take responsibility for holding state in its virtual memory beyond the point at which the state could become invalid in the underlying resource manager. This treatment is only overridden through designation of specific policy in the object server instance. Another advantage of this approach is that any ongoing improvements and functional extensions provided in the underlying resource manager are immediately leveraged transparently in the object server instance.

Figure 11:
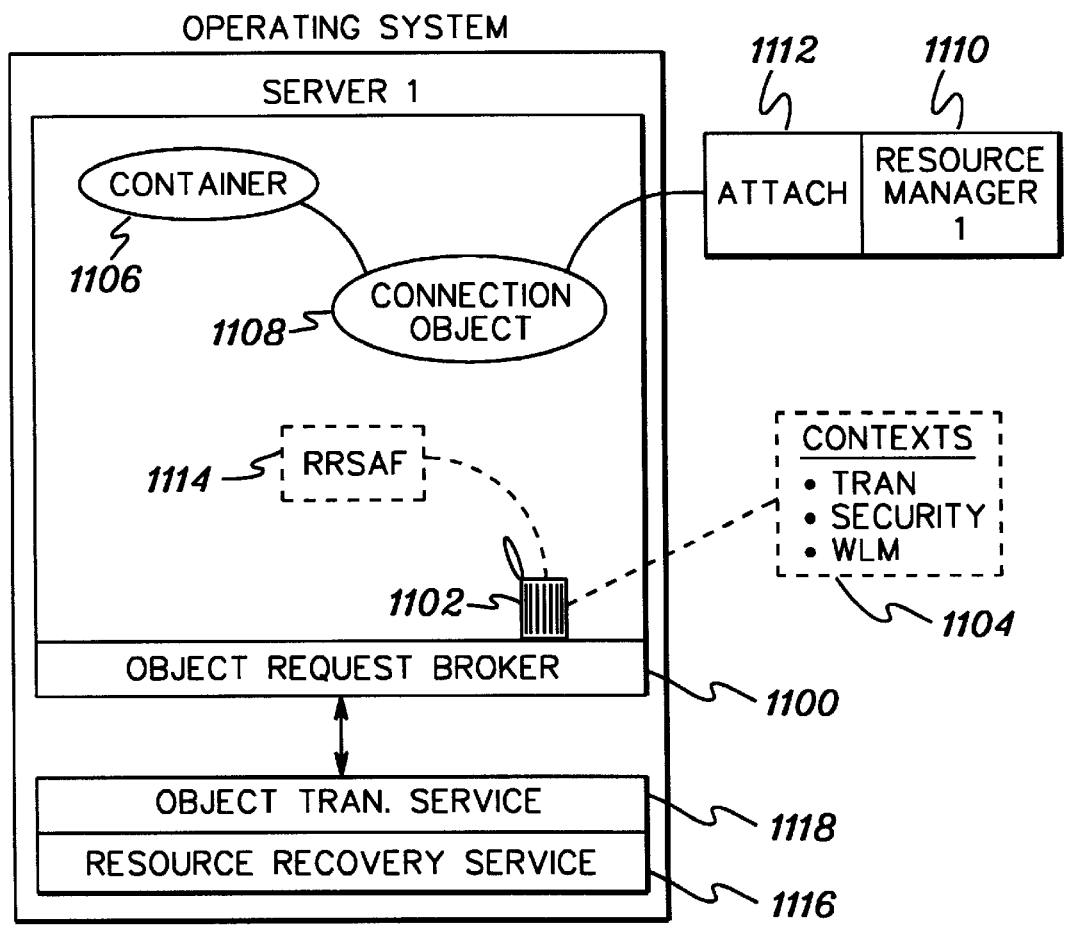
FIG. 11 depicts one example of a connection object associated with a container and used in accordance with the principles of the present invention.

In order to delegate the various aspects of instance management from a container to a resource manager, particular contexts are provided in object space, so that they can be provided on the interfaces used to access the resource manager(s). As one example, it is the object request broker that sets up a particular context on a thread of execution, thereby pushing the management responsibilities to the resource manager(s), rather than having the containers implementing the responsibilities themselves. This is described in further detail below with reference to FIG. 11.

As one example, an ORB 1100 is responsible for dispatching methods on a given thread of execution 1102. By extension, the ORB is responsible (at lest initially) for the setup of any execution contexts 1104 on that thread of execution. These execution contexts include, for instance:

1) A transactional context that identifies the transaction being performed and within which a piece of work is completed. The context is represented by a transactional unit of work and it has an identity and a state associated therewith. By associating the transactional context with a thread of execution, anything running on that thread of execution knows that it is inside the context of that transaction.
2) A security context that provides a set of credentials that represents some principles or some users and those credentials are associated with the thread of execution. This provides an indication of the principle or user that is requesting this piece of work.
3) A performance management context which is associated with workload management for that thread of execution. It describes the policies that are used to allocate resources to achieve the best performance.

In one embodiment, the ORB attaches the different contexts (e.g., transaction, workload management and security) by using a set of services in OS/390 or MVS called context services. In particular, a control block called a work context is provided by the context services. For example, a set of application programming interfaces are used that allow the ORB to associate the context(s) with the current thread of execution. This is called a context switch, which enables a context to be switched onto a thread or switched off of the thread. It is up to the individual work manager (the ORB in this instance) to set inside the context the correct identities, tags, names or whatever is needed to represent those contexts. Then, as the work unit (the thread of execution) flows across different environments, the resource managers come to the work context to find the data, which is located at architected places within the context. Context services is further described in "OS/390 MVS Planning: Workload Management," IBM Pub. No. GC28-1761-07 (March 1999); "OS/390 MVS Programming: Workload Management Services," IBM Pub. No. GC28-1773-06 (March 1999); and "OS/390 V2R5.0 MVS Programming: Resource Recovery," IBM Publication No. GC28-1739-02 (January 1998), each of which is hereby incorporated herein by reference in its entirety.

Although the ORB initially sets up the contexts, it is possible for the container, since it is on the dispatch path to every method, to be able to change or manipulate those contexts based on additional policies at the container. As one example, the container can switch from one transaction (e.g., Tran 1) to a new transaction (e.g., Tran 2).

In one example, in order for the container to delegate responsibility for performing certain functions (e.g., prepare to commit, commit, locking, logging, etc.) to one or more resource managers, the resource manager(s) also has to be aware of the transactional contexts. The manner in which this is accomplished is described below.

In one example, when the container is initialized (initForReactivation), the container initializes a connection object 1108, which is used to couple container 1106 with a resource manager 1110. In particular, the connection object has been linked with a DLL with a specific version of a resource manager attachment 1112, e.g., a DB2 attachment called RRSAF. Thus, when the container is being initialized, it initializes the connection object and drives an initialize method on this connection object. The connection object is attached to the system's management repository, which indicates which resource(s) are to be attached to this container. In this example, container 1106 is to attach to a particular DB2 subsystem, called XYZ.

In one embodiment, the attachment of the container to DB2 is performed using an API called "Identify". Thus, the connection object calls the "Identify" piece of code, which is DB2 supplied. DB2 receives the call and determines that it is an identifier over the RRSAF package. Thus, DB2 sets up an RRSAF control structure 1114, in this case, on task 1102.

With the Identify protocol, DB2 knows what specific threads are going to be talking to DB2. Thus, when a thread of execution comes across, DB2 looks that thread up and for that thread goes over to the context and finds out what transaction it is in. At that point, DB2 performs similarly to the containers.

DB2 also knows that by attachment through RRSAF that DB2 has some special exits. DB2 registers its interest in this transaction using resource recovery service 1116, which is tracking the transaction. (RRSAF is a part of that service.)

In addition to the above, the object transaction service 1118 (OTS) coupled to RRS also delegates its responsibilities down to RRS. OTS delegates its responsibilities down to RRS through a set of RRS interfaces (e.g., prepare, commit, write log data interfaces, etc.). Thus, in accordance with one aspect of the present invention, there is a delegation of responsibilities in one direction (axis) through the resource managers and in the other direction (axis) to the underlying operating system.

Figure 12A:
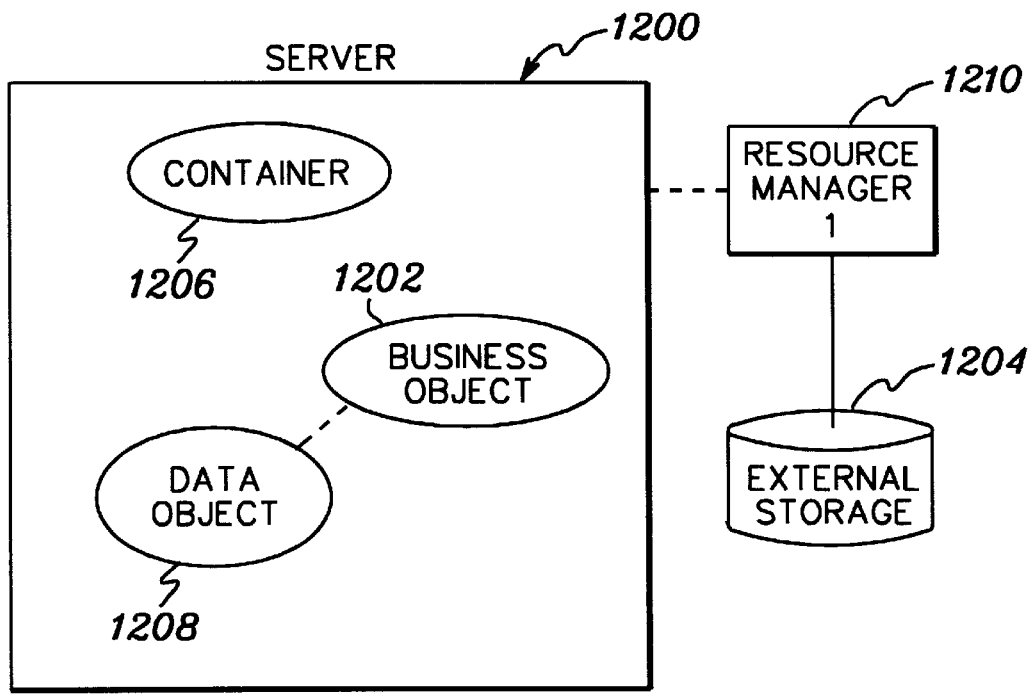
FIG. 12a depicts another example of components of a server instance, in accordance with the principles of the present invention.

Within a distributed object server instance 1200 (FIG. 12a), managed or business objects 1202 are often persistent. That is, they are composed from data residing in one or more databases 1204. In a legacy environment, where there exists a variety of data sources, such as DB2, IMS and CICS (all offered by International Business Machines Corporation, Armonk, N.Y.), as well as various other data sources, there is a need to extract data from these resource managers and use the data to provide a persistent object with its essential state.

In order to accomplish this composition, and also hide the specific location and schema of the data being used to populate the object, at least one container 1206 and at least one data object 1208 are used. The container facilitates the attachment from the object server instance to a resource manager 1210, so that the resources from database 1204 managed by resource manager 1210 can be used to populate the object. The mapping of the specific state in the object to specific rows or records in the database is performed in data object 1208. The data object is a helper object in the object server instance runtime to assist in the management of the persistent state of the business object and to facilitate the movement of data back and forth from the business object to the database over the attachment being managed by the container.

Typically, the containers and the data objects are built with a constraint which limits their attachment and interaction with exactly one type of resource manager. The problem with this approach is that in many cases there is a need to compose a business object for multiple and different types of backend resources. For example, a particular business object of type "employee" may obtain the employee serial number and name from DB2, but obtain its salary attributes from a VSAM record or from an existing IMS transaction program. If this is the case, a typical solution involves either performing composition in the application through multiple business objects, each one being managed by a separate container; or by building a composed data object by delegating the function to multiple other business objects, again, where each one is managed by a separate container and where each one is associated with its own subordinate data object.

This approach leads to performance degradation not only because of the additional pathway of dispatching multiple objects over several containers, but also in terms of additional memory being used to hold the additional objects. In the worst case, where the application is forced to deal with the composition, the application developer becomes aware of the specific data type, location, schema, and composition, which constrains the design of the application in a way as to jeopardize portability and reuse of the business object itself. Additionally, requiring multiple containers to be used introduces systems management burden that could otherwise be avoided. Also, the development process used to create the multiple data objects and the processes under which these objects are packaged together to form the support for a single business object becomes unnecessarily complex and costly.

Figure 12B:
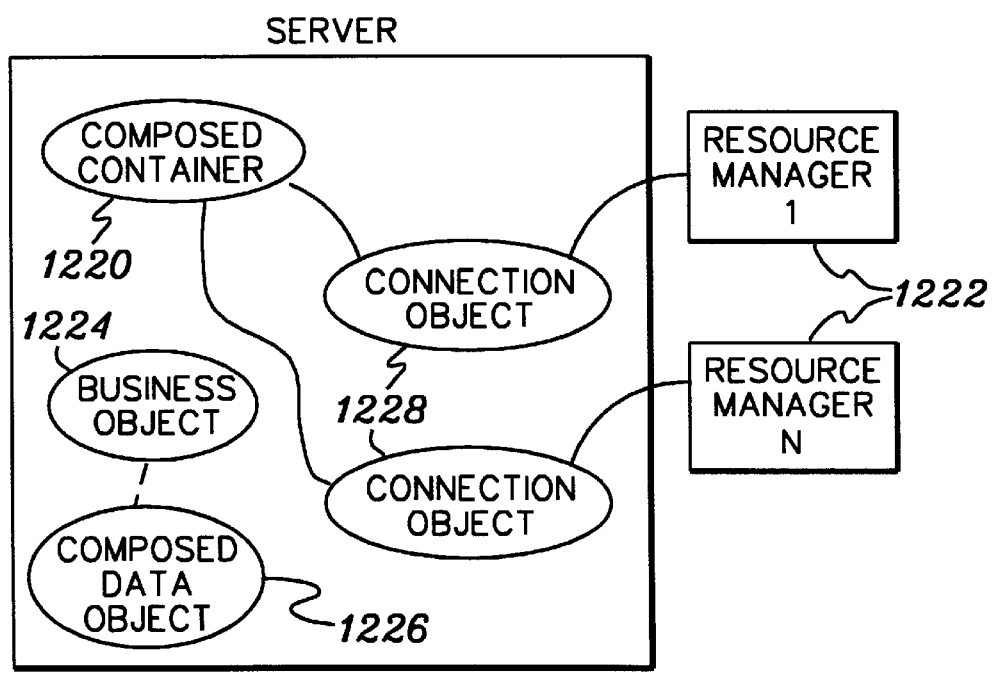
FIG. 12b depicts one example of composed containers arid composed data objects used in accordance with the principles of the present invention.

Thus, in accordance with one aspect of the present invention, composed containers and composed data objects are introduced. A composed container 1220 (FIG. 12b) is one in which multiple and different resource managers 1222 can be configured and driven. The composed container manages a plurality of attachments and connections to all of the resource managers required or desired to support the composition of a single business object 1224. The corresponding data object 1226 is also composed and supports the various request level interactions to the various backend resources required or desired to supply the business object with its essential state. This approach simplifies the install and configuration of containers; simplifies and consolidates request level interactions in a single data object; improves pathlength because multiple and separate dispatches across multiple containers are eliminated; and provides the application developer a cleaner more direct mapping of the runtime objects in the application model being implemented.

In one embodiment, composed container 1220 is implemented using a plurality of connection objects 1228. Each connection object 1228 is associated with and coupled to a resource manager 1222. For example, one connection object is associated with Resource Manager 1 (e.g., DB2) and another is associated with Resource Manager N (e.g., IMS).

In one embodiment, connection objects 1228 are defined using connection specifications, which are created using, for instance, user interfaces provided by component broker runtime services. A systems administrator, as one example, defines a connection specification for each resource manager to be connected to a container. The connection specification identifies a set of information needed to connect to the resource manager. For instance, for DB2, it includes the DB2 subsystem name.

When a connection specification is defined, it has a type (e.g., a DB2 connection) and it has a connection object class that is to be used. In addition, for the particular type of connection, it includes whatever information is necessary for the container to attach or connect to the backend resource. The connection specifications and associated information are stored in a database, such as a systems management repository coupled to the server instance. The systems management repository also includes information related to the containers.

When a container is being initialized (e.g. initForReactivation), the container is provided with a list of one or more connection specifications. The container selects from this list those connection specifications representing resource managers to be connected to the container. Then, for each selected connection object, the container retrieves from the systems management repository any information relating to that connection specification. This information includes a connection object class name for each connection specification. As one example, the class name plus any specific information needed for the connection is passed to the container in a streamed format. The container then creates a connection object using the connection object class name and initializes the connection object with the data, such that the container can attach to the resource manager (e.g., DB2).

During initialization, the container drives an "init" method on the connection object. During "init", the connection object uses the DB2 RRSAF attachment (i.e., the piece of library code that has been linked with this connection object) to connect with the resource manager. For example, the connection object uses the DB2 subsystem name to connect to the DB2 resource manager. The particular implementation for the connection object is supplied by each resource manager.

In one embodiment, each connection object class is hard-wired for a specific type of resource manager. Each connection object has a number of interfaces to be implemented including initialization, in which the attached resource manager is to perform whatever processing is required to attach the server address space to the resource manager address space; identify transaction, in which the connection object is responsible for performing any processing required to set up a context for performing work under a specific given transaction (e.g., in DB2, there may be a need to create a logical DB2 thread of execution that is tied directly to the current transactional unit of work); and uninitialization and unidentify transaction, which are used to perform cleanup processing for their respective events.

In one embodiment, when a container sees a transaction for the first time, the container registers a synchronization object with OTS and also informs each connection object that the transaction is to be identified. Depending on the type of attachment, that connection object may or may not perform an action. For example, for DB2, the connection object creates a DB2 representative of a thread and signs the user on, so that DB2 knows about the user. In particular, in the connection object, the transaction is identified and DB2 creates a thread and anchors one of its structures onto the RRS context. Thus, when a data object accesses DB2, the data object pulls its own data out of the context.

In addition to the above, one or more composed data objects 1226 are also provided. In particular, each composed data object is made to understand multiple different resources. That is the data object can include, for instance, SQL statements, as well as CICS and IMS calls, or it can delegate down to, for example, a specific DB2 sub data object.

In one embodiment, in order to create a composed data object, an initialize method is driven by the container. During this initialization, one or more request helper objects, built by the connection objects, are handed to the data object. Each request helper object contains information the data object may need to sustain a request to a particular resource manager. Thus, the container hands a list of helper objects to the data object and the data object selects those that are needed (e.g., one for DB2, one for CICS, one for IMS, etc.). In the helper object is the name of the appropriate connection specification.

Described in detail above are server instances, which are used to manage objects located within those server instances. In one aspect of the present invention, a server instance can be replicated either on the same system image or across multiple system images. One example of server instances replicated across multiple system images is described with reference to FIG. 13a.

Figure 13A:
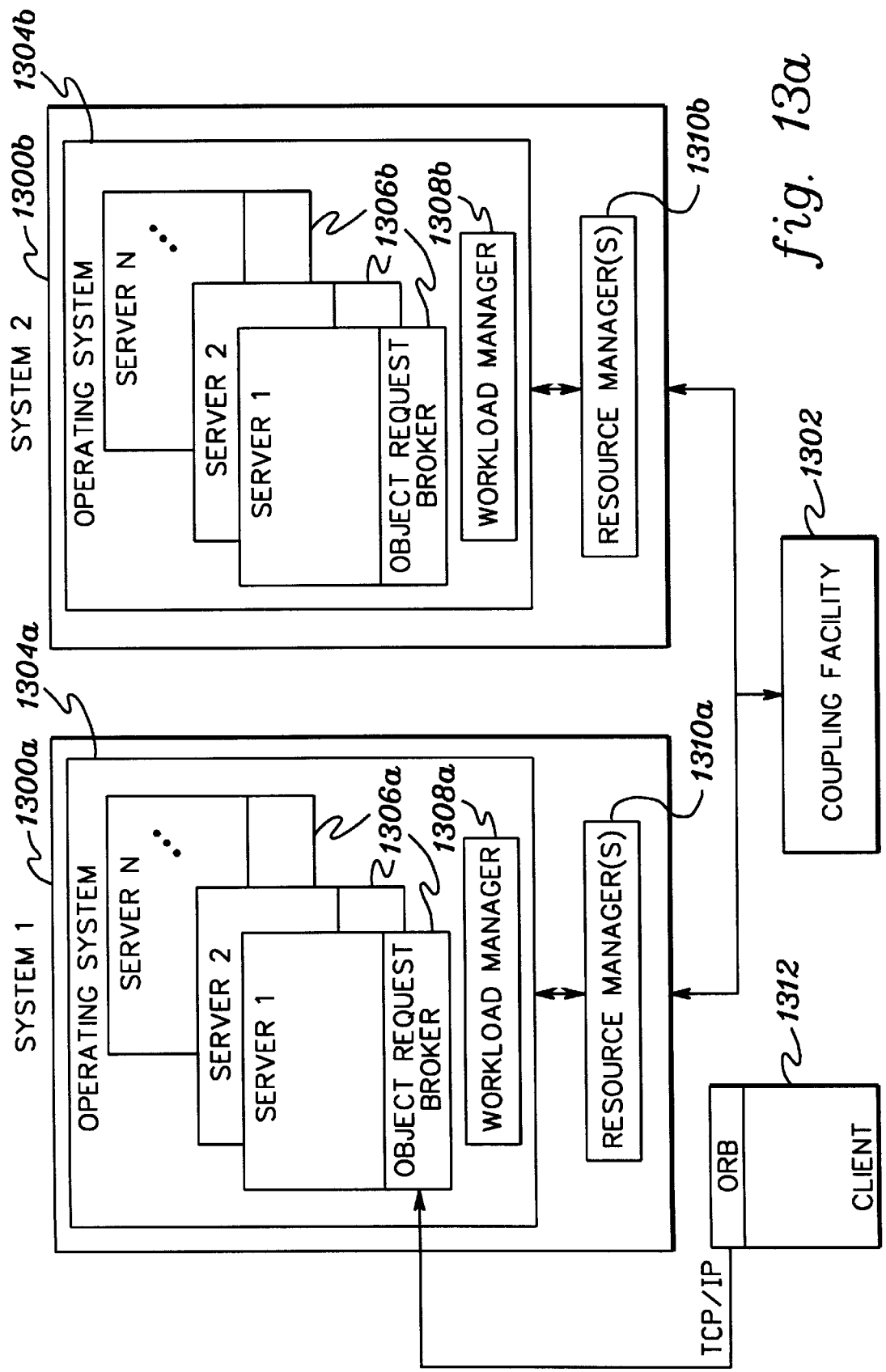
FIG. 13a depicts one example of a multisystem environment, which uses the capabilities of the present invention.

Depicted in FIG. 13a are two server systems, SYSTEM 1 (1300a) and SYSTEM 2 (1300b) coupled to one another, via a coupling facility 1302, to form a clustered sysplex configuration. Coupling facility 1302 (a.k.a., a structured external storage (SES) processor) contains storage accessible by the systems and performs operations requested by programs in the systems. Aspects of the operation of a coupling facility are described in detail in such references as Elko et al., U.S. Pat. No. 5,317,739 entitled "Method And Apparatus For Coupling Data Processing Systems", issued May 31, 1994; Elko et al., U.S. Pat. No. 5,561,809, entitled "In A Multi-processing System Having A Coupling Facility, Communicating Messages Between The Processors And The Coupling Facility And Either A Synchronous Operation Or An Asynchronous Operation", issued Oct. 1, 1996; Elko et al., U.S. Pat. No. 5, 706,432, entitled "Mechanism For Receiving Messages At A Coupling Facility", issued Jan. 6, 1998; and the patents and applications referred to therein, all of which are hereby incorporated herein by reference in their entirety.

Each system is executing an operating system image 1304a, 1304b, respectively, such as the OS/390 or MVS operating system offered by International Business Machines Corporation (Armonk, N.Y.). As one example, operating system 1304a controls execution of one or more server instances 1306a, which are replicated across the system as servers 1306b. For example, Server 1 of System 1 is replicated in System 2 as Server 1.

Additionally, each operating system includes or is coupled to a workload manager 1308a, 1308b, respectively. Each workload manager balances workload among the systems of the sysplex in order to achieve optimal load balancing and system performance. One example of a workload manager is described in "OS/390 MVS Planning: Workload Management," IBM Pub. No. GC28-1761-07 (March 1999), and "OS/390 MVS Programming: Workload Management Services," IBM Pub. No. GC28-1773-06 (March 1999), each of which is hereby incorporated herein by reference in its entirety.

Further, coupled to each operating system image is one or more resource managers 1310a, 1310b, respectively. Each resource manager owns and controls the data associated with that manager, as described above.

One or more clients 1312 send requests to the server instances via, for instance, TCP/IP connections.

Figure 13B:
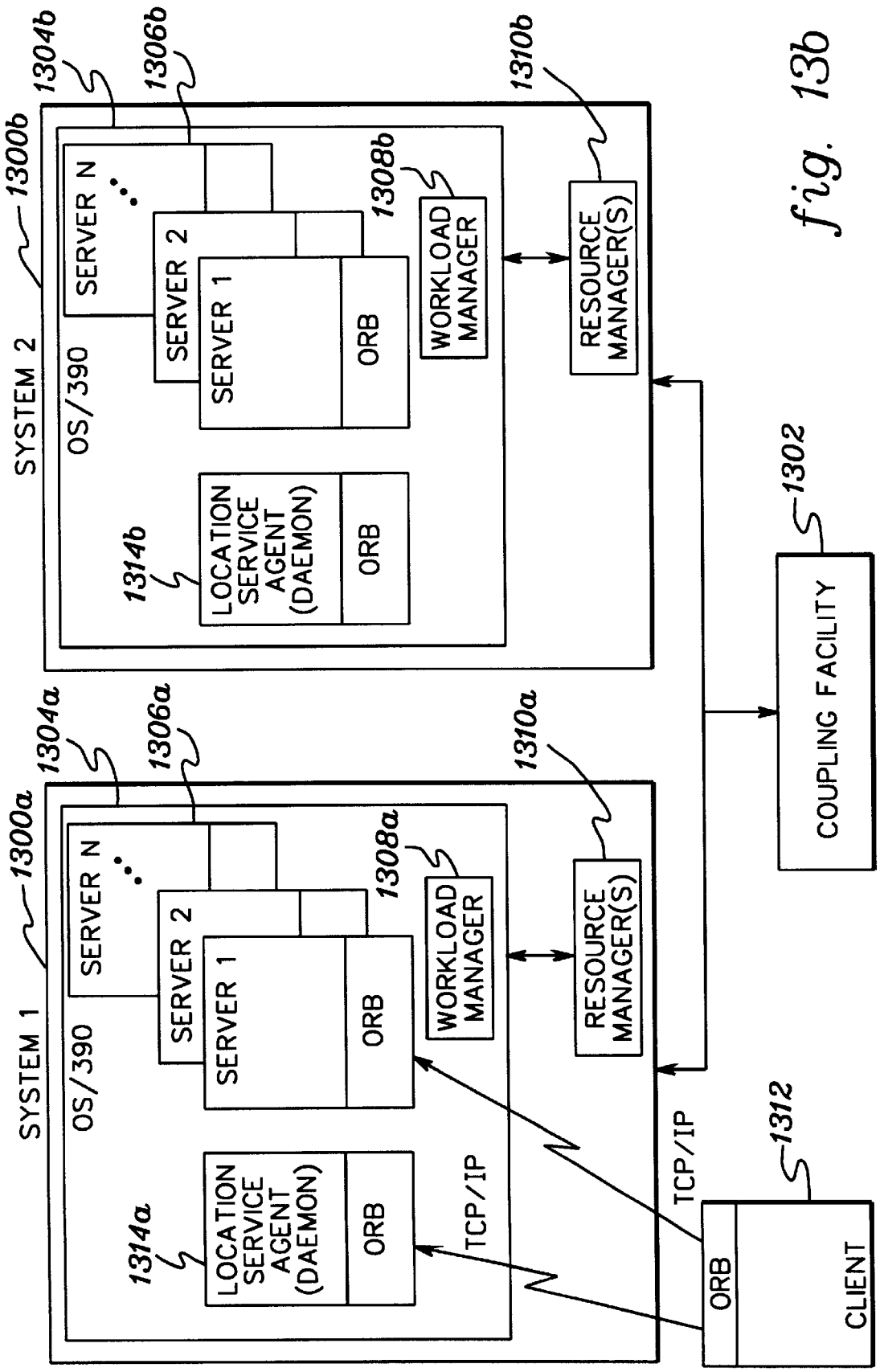
FIG. 13b depicts the multisystem environment of FIG. 13a with the addition of location service agents, which are used in accordance with the principles of the present invention.

In order to select an appropriate server instance to perform a task, when that server instance has been replicated within a given system and/or across systems in a sysplex, one or more daemons are used, in accordance with one aspect of the present invention. In one example, a daemon 1314a, 1314b (FIG. 13b), respectively, has been added to each system. These daemons are location service agents, which are used to balance workload, as described below. In particular, the location service daemons facilitate workload balancing of client communication sessions to replicated object server instances based on the industry standardized CORBA IIOP (TCP/IP) protocol with no proprietary extensions being required either in the communications protocol (e.g., IIOP) or in the client-side runtimes establishing communication with the workload managed server instance.

Within the IIOP protocol, there exists an architected control flow that occurs when a client attempts to locate an object of interest in a distributed network. This control flow is defined by CORBA and is referred to as the "locate flow". There are three possible responses to this flow. The flow occurs to the server instance identified by the object reference used to identify the object, and the server instance responds with: 1) the object is here on the target server instance, 2) the object does not exist, or 3) the object is not here on the server instance, but it may be on another server identified by the new object reference being returned with this response. This third type of response is called a "location forward" reply. The client ORB on receiving the location forward type of reply issues another locate request to the server instance identified by the returned object reference.

In accordance with one aspect of the present invention, the location forwarding mechanism is used in a unique way to cause the balancing of client communication endpoints across a set of replicated server instances. The mechanism uses, for instance, direct and indirect object references. A direct object reference is one in which the actual network address of the subject server process (address space) is bound. An indirect object reference is one in which the network address of a location service agent or daemon is bound. It is assumed for this aspect of the present invention that first class references to distributed objects are indirect. Thus, any reference obtained by a distributed client application is indirect and results in a locate request to the location service daemon when it is used.

Figure 14:
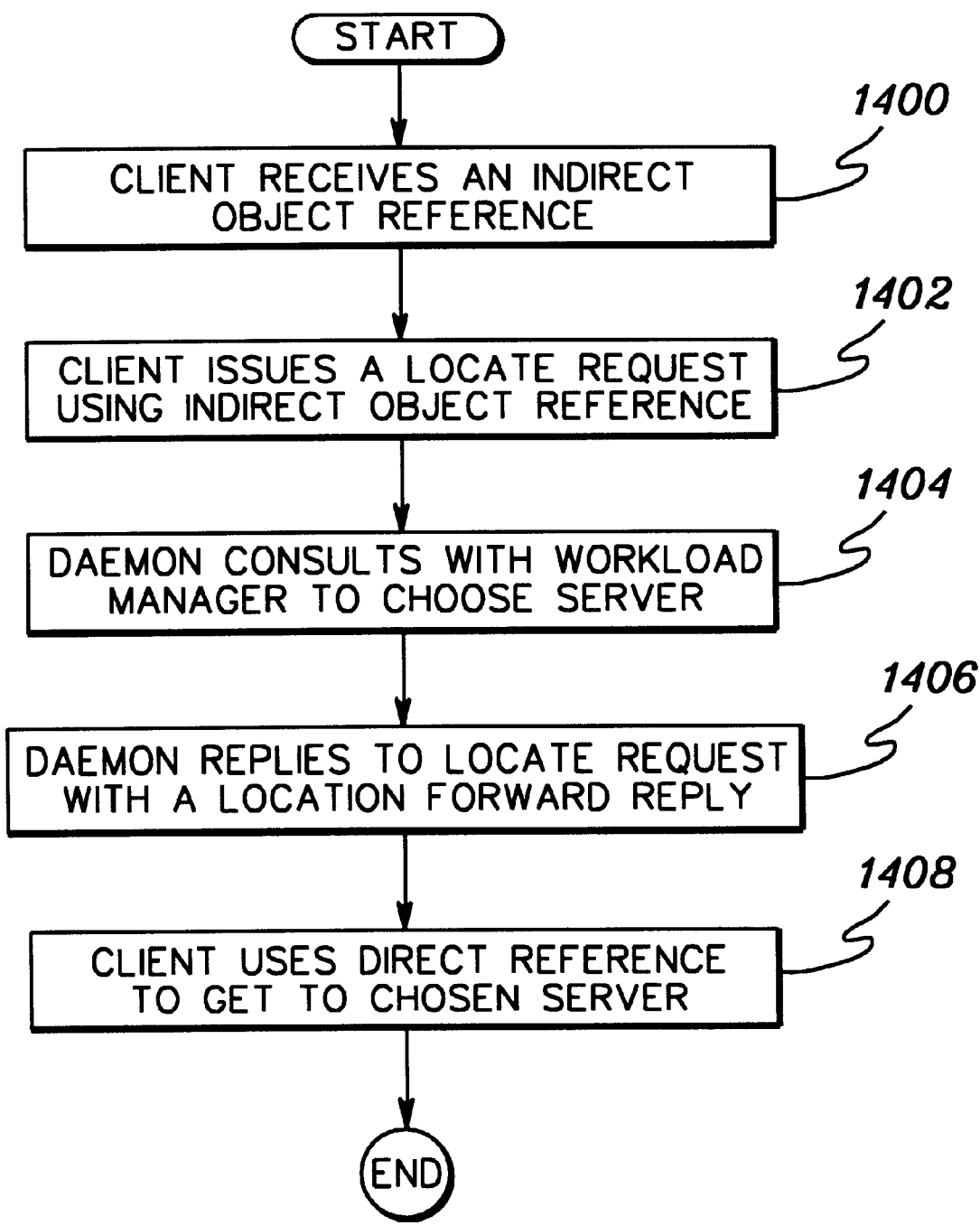
FIG. 14 depicts one embodiment of the logic associated with selecting an appropriate server instance to perform a particular task, in accordance with the principles of the present invention.

One embodiment of the logic used to select an appropriate server instance to perform a task is described with reference to FIG. 14. Initially, the client obtains an indirect object reference via, for instance, a name service or as a result of an unrelated object method request returning the reference as an output parameter, STEP 1400. Then, the client issues a locate request to the daemon using the indirect object reference, STEP 1402.

Thereafter, the daemon, masquerading as an actual object server instance, consults with the workload manager on its system and asks the workload manager to choose an available server instance running somewhere in the sysplex, so that this client communication can be established, STEP 1404. The workload manager selects a server instance based on its assessment of available resources and capacity across the configuration and returns the reference information of the selected server instance (e.g., Server 1 of System 1 or Server 1 of System 2) to the daemon. The daemon then replies to the locate request with the location forward reply passing the new reference of the actual server instance that has been selected, STEP 1406. This returned reference is a direct reference so that the next locate request, by the client, is delivered to the actual selected server instance rather than to the daemon, STEP 1408. In this case, the selected server instance responds to the locate request with "an object is here" reply.

In order for the location service agent to be able to have the workload manager select the appropriate server instance to perform a task, the agent first registers itself with the workload manager as a daemon. This has specific meaning to the workload manager. In particular, the workload manager expects the daemon to come back to the workload manager to request the workload manager to locate a particular environment name.

In order to register with the workload manager, the daemon uses various workload management interfaces to obtain the best location of a server instance that has registered with the workload manager. It is the server instance (e.g., a control region, as described below) that registers with WLM as a "work manager." The daemon asks WLM to find an appropriate "work manager" under a given class of name, and WLM returns the location.

The use of replicated server instances is optimal when all of the server instances have equal and shared access to the resources required by the application server instance. Two specific advantages realized when this replication is enabled are 1) reduction of single points of failure, 2) balanced performance and scalability. Further, the 390 system design asserts that the optimal place to make workload management decisions regarding the placement of inbound work over a set of replicated server instances is at the sysplex facility where all pertinent information required for making an intelligent decision of the placement of the workload exists and can be evaluated in real time as the work arrives to the configuration. In addition, in a distributed system, where communication protocols and the runtimes implementing those protocols are standardized to allow the communication to occur across a set of clients and servers provided by different vendors, there is an advantage in making workload management decisions at the server side of the communication runtime so that proprietary workload management based extensions are not required in the various client side runtimes provided by all of the various vendors.

In accordance with another aspect of the present invention, workload balancing across a set of replicated servers is performed such that it occurs at well known boundaries within the execution of an application. This is to protect transient state associated with a running application. In particular, within most application server instances, there exists transient state associated with a running application which is tied to and managed from the physical address space or server structure servicing the application. This transient application state in such systems is deemed to be valid and coherent within some prescribed and well known unit of application activity, such as within a transactional unit of work. Examples of such a state include, but are not limited to, updates that have been made to objects or data resident in the virtual memory cache of the address space and are pending with respect to the persistent home of the data on some physical medium, such as disk. Typically, such pending updates are pushed to their eventual home on disk at the end of the prescribed unit of application activity; for example, at the end of the current transactional unit of work. Other examples of transient state include control information or meta data used to govern the execution of the application, such as state/transition policy or state data reflecting the current state of resources being used by the application, such as an open file or communication device.

Within a distributed system, and within a prescribed unit of application activity, there may be several interactions from a given client either directly to a target server instance where such application state is being held, or through multiple other intermediate middle tier server instances to the target server. All requests to the target server's application state under a given application unit of activity is directed to the same physical instance of the server's address space in order to ensure proper execution of the distributed application. If, however, the target server instance is replicated across the physical systems in a clustered configuration, and access to the replicated server instances is governed by workload management policy, sessions from intermediate nodes in the distributed network, established to the target server instance under a common unit of application activity may be balanced or spread to different physical server instances, thereby introducing errant behavior in the application. In other words, workload balancing across a set of replicated servers is to occur at well known boundaries within the execution of the application. Within those boundaries, a mechanism is used to ensure a temporary affinity to a specific server instance within a clustered system configuration is defined, recognized and enforced, so that any requests under the same unit of application activity from any node in the distributed network arrives at the same physical server instance in the configuration.

To ensure a given transactional unit of work arrives at the appropriate server instance within a clustered system configuration, a high performance multisystem registration of transaction interest and the CORBA compliant IIOP related location forwarding mechanism are used.

Figure 15:
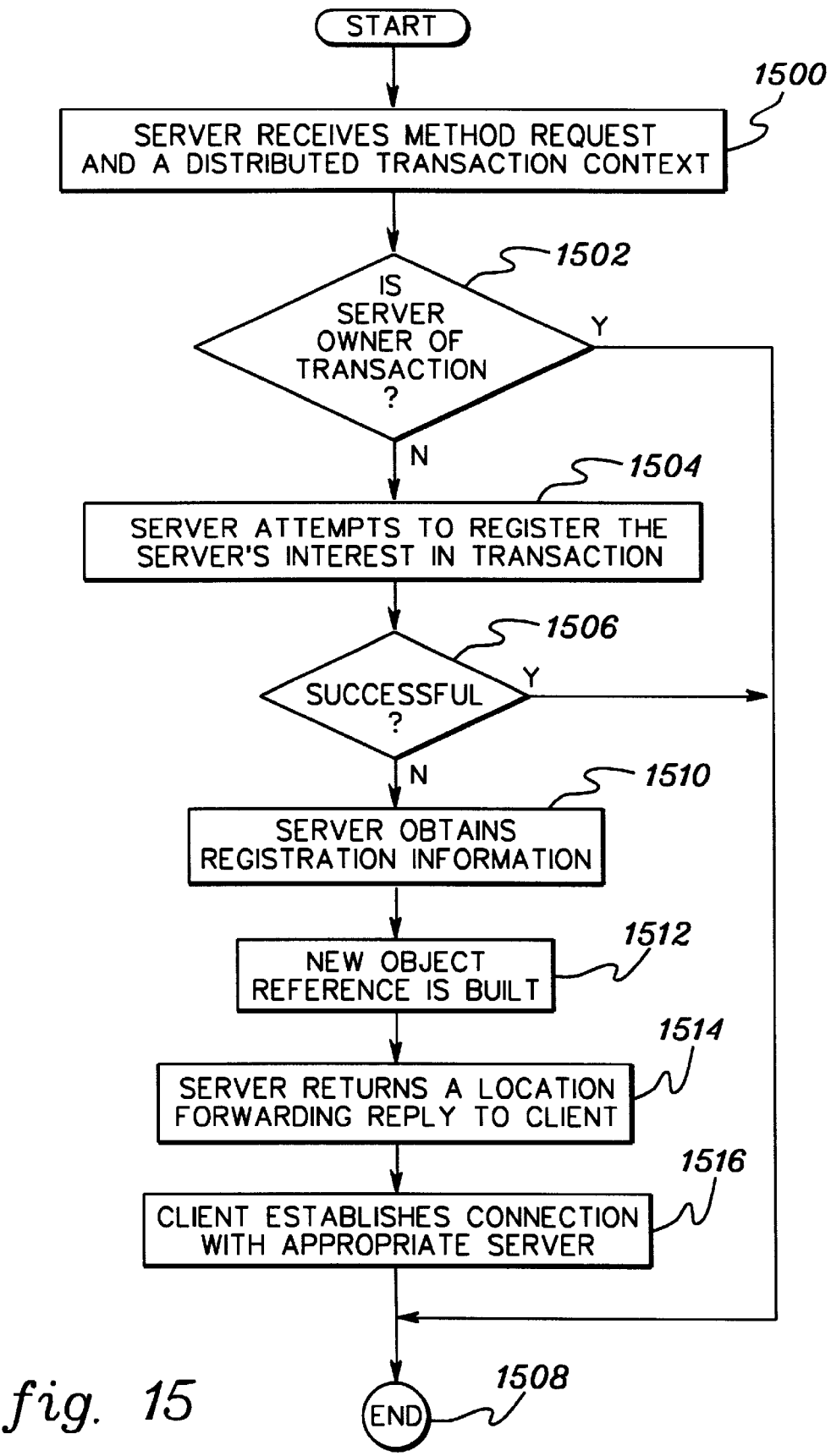
FIG. 15 depicts one embodiment of the logic associated with ensuring that a given unit of work arrives at an appropriate server instance, in accordance with the principles of the present invention.

One embodiment of ensuring a given unit of work arrives at an appropriate server instance is described with reference to FIG. 15. When a method request arrives at a server instance, and it is accompanied by a particular unit of work, such as a distributed transactional context, STEP 1500, a determination is made, by the ORB, as to whether the server instance receiving the request is the owner of the transaction, INQUIRY 1502. In other words, the server instance makes a local decision as to whether it already owns responsibility for the inbound transaction. In one example, this determination is made by checking a registration table located within the coupling facility coupled to the server instance or within memory of the server instance.

Should the server instance own responsibility for the inbound transaction, then the server instance handles the request.

If the server instance determines that it is not the registered owner of the transaction, it attempts to register the server's interest in the inbound transaction, STEP 1504. This registration occurs, for example, at the coupling facility and is performed in an atomic fashion by using, for example, a Global Resource Serialization (GRS) global enqueue (ENQ). GRS is described in "OS/390 MVS Planning: Global Resource Serialization," IBM Pub. No. GC28-1759-04 (March 1998); "OS/390 MVS Programming: Authorized Assembler Services Guide," IBM Pub. No. GC28-1763-06 (March 1999); "OS/390 MVS Programming: Authorized Assembler Services Reference," IBM Pub. Nos. GC28-1764-05 (September 1998), GC28-1765-07 (March 1999), GC28-1766-05 (March 1999), and GC28-1767-06 (December 1998); "OS/390 MVS Programming: Assembler Services Guide," IBM Pub. No. GC28-1762-01 (September 1996) and "OS/390 MVS Programming: Assembler Services Reference," IBM Pub. No. GC28-1910-1 (September 1996), each of which is hereby incorporated herein by reference in its entirety. The registration information includes, for instance, specified user data (e.g., a UUID) in the request, which identifies the specific server instance within the configuration associated with the specified transaction.

Thereafter, a determination is made as to whether the registration was successful, INQUIRY 1506. That is, if no other server instance replica has registered its interest in the same transaction, then registration succeeds and that server is deemed the appropriate server instance for the unit of work, STEP 1508. If some other server instance replica has registered its interest in the transaction, the attempt to register fails. In this case, a GRS operation (e.g., a GQSCAN) is initiated to obtain the registration information, which includes the identity of the server instance that is registered for the transaction and the transaction id, STEP

1510. When that information is returned, a new object reference is built using the location of the registered server instance and the current object key for the object being dispatched, STEP 1512.

Subsequently, the server instance returns a location forwarding reply to the client, STEP 1514. The CORBA protocol allows the location forwarding reply to be returned on any distributed method request sent to a given server. The client ORB then uses the new object reference to establish an IIOP connection to the appropriate server instance within the sysplex, STEP 1516.

By using the above protocol, advantageously, if a connection fails while a transaction is being processed, the connection can be reestablished without aborting the transaction.

As described above, the ORB provides low-level connectivity capabilities that allow objects relate to one another. However, in order to enable applications and other components to be written in ORB-based environments, other functionalities are provided. According to the Object Management Group (OMG), these functionalities are to be defined as separate modular components above the ORB level. One of these functionalities includes a naming service, which allows objects to refer to other objects by name. In particular, the OMG Naming Service allows human readable names to be assigned to objects, so that the names can be later used to find the objects.

Names exist and are unique within a naming context. Specifically, a name is bound to an object within a naming context (i.e., a binding). A naming context is itself an object, and thus, it can be bound with a name to one or more other naming contexts.

Figure 16A:
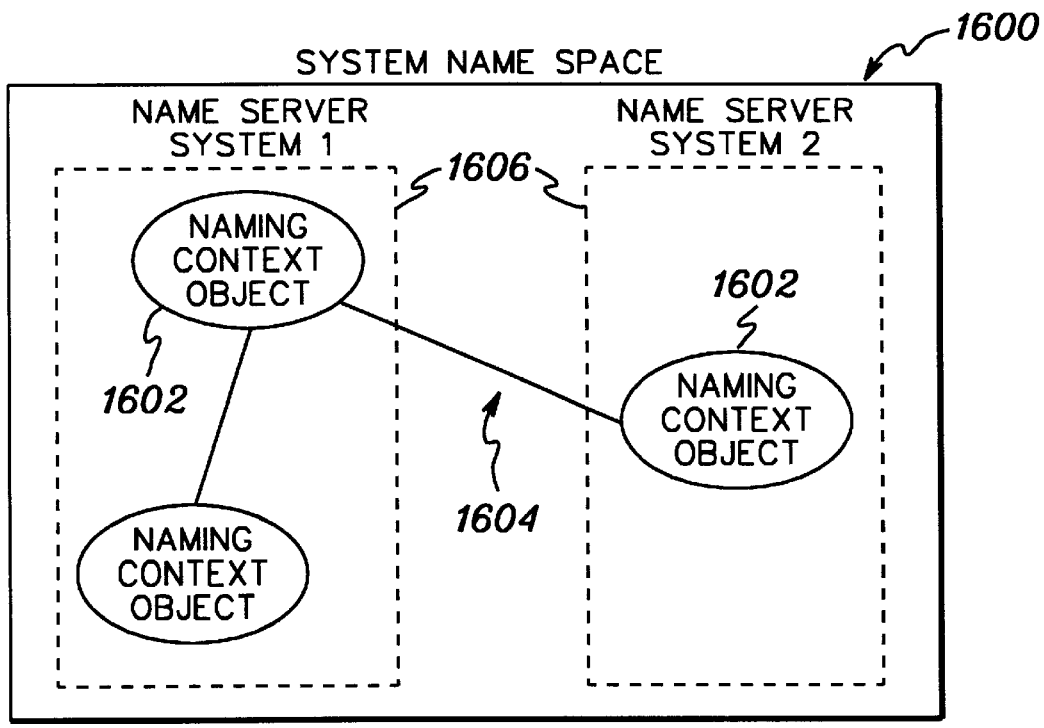
FIG. 16a depicts one example of a distributed name space, in accordance with the principles of the present invention.

The OMG Naming Service specification (based on CORBA) defines a system name space and a set of operators that can manipulate the contents of that name space. One example of a name space is depicted in FIG. 16*a* and described herein. A name space 1600 includes a plurality of objects 1602, referred to as naming context objects or naming contexts. Each naming context object includes at least one binding to another object. That binding maps a human readable name to an object reference which identifies the named object.

Figure 16B:
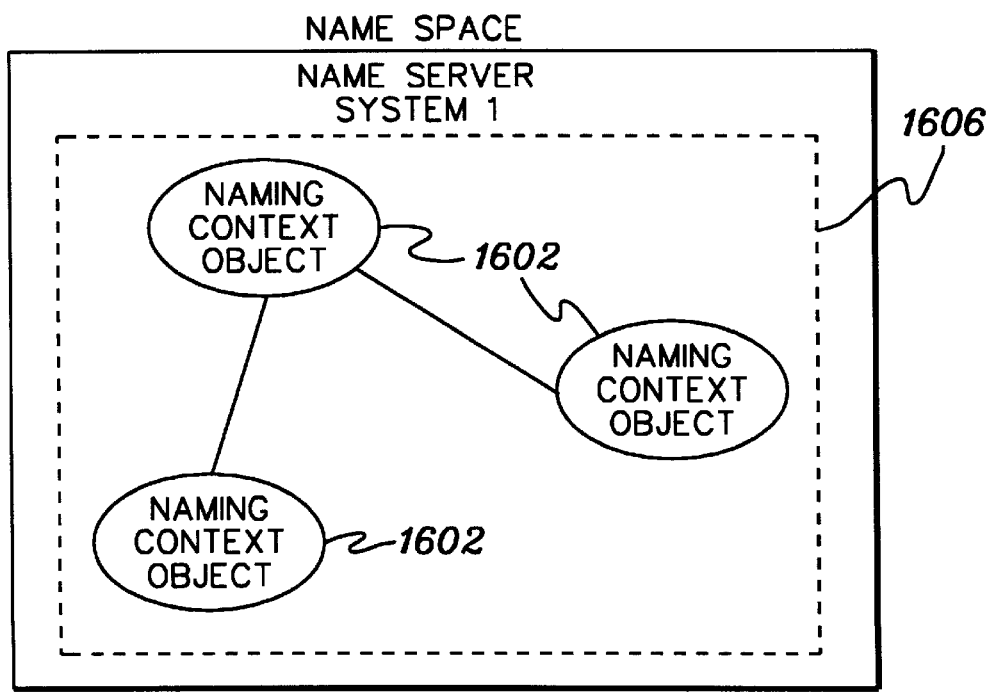
FIG. 16b depicts one example of a non-distributed name space, in accordance with the principles of the present invention.

A fundamental concept in the OMG Naming Service is that the name space is composed of naming contexts bound together to form a tree 1604. Since each naming context is itself an object, and thus, may be distributed, the name space may be distributed across multiple name servers across the distributed network. (As another example, the name space is not distributed (see FIG. 16*b*)).

Creating an association between two naming contexts is simply a matter of binding or associating the one context with a name into the other context, just like any other object. To be more specific, the name service provides two distinct interfaces for associating a name with an object. One is used to bind naming contexts to a parent naming context, and the other is used to bind non-naming context objects to a parent naming context.

Figure 17:
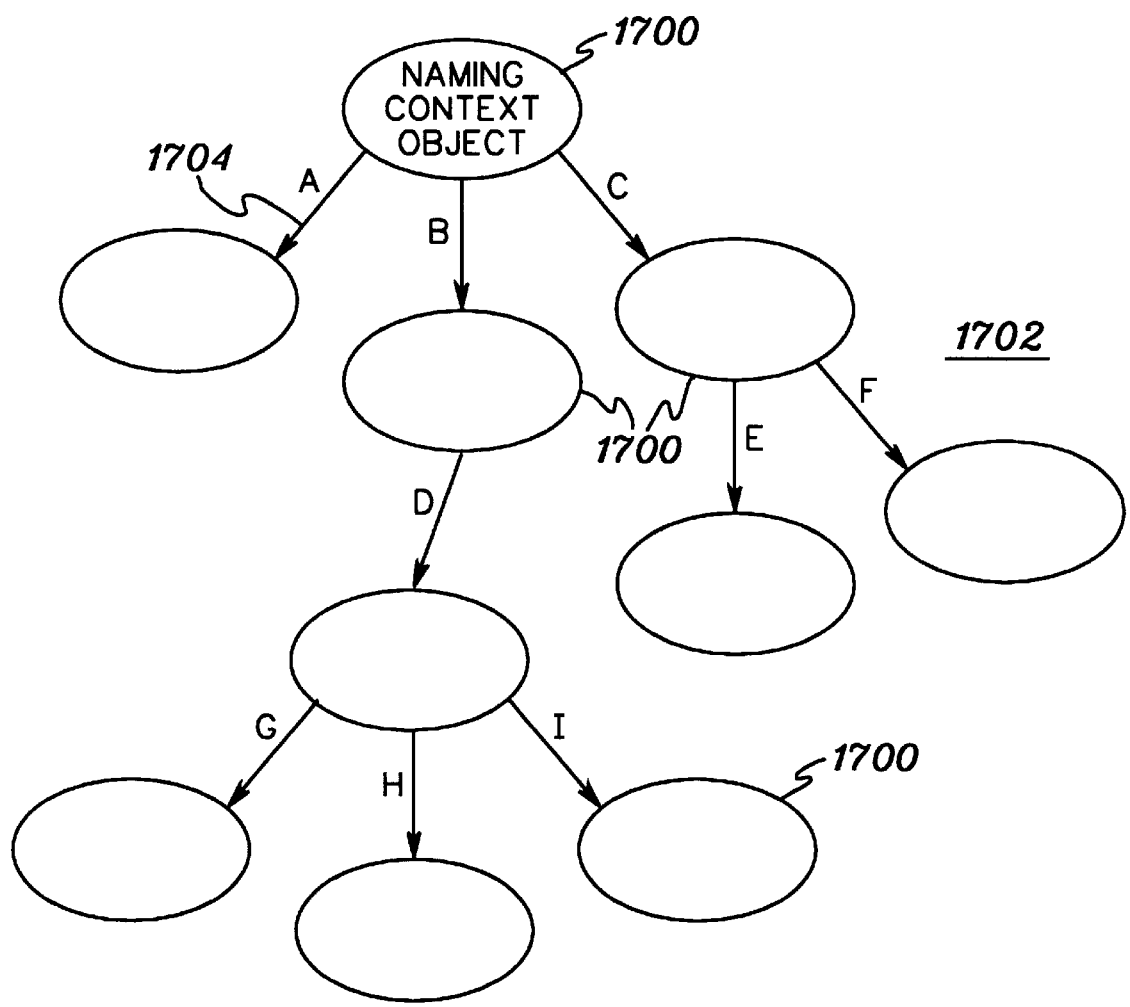
FIG. 17 depicts one embodiment of a hierarchy of naming contexts within a name space, in accordance with the principles of the present invention.

To further illustrate the structure of the name space and the placement of naming contexts within the structure, refer to FIG. 17. FIG. 17 depicts one example of a hierarchy of naming contexts 1700 within a name tree 1702. Note that the objects themselves do not have names. Instead their bindings 1704 have the names (e.g., A, B, . . . ). Therefore, an object name is by nature contextual and relative based on its placement within the tree. The name bound to the object exists within a given naming context.

One problem associated with conventional naming services is how to map bindings and naming contexts onto particular data models, such as the data model provided by the Lightweight Directory Access Protocol (LDAP)/X.500. (The LDAP protocol and the X.500 data model are industry standards provided by the XOPEN Group. Standards for X.500 include CCITT X.500 standards described in ITU Recommendations X.500-X.520; LDAP is described in IETF RFCs 2251–2256, both of which are hereby incorporated herein by reference in their entirety.) In particular, a need exists for such a mapping that is performed in a way that fully utilizes the semantics and structure of the underlying directory without resulting in an implementation that is intimately linked with the underlying directory technology.

In accordance with one aspect of the present invention, a solution to the above problem is provided that leverages the abstractions made available via object technology, along with the abstractions provided by component broker runtime services. The solution allows naming contexts and named bindings (described below) to be retrieved via a "single hop" even when the names are compound names. Single hop retrieval means that a resolve method, such as the CosNaming::NamingContext::resolve method, can locate the desired object with a single lookup to the underlying directory (e.g., the LDAP directory), as opposed to multiple lookups or multiple internal calls to resolve.

In addition to the above, this aspect of the present invention further improves performance by allowing naming contexts and named bindings to be handled in a consistent fashion, thereby reducing the number of local search queries required. Lastly, the implementation provides a structure that physically separates algorithms from specifics of the underlying directory technology.

In particular, in one embodiment, object specialization is employed, which allows objects in the name space to be treated as bindings. That is, a binding falls into one of three categories: a named binding used to represent a binding to an application object; a disjunction which represents points of discontinuity in the name space, as described further below; or a naming context that represents a naming context specialization.

Figure 18:
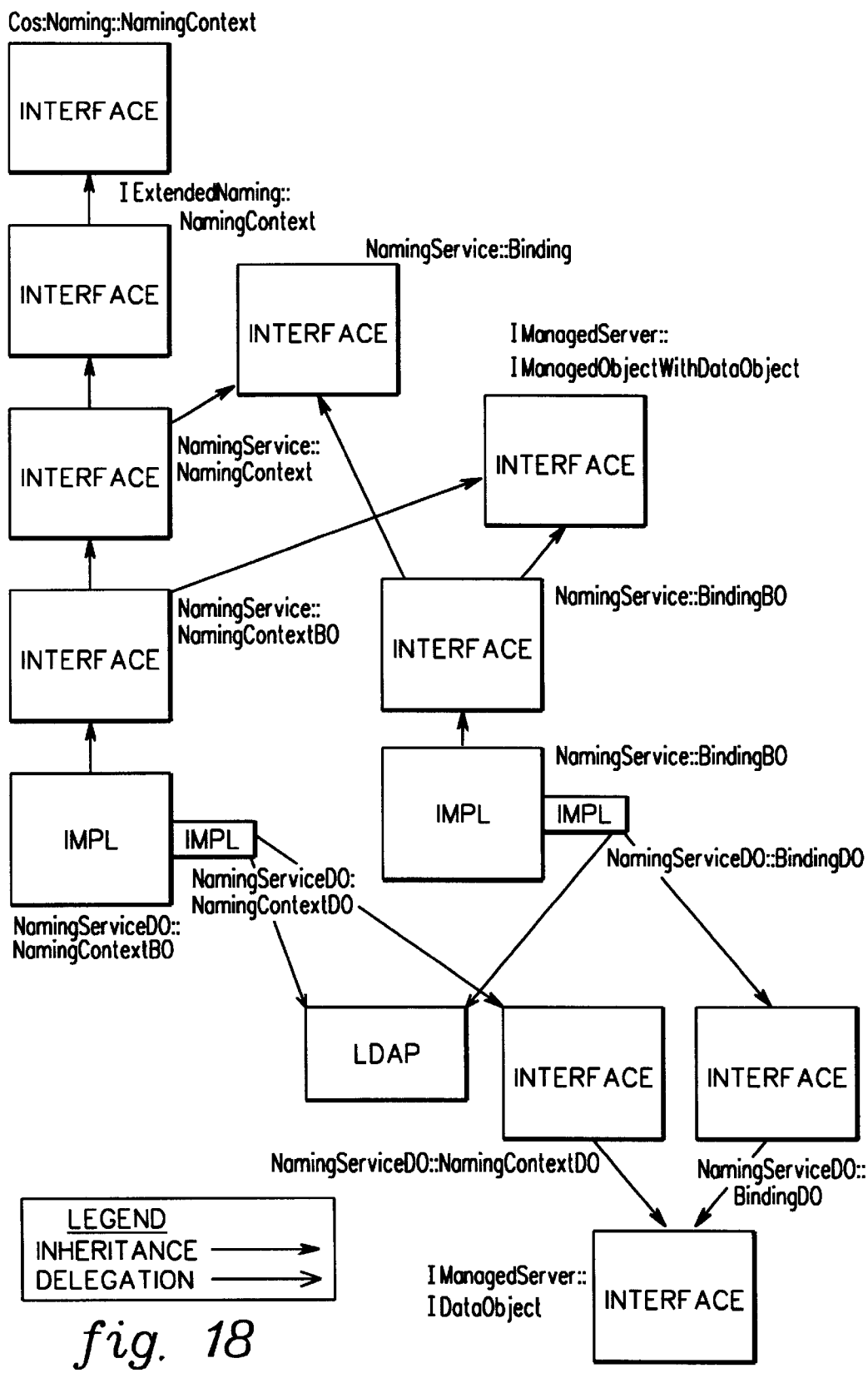
FIG. 18 illustrates one example of the inheritance and delegation relationships associated with the components of a managed object, in accordance with the principles of the present invention.

Both the naming context and binding classes are managed objects. As managed objects, they are broken down into a business object and a data object. The naming context business object includes the algorithms that manipulate an abstraction of the directory (e.g., LDAP), while the data object is responsible for managing the relationship with the underlying directory. One example of the inheritance and delegation relationships associated with the components of a managed object are depicted in FIG. 18. For instance, it is shown that NamingService::NamingContext inherits from both IextendedNaming::NamingContext and NamingService::Binding.

The data object uses the services of the underlying directory to create, delete, retrieve, and update entries that correspond to bindings and naming contexts. In accordance with one aspect of the present invention, the binding and naming context classes support the same attributes. Thus, the binding and naming contexts classes act as dual personalities for the same underlying directory data. A personality is defined as the object representation of the data. Since a naming context is a binding because of the inheritance relationship between them, the existence of that binding implies the existence of the naming context bound in the name space.

Defining the naming context in this manner allows efficient one hop lookup of objects that reside in a particular name server. Since each object that is included in the name space is represented by a binding object, the retrieval of a named binding of a given name requires a search against a single home collection—the binding home collection.

Each binding contains an attribute that represents the handle for its associated personality. In the case of bindings that represent naming contexts, the personality is a pointer to the object whose class is naming context, but whose primary key is the same as the binding, namely it is the full binding name. Thus, once the desired binding has been located, the view of the data backing that binding is transformed to the naming context class by returning the personality attribute. Thus, the dual personality of the same directory data is seen.

Furthermore, if the binding, represents a binding to an application object, the personality attribute is used to store a reference to the bound object. Thus, resolution of named bindings can be performed through a search on the binding home collection. The object that is bound to that named binding is contained in the personality field. In the case of bindings that represent naming contexts, the personality field contains a reference to an object of type naming context that is backed by the same data. This dual mapping is made possible, since each of the references to each of these objects contains the same key into the directory. This is described in further detail below. (In at least some of the pseudo-code described herein, only excerpts of the code are given, which are relevant to the surrounding discussion.)

One example of pseudo-code associated with an implementation of bind _new _context, which is used to create a new naming context and bind it into the name space is provided below. (In at least some of the pseudo-code described herein, only excerpts of the code are given, which are relevant to the surrounding discussion.)

```
NamingContext bind_new_context (in Name name)
    raises (NotFound,
        CannotProceed,
        InvalidName,
        AlreadyBound);
    If name is a compund name then
        ctx=executing naming context -> resolve (<c1; c2; . . .
            cn-1>) to find the naming context to which the new
            context will be bound.
        Invoke ctx->bind_new_context(<cn>) to invoke the
            bind_new_context on a simple name.
        Return
    Else name is a simple name
        Build the primary key string for the new NamingContext object to be created.
        Drive the constructor on the NamingContext home
            collection (createFromPrimaryKeyString) using this
            key.
        Set the binding type attribute to Naming Context.
        Save the IOR for this new NamingContext in the
            personality attribute.
        Return the NamingContext object.
```

The above procedure for bind_new_context creates a new object on a single home collection (e.g., the Naming Context home collection). By definition, the binding object is created at the same time because of the inheritance relationship. Thus, the creation of a naming context and the binding of the context into the name space are synonymous. Also note that this procedure first calls resolve so that it can operate on a simple name. In the above pseudo-code, invoke ctx->bind_new_context is a recursive call. At some point, a simple name is provided, and the logic then continues with the build of the primary key string. When all naming contexts associated with the compound name, as well as the object upon which bind_new_context is invoked, exist in the same name server, the new naming context object can be created with only a single hop to the resolve method.

Application objects are bound into the name space using the bind method. The following procedure describes one embodiment of the bind method. Note that the bind method can create a new named binding in a single hop while requiring only a single create operation:

```
void bind (in Name name, in Object obj)
    raises (NotFound,
        CannotProceed,
        InvalidName,
        AlreadyBound);
    If name is a compound name then
        ctx=executing naming context -> resolve (<c1; c2; . . .
            cn-1>) to find the target naming context to which the
            object will be bound.
        Note that the resolve operation will throw an exception
            if the specified name could not be found.
        Invoke ctx ->bind (<cn>, obj) to invoke the bind on a
            simple name.
        Return
    Else name is a simple name
        Build the primary key string of the new Binding object.
        Drive the Binding home factory by calling createFromPrimaryKeyString and passing the PrimaryKey.
            if the name already exists in Binding home collection.
                Throw AlreadyBound exception.
            else a new Binding object was created
                Set the personality attribute in the new Binding
                    object to obj.
        Set the binding type attribute to bound object.
        Return
```

In the above logic, a createFromPrimaryKeyString method is called. This operation is, for instance, a factory method on the home collection used to create the new persistent object of the type resident in that collection. It is the mechanism used to create persistent managed objects in the system.

At this point, new named bindings have been added to the name space. The mapping of these named bindings to the underlying directory allows for efficient retrieval with the resolve method. Only the home collection for bindings need be searched and the contents of the personality attribute of the retrieved binding returned. This works whether the binding represents a naming context or a bound application object.

One example of the procedure for resolve is as follows:

```
Object resolve (in Name name)
    raises (NotFound,
        CannotProceed,
        InvalidName);
    If the input name begins with '/' or '\' then
        Invoke resolve_initial_references to obtain the Naming Service Root.
        Redrive the resolve on the root naming context passing
            the remainder of the name.
        Return
    Create the primary key string representing the object in
        the Name Space to be found.
    Drive findByPrimaryKeyString on the Binding home collection passing the primary key string.
        If the Binding object was found then
            Return the bound_object attribute of the Binding
                object. This may either be a leaf node object or a
                NamingContext object.
```

Described in detail above is a capability that allows a new named binding to be created in a single hop, as well as allows multiple level names to be resolved in a single hop from the root naming context. This means that create and resolve, respectively, need to be called only once, when starting from the root. Additionally, a single repository (LDAP) is used as the persistent store for both the naming contexts and bindings. Further, the state of a binding is typed in order to indicate the type of binding.

Figure 19:
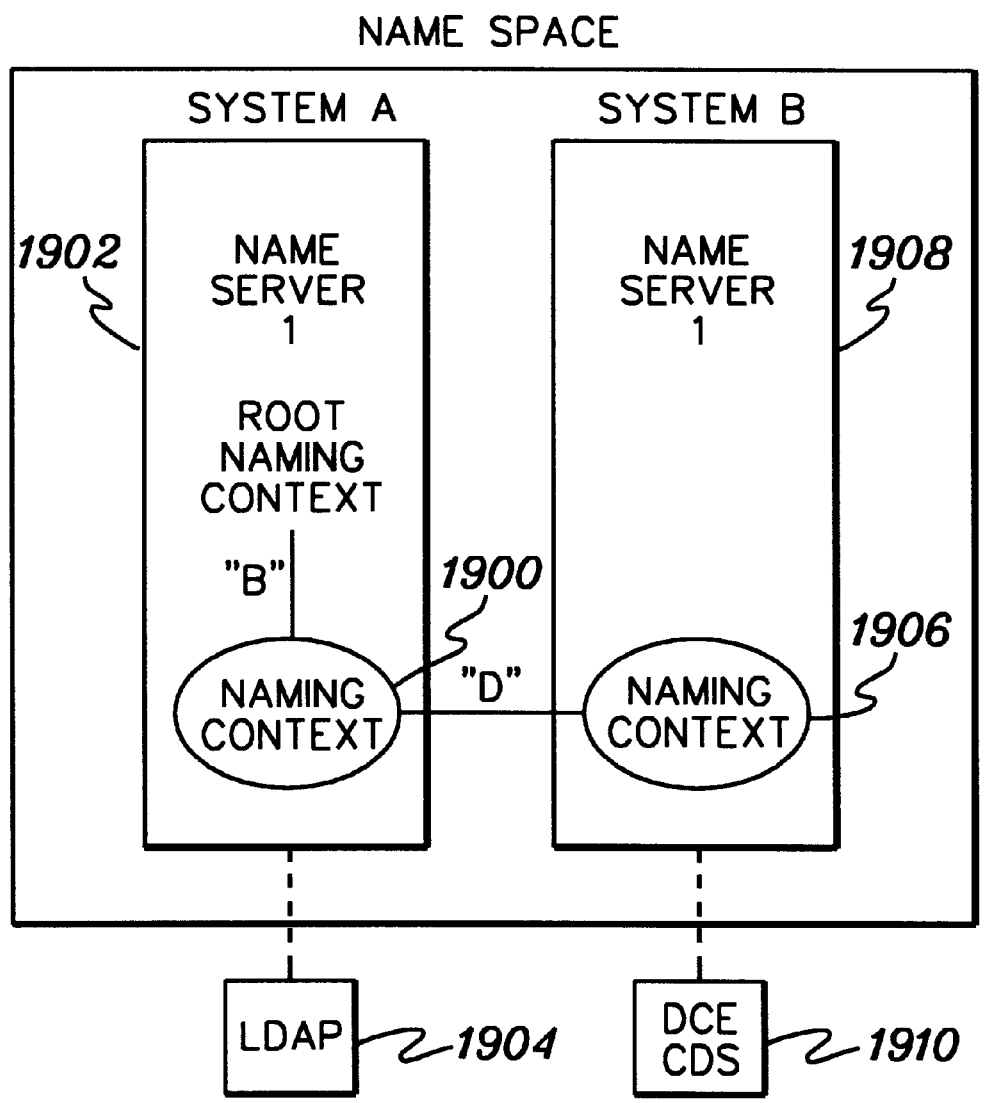
FIG. 19 depicts one example of a schematic illustration of different naming contexts being backed by different resources managers, in accordance with the principles of the present invention.

As described above, in constructing the name space, it is possible that portions of the name space may exist in different physical systems. That is, one server may be on one system, while another server may be on another system. For example, with reference to FIG. 17, Naming Context '/B' may exist on System A, while Naming Context '/B/D' may exist on System B. The underlying resource managers for these naming contexts may not be the same (e.g., they may have different data schemas and formats in the database, different protocols used to navigate the directory schema, and/or different formats of the names used to represent the entries in the directory system, etc.). For example, naming context '/B' may be stored in LDAP, and Naming Context '/B/D' may be stored in DCE CDS (Distributed Computer Environment Cell Directory Services). A schematic illustration of this scenario is depicted in FIG. 19, in which a Naming Context '/B' 1900 is located in Name Server 1 (1902) of System A and is backed by an LDAP resource manager 1904; and Naming Context '/B/D' 1906 is located in Name Server 1 (1908) of System B and its data is backed by a DCE CDS resource manager 1910.

Since the naming contexts reside on different systems, there are said to be "foreign junctions" within the name space. That is, a particular naming context (e.g., '/B/D') cannot be resolved on one system, and thus, foreign junctions exist. In accordance with one aspect of the present invention, such foreign junctions are traversed in a manner that does not compromise performance and is not dependent on knowledge of the underlying directory technology used.

As described in further detail below, the technique used by this aspect of the present invention leverages the abstraction provided by the object representation of the underlying naming context storage mechanism and introduces the concept of disjunct bindings. Disjunct bindings represent locations in the CORBA name of the naming context where a deviation occurs from the natural name resolution capability of the underlying directory technology. For example, the OMG name service binding name might be a/b. The "a" part of the name might be mapped to directory System X, where the actual name in the underlying directory is of the format "name=a". The "b" part of the name might be resident in a different underlying directory, Directory Y, where the underlying directory name of the element might be "partname <b>". The junction between a and b is a large junction over two different directory systems with two different naming schema that needs to be federated to form the "a/b" named binding in the object space. Identification of these disjunction points allows foreign junctions to be identified efficiently and easily.

In addition to the above, this aspect of the present invention makes use of the disjunct binding concept to implement alias names in a homogeneous manner. An alias name for a naming context is an alternate name for that naming context. The naming context is initially bound under a primary name, which becomes its hard link. Additional, alternative paths to that naming context make use of alias names. Alias Names and foreign junctions are handled in the same manner.

Advantageously, alias names and foreign junctions are handled in a way that maximizes the benefits of an efficient mapping to the underlying directory technology during the name resolution operation. It does so in such a manner as to maintain independence from the underlying directory technology of the name space segments on both the local and foreign systems.

Figure 20:
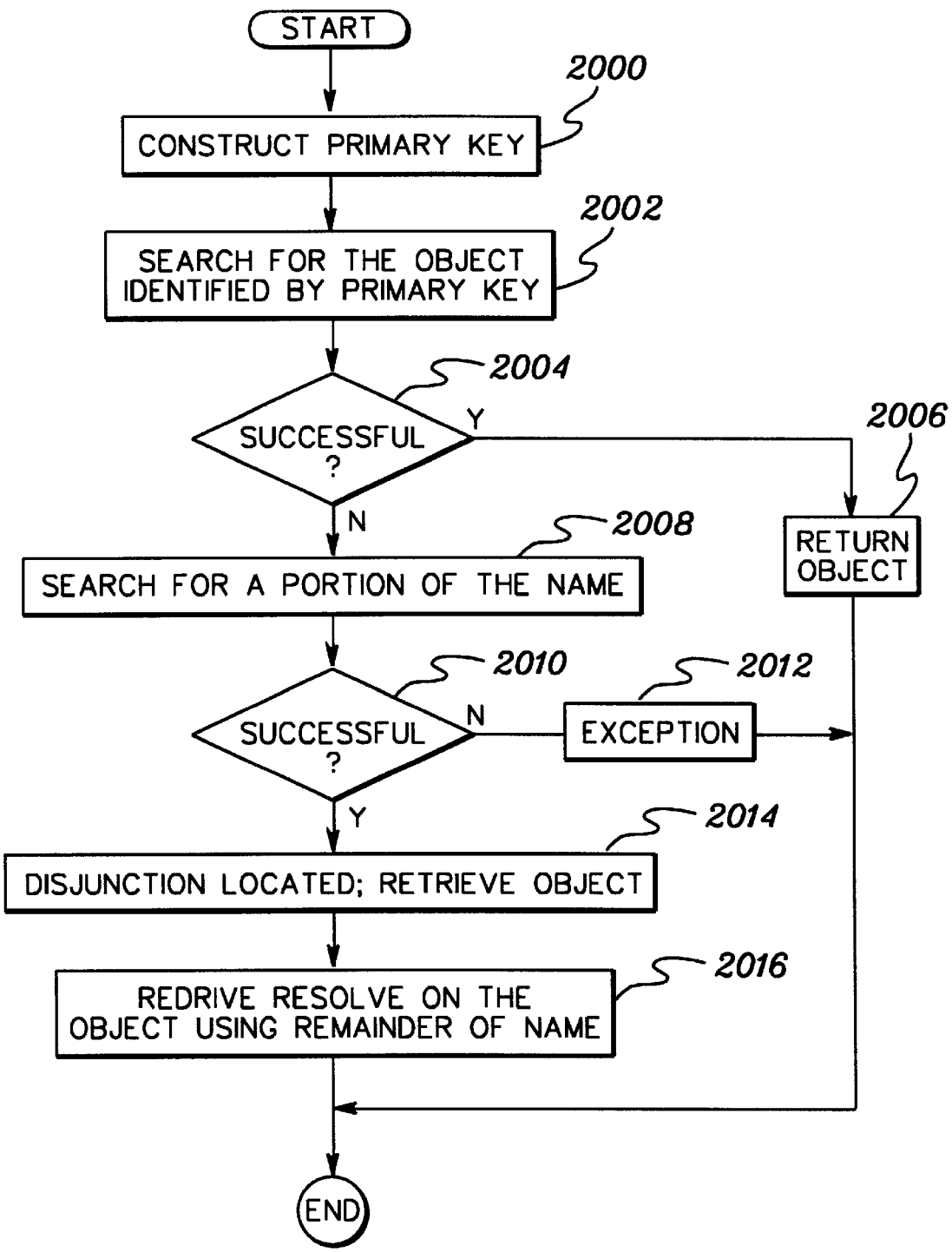
FIG. 20 depicts one embodiment of the logic associated with handling disjunct bindings, in accordance with the principles of the present invention.

In one example, the name resolution operation includes a resolve method, which is used to find an object associated with a given name. As part of the processing of the resolve method, disjunct bindings may be encountered. The manner in which this is handled is described below with reference to FIG. 20.

Figure 22:
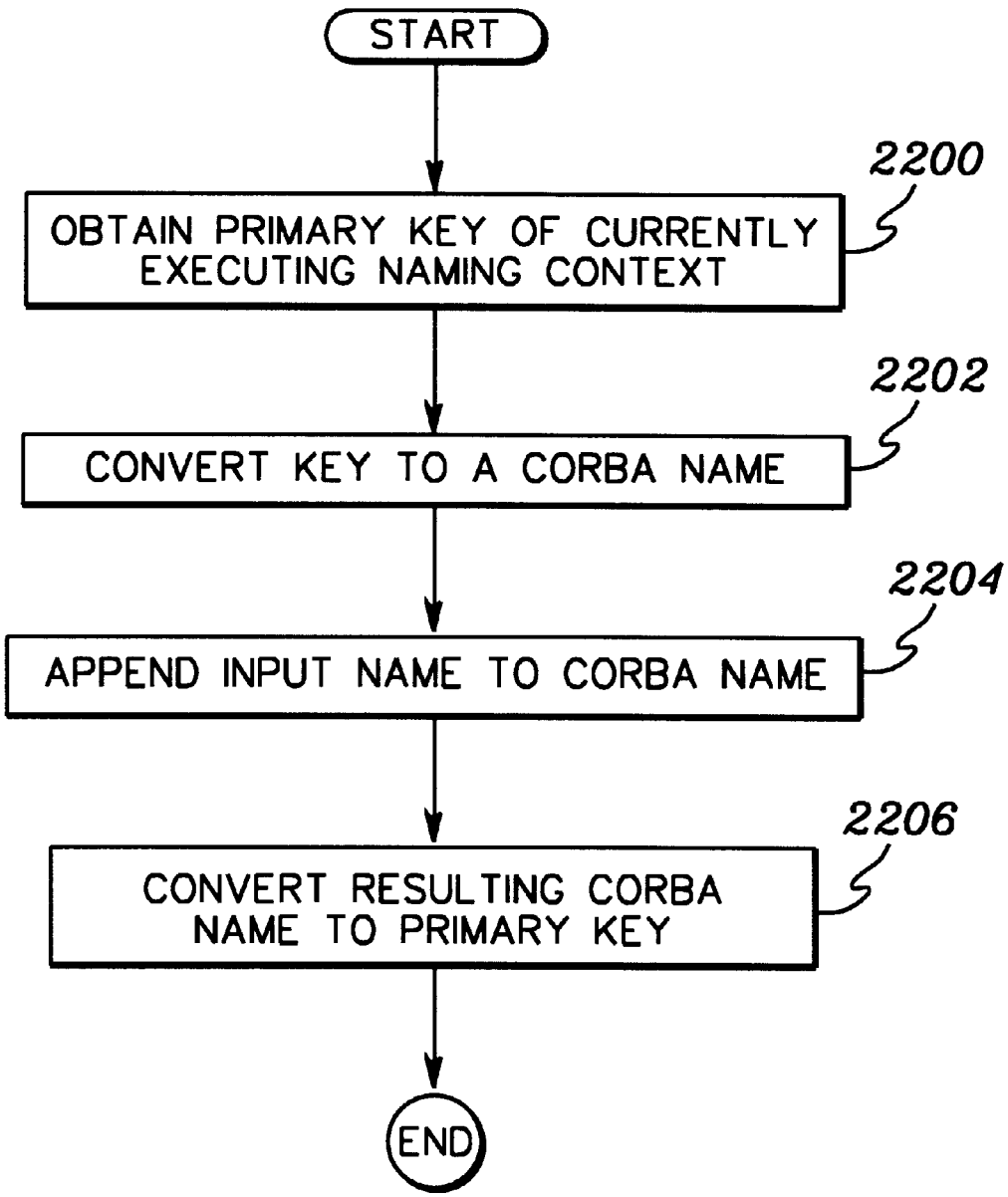
FIG. 22 depicts one embodiment of the logic associated with creating a primary key for new objects, in accordance with the principles of the present invention.

In one embodiment, a primary key is constructed based on the input name, STEP 2000. The primary key may represent an object several layers down in the name space. One example of constructing the key is described below with reference to FIG. 22. Subsequent to constructing the primary key, a findByPrimaryKey method is called to search for the name space object known by that primary key, STEP 2002. As one example, the findByPrimaryKey operation is introduced on the home collection and can be used to query the home collection for the managed object designated by the input primary key value.

If the find is successful, INQUIRY 2004, then the desired binding is found. Thus, the object associated with that binding is returned to the caller, STEP 2006. This object may either be an application object or a naming context. Thus, a multiple level resolution may be performed in a single step, as described herein.

If the findByPrimaryKey cannot find the target object, then the findByPrimaryKey is driven on the largest portion of the name that could have potentially been resolved, STEP 2008. This can be achieved by incrementally backing off the rightmost name component until the findByPrimaryKey is successful or the entire name has been consumed. Alternatively, the underlying directory technology may supply the portion of the name which could have been resolved after the first findByPrimaryKey was unsuccessful. This information could be provided to the business object in a general way such as through an exception.

Should no portion of the name be located via findByPrimaryKey, INQUIRY 2010, a NotFound exception is provided, STEP 2012. If, on the other hand, a portion of the name is located via findByPrimaryKeyString, a disjunction has been located in the name space, STEP 2014. This disjunction may either represent a foreign binding or an alias name. The object associated with that binding is retrieved and the resolve method is redriven on that object using the remainder of the object name, STEP 2016. (If the disjunction represents a foreign binding, then the resolve method is redriven on a different system. This system can have a different implementation of the CORBA architecture than the system in which the disjunction is located.) Thus, performance has been maintained in the case of a usual look-up, with disjunctions handled in a straightforward and homogeneous manner insulated from the mechanics of the underlying directory.

Further details associated with the resolve method are described below. In particular, one embodiment of the logic associated with resolve is as follows:

Object resolve (in Name name)
    raises (NotFound,
        CannotProceed,
        InvalidName);
    If the input name begins with '/' or '\' then
        Invoke resolve initial_references to obtain the Naming
            Service root.

Redrive the resolve on the root naming context passing the remainder of the name.
Return
Create the primary key string representing the object in the Name Space to be Found.
Drive findByPrimaryKeyString on the Binding home collection passing the primary key string.
If the Binding object was found then
Return the bound_object attribute of the Binding object. This may either be a leaf node object or a NamingContext object.
Else the findByPrimaryKey method did not find a Binding object.
Find the largest n such that a findByPrimaryKey on the Binding home collection using the primary key for name =<c1; c2; . . . , cn> is successful.
If the Binding for such an n could be found then
Obtain the bound-object attribute from the Binding object. This represents a NamingContext object.
Drive resolve on this NamingContext using name =<cn+1; cn+2, . . . , cz> where cz is the last component in the original name.
Return the object reference returned from the resolve invocation.
Else no Binding could be found Throw a NotFound exception.

As can be seen above, the approach described herein has no direct interactions with the backing directory on either the local or foreign system; it solely makes use of client-side interfaces that are defined to the object space of the component broker programming model. Specific use is made of the instance management interfaces, as well as those supplied by the Naming Service and potentially any "hint" (i.e., matched portion of the name) of the largest sub-portion of the name that can be resolved in one hop.

The disjunct binding was originally established as a result of a bind_context invocation. One example of the logic associated with a bind_context is as follows:
void bind_context (in Name name, in NamingContext nc)
    raises (NotFound,
        CannotProceed,
        InvalidName
        AlreadyBound);
If name is a compound name then
    ctx=executing naming context -> resolve (<c1; c2; . . . cn-1>) to find the target naming context to which the input context will be bound.
    Invoke ctx->bind_context (<cn>, nc) to invoke the bind_context on a simple name.
    Return
Else name is a simple name
    Build the primary key string of the new Binding.
    Drive the Binding home factory by calling createFromPrimaryKeySring and passing PrimaryKey.
    If the NamingContext already exists
        Return the AlreadyBound exception.
    Set the binding type (bt) attribute of the new Binding to ndcontext to indicate that this Binding object represents a disjunct binding.
    Set the bound_object attribute to the input naming context nc.
    Return Described above is a technique for handling foreign naming contexts. Advantageously, multiple level names that include junctions to a foreign naming context or alias can be resolved with a minimum number of hops.

In one aspect of the present invention, in order to facilitate efficient one hop name resolution, the contextually sensitive CORBA Name (i.e., CosNaming::Name) of an object is mapped to that object's identity (e.g., its primary key) and then, to an LDAP X.500 (as one example) distinguished name in a manner that is efficient, but also maintains separation between the CORBA object domain and the directory domain.

In particular, in one example, the CORBA name relative to the root of the server in which the object resides is used as the object primary key of the name space object (e.g., binding or naming context). The object primary key is then used to determine the distinguished name of the directory entry that represents the object. Thus, the identity of the name space object is intimately tied with its name relative to the root of the name space of the server where the object resides. The advantage of this approach is that it facilitates efficient one hop name resolution, reduces the need for indirection, and eliminates the need to store CORBA names as binding attributes.

Figure 21:
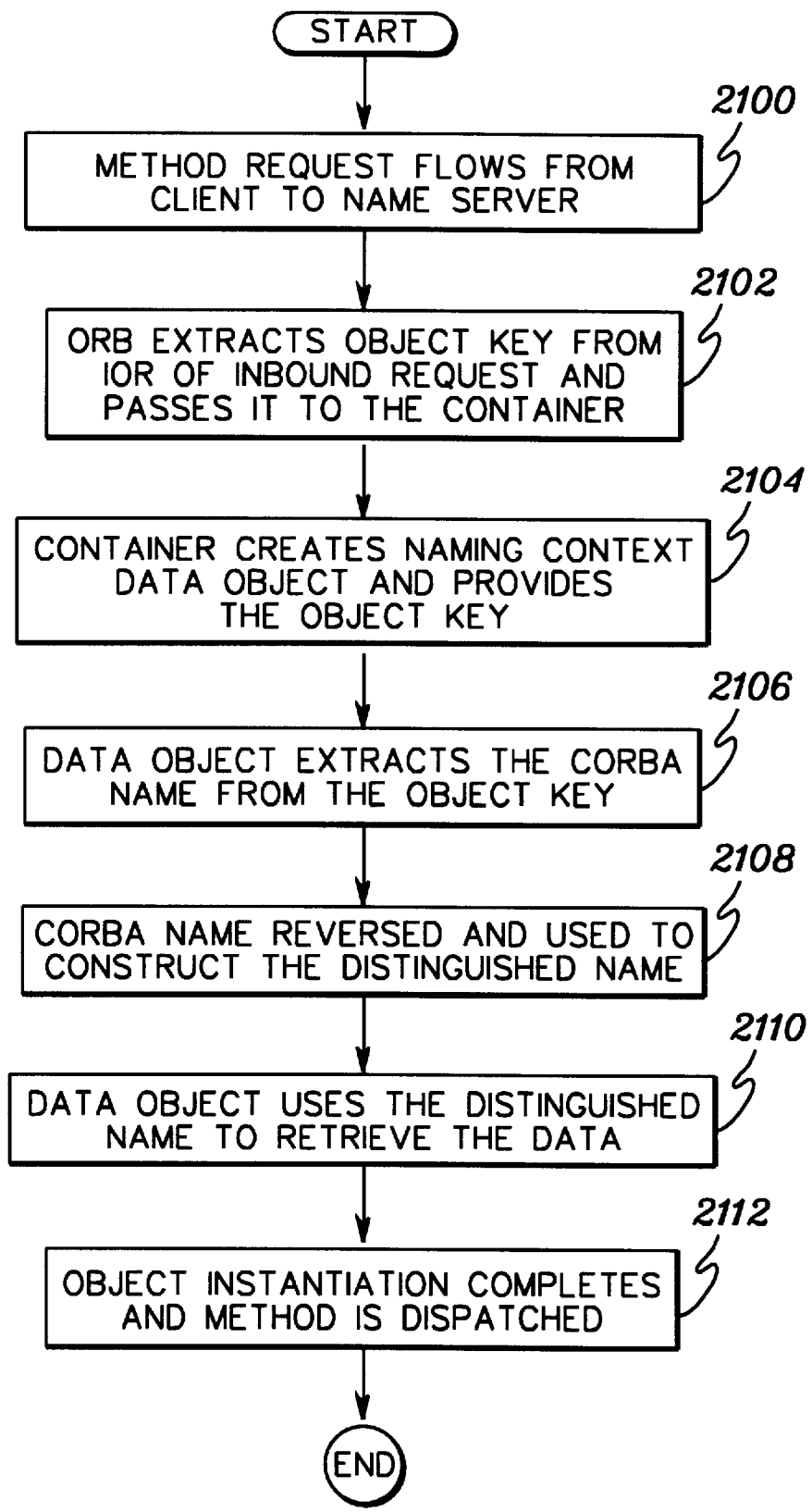
FIG. 21 depicts one embodiment of the logic associated with mapping a CORBA name to an object's identity, in accordance with the principles of the present invention.

One embodiment of the logic associated with mapping a CORBA name to a distinguished name to dispatch a method on the named object is described with references to FIG. 21. As one example, when a method is invoked on a name space object, a method request flows from a client (i.e., an invoker) to the name server, STEP 2100. Included in this flow is a reference (IOR) to the object on which the method is to be invoked (this object is referred to as the executing object). The reference includes the object key of that target object. The ORB extracts the object key out of the IOR and provides it to the container, STEP 2102. As part of the object instantiation process, the container creates a naming context data object and provides it with this key, STEP 2104. (As described above, the data object is responsible for the interactions with the directory.)

Subsequently, the data object extracts the CORBA name from the key, STEP 2106. For example, an object key may have a format of "root container/binding home primary key/object primary key", where a possible value for the object primary key portion is "Y12A.Dept/Jeffrey Frey.Programmer". The data object extracts the object primary key portion of the primary key to obtain a string form of the CORBA name of that object relative to the root of the server. With the above example, the string is "/Y12A.Dept/Jeffrey Frey.Programmer".

The object primary key is then reversed and further manipulated to build an LDAP distinguished name, which can be used by LDAP to locate the corresponding directory entry, STEP 2108.

The following is one example of the resulting distinguished name using the CORBA Name from the previous step. LDAP Root is the location of the name space root in the underlying directory.

TypelessRDN=Jeffrey Frey.Programmer,
TypelessRDN=Y12A.Dept, TypelessRDN=/,<LDAP Root>

The data object then uses this distinguished name to retrieve the data in a single operation, STEP 2110. Thereafter, the remaining object instantiation processing is performed and the method dispatched, STEP 2112.

By using the CORBA name as part of the object key, the object reference (i.e., the Interoperable Object Reference) contains the information needed to retrieve the object from the underlying directory (e.g., LDAP X.500). No metastate tables are required to map the object key to the distinguished name. In addition, the underlying structure of the directory is representative of the structure of the name space. That is, name space objects need not use the directory in a flat manner with all name space objects bound under a single directory entry using some generated Name.

Described above is the instantiation of previously existing name space objects. What is described next is the construction of primary keys for the creation of new name space objects. As one example, a bind_new_context(name) method results in the creation of a new naming context object bound in the name space using name "name" relative to the executing naming context. One embodiment of the logic associated with creating a new primary key for new objects is described with reference to FIG. 22.

Initially, the primary key of the currently executing naming context is obtained, STEP 2200. (This key is readily available, since the object exists and has an identity). Thereafter, the primary key is converted to a CORBA name, STEP 2202.

Subsequent to obtaining the CORBA name, the input name "name" is appended to the CORBA name, STEP 204. Thereafter, the resulting CORBA name is converted to an object key, Step 2206.

For example, assume that a new naming context under the name "/Y12A.Dept/Jeffrey Frey.Programmer/Component Broker.Project" is to be created. In order to create the new naming context, the bind new context method is called on the currently executing naming context, whose name is "/Y12A.Dept/Jeffrey Frey.Programmer", in this example. The name passed on the bind_new_context call is "Component Broker.Project". Within this method, a primary key is created.

To create the primary key for the new naming context, the string from of the CORBA name of the currently executing naming context is extracted. At the point in the processing that the new key is being built, the primary key of the currently executing naming context is "root container/ Binding home primary key/object primary key", where the value for the object primary key portion in the example is "/Y12A.Dept/Jeffrey Frey.Programmer".

Thereafter, the object primary key is extracted, which provides the string form of the CORBA name of the object relative to the root of the server. As before, that string is: "/Y12A.Dept/Jeffrey Frey.Programmer", in this example. Then, the name of the new binding relative to the currently executing naming context is concatenated to the CORBA name to yield a CORBA name string of "/Y12A.Dept/Jeffrey Frey.Programmer/Component Broker.Project". This string is then used as the object key of the primary key of the new naming context that is being created, whose form is "root container/Binding home primary Key/object primary key". As a result of this approach, the structure of the object primary key in the object key contains all of the information needed to either construct an LDAP distinguished name or the string form of the CORBA name of the object relative to the root of the server.

A further example of the above is as follows. Assume a tree having a/b/c/d/e/f. Further, assume that a resolve method is driven against a naming context designated by the simple name c, and that the object bound relative to the naming context bound at name d/e/f is to be located or created. Thus, the full identity of the naming context at the c position is a/b/c. Its real name in LDAP is, for instance, typelessRDN=c, typelessRDN=b, typeRDN=a. This LDAP name is used to retrieve the object associated with that name from the LDAP directory. The data object converts the LDAP name to its CORBA name, a/b/c.

Then, /d/e/f is appended to the CORBA name, yielding a/b/c/d/e/f. The entire CORBA name is then converted to a new object key, as described above. At a subsequent point, the new primary key is provided to a data object, which uses it to build a distinguished name. This distinguished name can then be used to find or create an entry.

This new key can be used as input to, for instance, a createFromPrimaryKeyString method to create the new naming context object and associate (or bind) it with the name space. As part of the processing to achieve this, the new key is provided to a data object, who creates the distinguished name and calls ldap_add.

In the next example, the new key is used to find an existing entry. For example, this same primary key construction approach can be used as part of a resolve method to locate an object bound in the name space in a single hop. The resolve method is implemented in, for example, a naming context business object. (As described above, a business object contains the primary application interfaces and algorithms). During resolve, the new key is passed to the findByPrimaryKeyString which passes the key to a data object. This data object uses the key to build the distinguished name and call ldap_search. One embodiment of a resolve method that uses the primary key creation process is described below:

Object resolve (in Name name)
   raises (NotFound,
     CannotProceed,
     Invalidname);
   If the input name begins with '/' or '\' then
   Invoke resolve initial_references to obtain the Naming
     Service root.
     Redrive the resolve on the root naming context passing
       the remainder of the name.
     Return
   Create the primary key string representing the object in
     the Name Space to be found by concatenating the input
     Name to the Corba Name represented in the primary
     key of the executing Naming Context.
   Drive findByPrimaryKeyString on the Binding home collection passing the primary key string.
   If the Binding object was found then
     Return the bound_object attribute of the Binding
       object. This may either be a leaf node object or a
       NamingContext object.

The defining of name space object primary keys in the above manner allows name resolution to be performed in a batch fashion. The name that is the target of the search can be resolved in a single hop, even if that name represents an object that is several layers down in the directory hierarchy. This approach allows the underlying semantics and performance characteristics of the underlying directory technology be exploited.

In accordance with one aspect of the present invention, multiple updates to the name space are made atomically with one another, as well as with the creation and update of application objects. For example, an application object, such as an insurance policy object, is atomically created and bound into the name space. This maintains the overall integrity of the name space. In one embodiment, atomic updates are provided by the addition of transactional semantics in the name server. Transactional semantics for name space objects are achieved by making name space objects managed objects. As managed objects, they inherit a set of qualities of service that include the transactional characteristics. In conjunction with this, a local interface to a directory service is supplied that propagates a transactional context from the name server through, for instance, the LDAP directory and finally to the resource manager.

Figure 23:
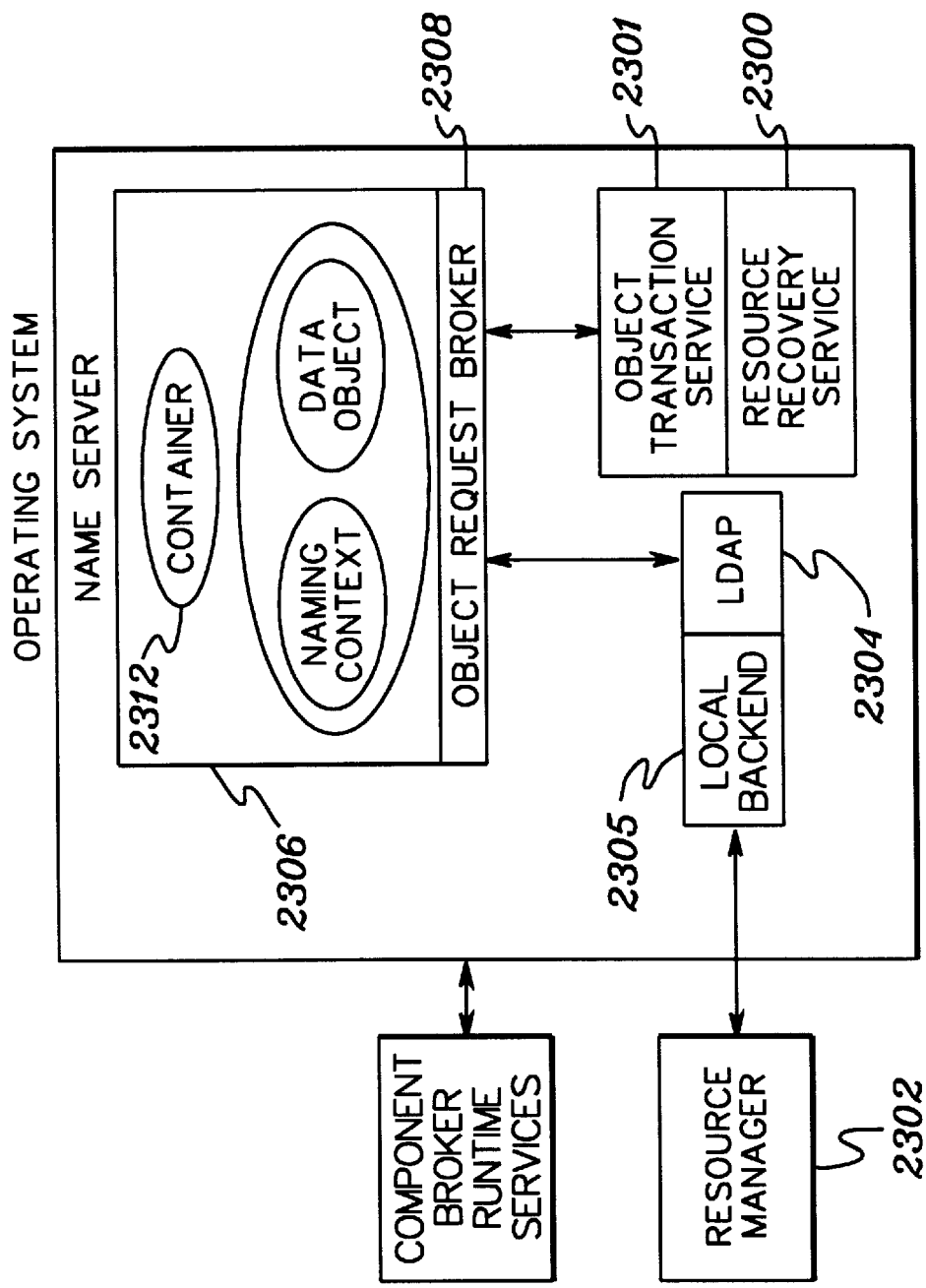
FIG. 23 depicts one embodiment of a transactional name server, in accordance with the principles of the present invention.

To achieve transactional semantics on name space objects, multiple components of a computing environment are used. These components include, for instance, an underlying resource recovery service (RRS) 2300 (FIG. 23), which serves as a generalized two-phase commit manager; an object transaction service 2301, which is coupled to and works with RRS; a resource manager 2302 (e.g., a database subsystem), which exploits the RRS protocols; LDAP services 2304, which exploits the RRS protocols to create a local backend 2305, which is coupled to resource manager 2302; and a server infrastructure 2306, including an object request broker 2308 and a container 2312.

These components are brought together by the name server through use of the component broker managed object framework as the programming model and the use of the LDAP local backend as the directory service used as the backing store for naming objects.

By using the managed object framework, the name server supports a set of architected interfaces that allows the container to manage the transaction. These interfaces include those used for the business object, which includes the application logic for implementing the client level interfaces; and the data object, which is responsible for interactions with the backing store, in this case, the LDAP local backend.

The LDAP local backend allows the LDAP server functions to execute under the same unit of work that invoked the associated LDAP client function. By doing so, RRS context information can be propagated from the name server, across LDAP, and into, for instance, the DB2 database. Further details of LDAP local backend 2305 are described below.

In particular, in accordance with one aspect of the present invention, the LDAP server code is allowed to run locally to the LDAP client code. Thus, the client code and server code are packaged together with modifications that allow the network flows to be by-passed.

For example, the ORB establishes a transactional context. Thereafter, the naming data object receives control and invokes LDAP interfaces, such as LDAP client interface code and LDAP server code (which reside on the same server). Then, DB2, for instance, retrieves the transactional context.

In this arrangement, a caller such as the naming data object calls the LDAP client interface code. The client interface code then directly calls the LDAP server code without going outbound on the network. Thus, the naming data object, the LDAP client code, the LDAP server code, and the invocation to DB2 end up running under the same unit of work. DB2 is therefore able to access the transactional context that was established by the ORB prior to the LDAP client code being invoked. (LDAP is further described in "LDAP Server Administration and Usage Guide," IBM Publication No. SC24-5861-00 (January 1998), and at DS.INTERNIC.NET RFC 1777, which are hereby incorporated herein by reference in their entirety.)

Figure 24:
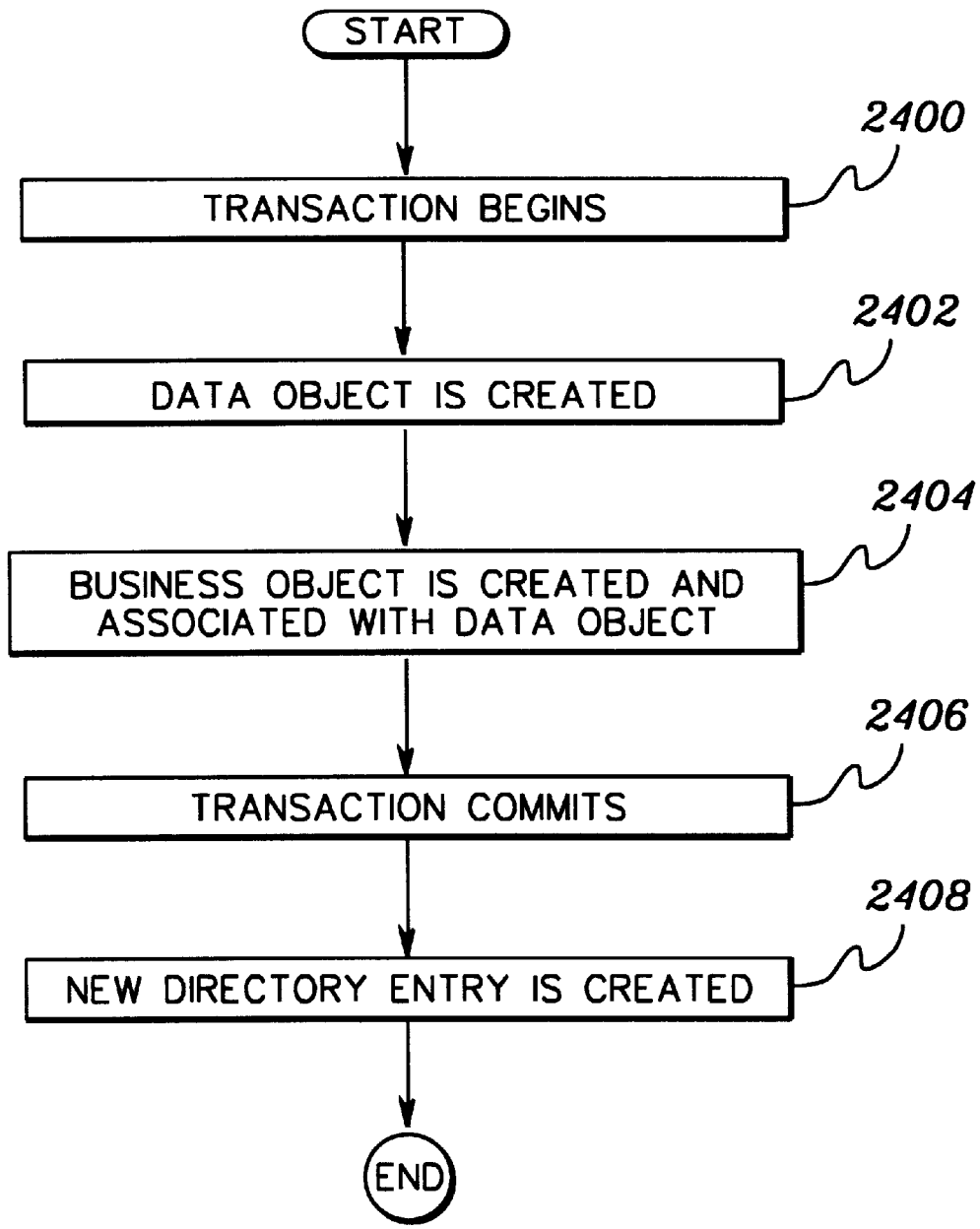
FIG. 24 depicts one embodiment of the logic associated with creating an object for a transactional name server, in accordance with the principles of the present invention.

Certain details of how a transactional name server is defined and operated is described below with reference to various logic flows. As one example, the control flow associated with creating an object in a transactional environment is described with reference to FIG. 24. This example is from the perspective of a naming object (e.g., a naming context or a binding). Further, in this example, a new naming context object is being created through the bind_new_context method described herein.

Initially, a transaction begins, when, for instance, a client performs a bind_new_context invocation, STEP 2400. The container is activated and the transaction context is attached to the thread of execution. As part of the container activation, two connection objects are initialized. One sets up the connection with, for instance, an LDAP resources manager by calling ldap_open and ldap_bind. As a result of these calls, a handle is provided that will be used by the data object for its future interactions with LDAP. The second connection object that is initialized is the one for RRSAF, which proceeds, as previously described herein. Through this, the environment is set up that allows interactions with the name server to be performed under a transactional scope. DB2 can pick up the transactional context that the ORB attached to the thread of execution. LDAP manages the DB2 data per the requests made by the naming context data object. Once all of this is set up, the bind-new-context method is dispatched on the currently executing naming context. It builds an object key for the new naming context, as previously described herein. It then invokes createByPrimaryKeyString against the Naming Context home to cause the new object to be created. As part of this processing, the new data object is created, STEP 2402.

Additionally, a business object is created and associated with the data object, STEP 2404. As one example, the association is performed by calling inItForCreation. Default attributes are copied from the data object to the business object.

Subsequent to creating the data and business objects, the transaction is committed, STEP 2406. During the commit, an insertToDataStore method is called on the data object, which causes a new directory entry (e.g., an LDAP directory record) associated with the internalized key to be created, STEP 2408. In particular, when the transaction is committed, the insertToDataStore invokes the services of the LDAP directory service to create the new directory entry. That is an ldap_add, in this example. LDAP performs the appropriate manipulations of the underlying DB2 database in order to create the entry. Because the data object, LDAP, and eventual DB2 calls are all running under the same thread of execution, and therefore, under the same transactional context, this modification to the name space is associated with a specific transaction.

After creating an object, the object can be retrieved. Some of the control flow associated with retrieving an existing object is similar to the flow for creating an object, and thus, reference is made to the above discussion, as well as to the same figure, FIG. 24. In one example, the retrieve flow takes place as part of activating an existing naming context.

Initially, a transaction begins, STEP 2400. A data object is created, STEP 2402, as well as the business object, as described above. The business object is associated with the data object, STEP 2404. In this instance, the business object is associated with the data object by calling initForReactivation.

Thereafter, the data is retrieved. In this instance, retrieveFromDataStore is called on the data object, which causes the data object to drive an ldap_search, and LDAP, in turn, interacts with DB2 to obtain the data.

Figure 25:
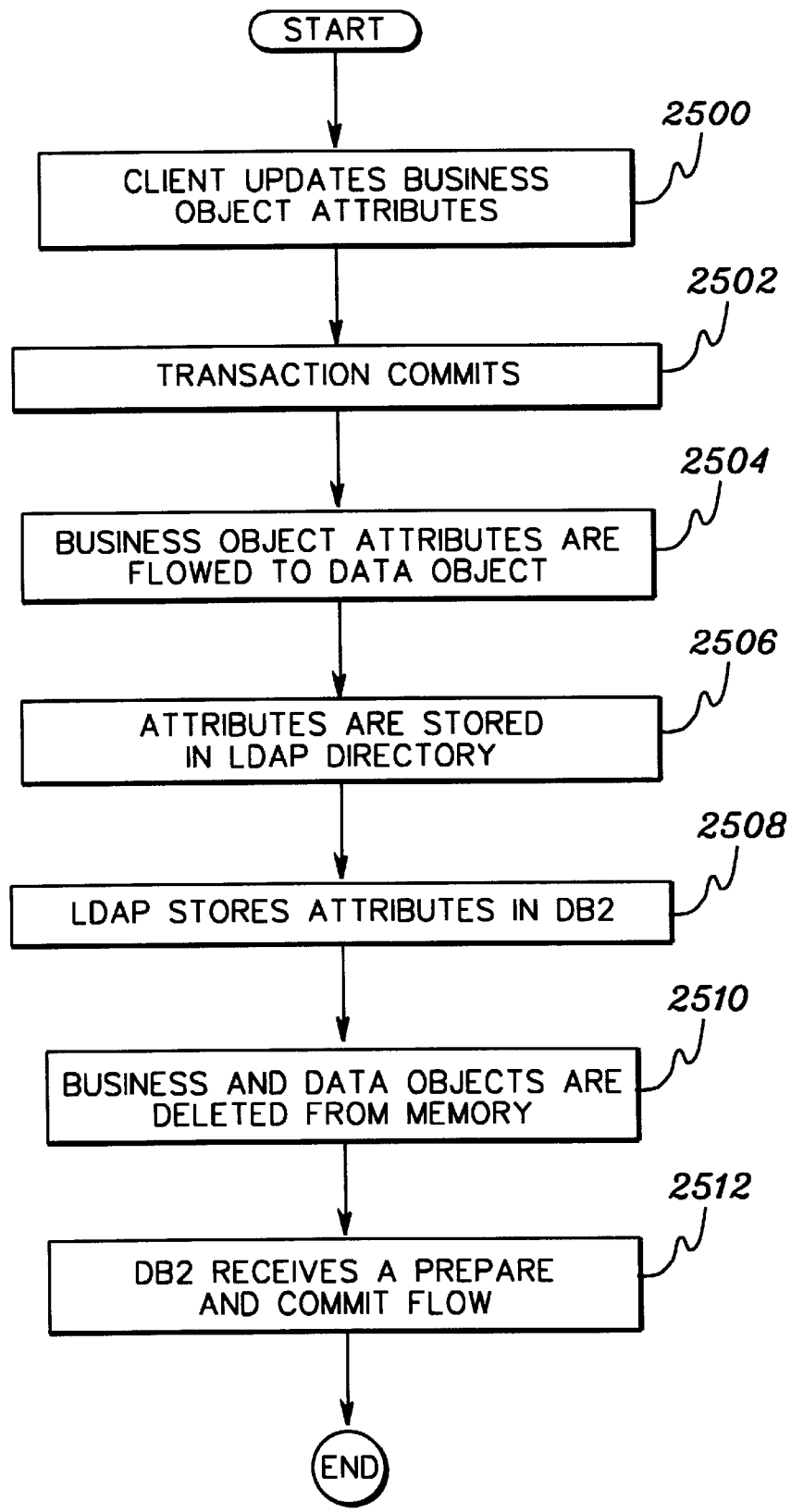
FIG. 25 depicts one embodiment of the logic associated with updating an object of a transactional name server, in accordance with the principles of the present invention.

Once the object is retrieved, it can be updated. For example, an update may be that a bind modified a binding to point to a different application object. One embodiment of the control flow associated with updating an object once it has been inserted or retrieved is described with reference to FIG. 25. The scenario for update is similar to those described above.

Initially, a client (i.e., an invoker) updates one or more attributes of the business object, STEP 2500. Thereafter, the transaction commits, STEP 2502. As part of the commit process, pre-prepare causes initForPassivation to be called on the business object, thereby flowing the business object attributes to the data object, STEP 2504.

Further, during the commit process, the attributes are passed to the LDAP directory using updateToDataStore, STEP 2506. UpdateToDataStore invokes LDAP, which in turn, interacts with DB2. For example, LDAP stores the attributes in a data store of a resource manager, such as DB2, STEP 2508.

After the attributes are stored, the business object and data object are deleted from memory, STEP 2510, and DB2 receives a prepare and commit flow, STEP 2512. This concludes updating an object in a transactional name server.

Figure 26:
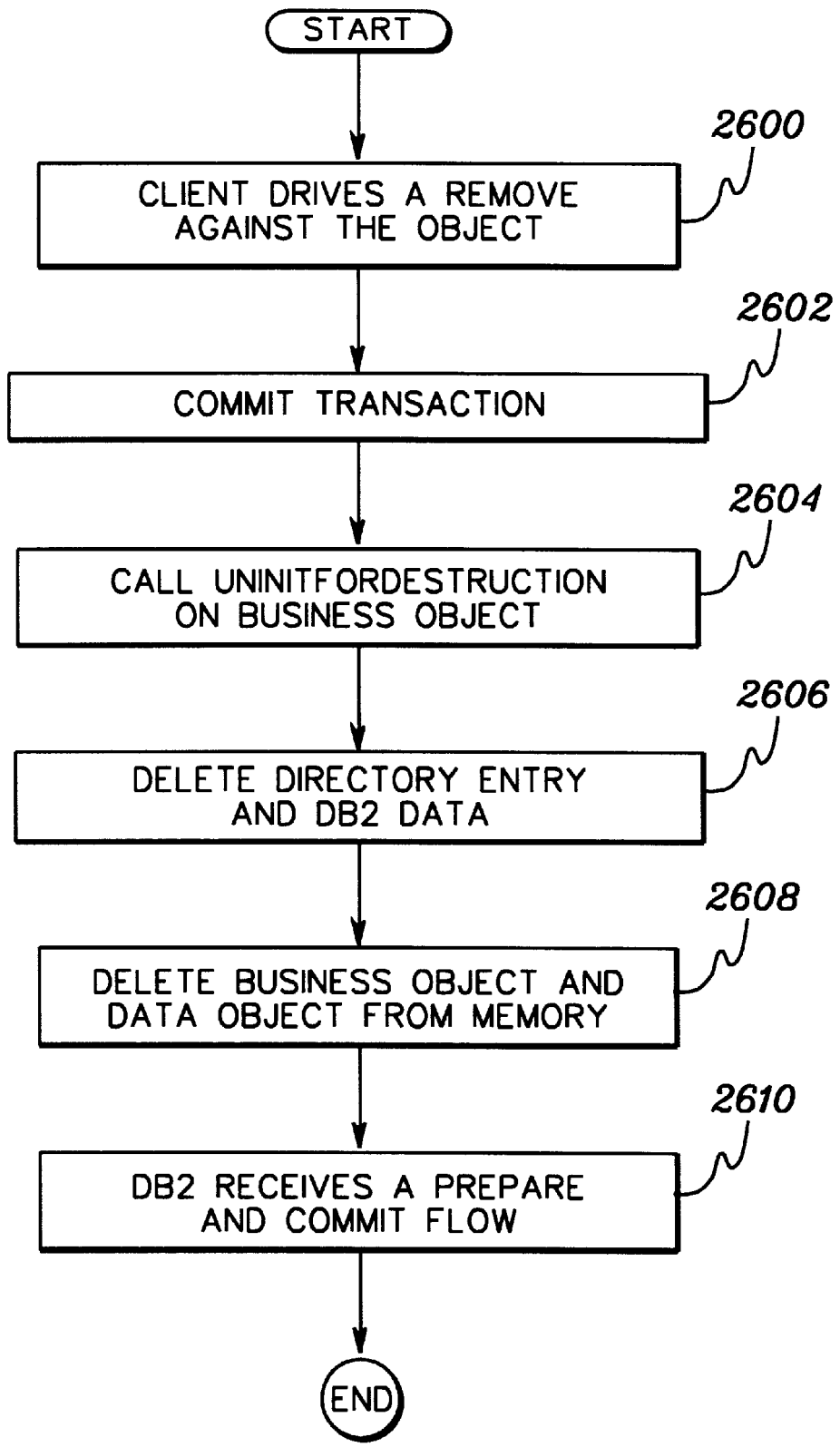
FIG. 26 depicts one embodiment of the logic associated with deleting an object of a transactional name server, in accordance with the principles of the present invention.

One embodiment of the control flow associated with deleting an object, once it has been inserted or retrieved is described with reference to FIG. 26. Initially, a client drives a remove method against an object, STEP 2600, and the transaction commits, STEP 2602. As part of commit, uninitForDestruction is called on the business object in order to delete the object, STEP 2604. Additionally, the LDAP directory entry and associated DB2 data is deleted via deleteFromDataStore, which is called on the data object, STEP 2606. In one example, the data object uses ldap_delete( ) to perform the deletion. Further, the business object and data object are deleted from memory, STEP 2608, and DB2 receives a prepare and commit flow, STEP 2610.

Figure 27:
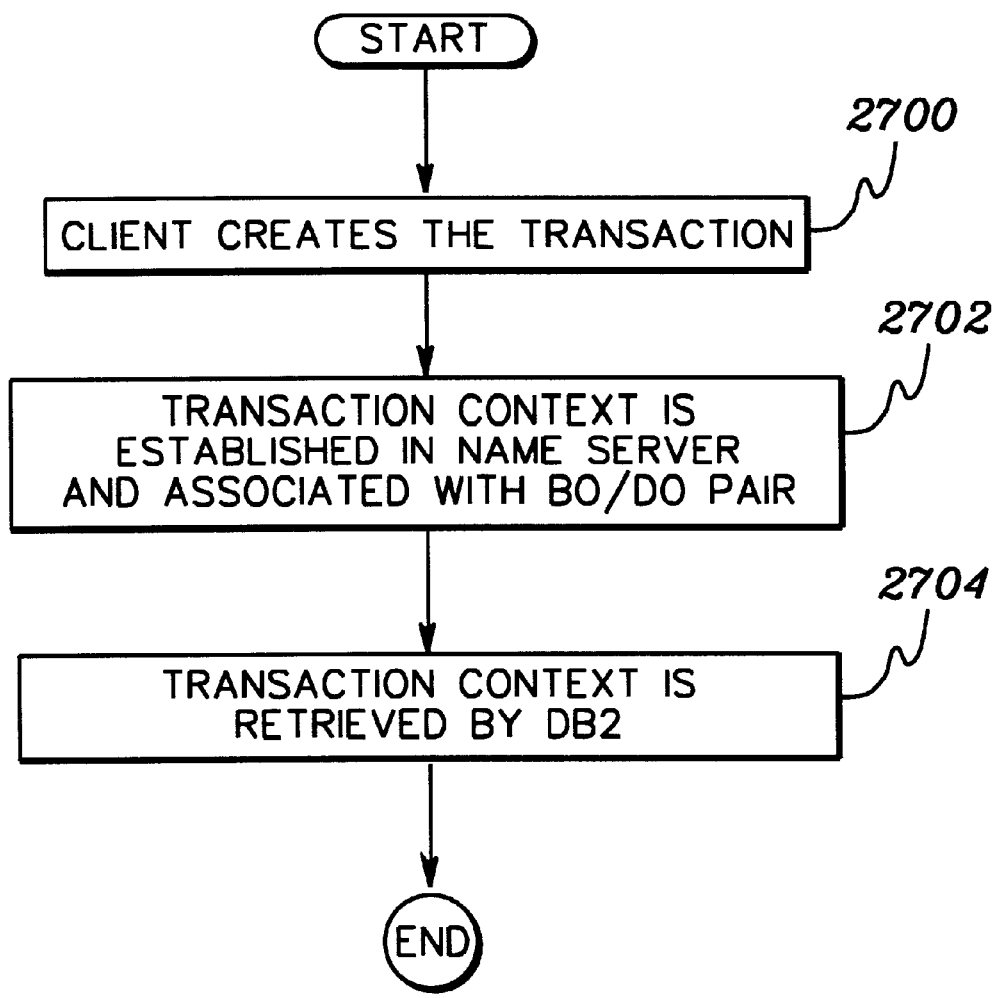
FIG. 27 depicts one embodiment of transactional context flows, in accordance with the principles of the present invention.

In each of the above control flows, there is a transactional context that is flowing. One embodiment of how the transactional context flows during the above-described control flows is described with reference to FIG. 27.

Initially, a client (i.e., an invoker) creates a transaction and the transaction context flows with its interaction with the name server, STEP 2700. That is, the client performs a begin tran and the transactional context flows as part of the method invocation, as described herein. The transaction context is established in the name server and associated with the business object and data object pair, STEP 2702.

Thereafter, the transactional context is retrieved by DB2 for updates to DB2 tables, STEP 2704. DB2 is able to retrieve the transactional context by virtue of running under the same unit of work that owns the business object/data object pair.

With the capabilities described above, multiple naming contexts and application objects can be manipulated in one or more server instances atomically. Take the following example:

1) Begin a transaction;
2) Create a naming context A;
3) Create an application object B;
4) Create an application object C;
5) Bind application object B under naming context A;
6) Bind application object C under naming context A;
7) Commit or roll back the transaction.

Since the scope of an object's life in memory is associated with the scope of the transaction, server replication becomes possible. An object that is active within a given server is locked. As such, any replicated server cannot access it until those locks are released.

Described in detail above is a transactional name server that provides for multiple atomic updates to a name space. A transactional name server advantageously makes possible server replication which improves availability and performance characteristics of the server. In accordance with this aspect of the present invention, component broker mechanisms are used in conjunction with a particular implementation of LDAP to allow the data object, LDAP and the DB2 calls to run under the same unit of work. This makes modifications to the name space transactional. As described above, this could involve retrieving bindings or naming contexts, creating new ones, or modifying existing ones. This has lead to various enhancements. For example, when initializing the name space, entire segments of the name space can be built under the scope of a single transaction. As a result of this, when commit is performed, either all of the changes take place or none of them take place. This eliminates the possibility of creating partial name spaces with inconsistent states should processing terminate prematurely. Furthermore, a transactional name space allows application objects to be created and their references registered in the name space under the scope of a single transaction. This avoids scenarios where processing is interrupted between object create and name space registration, which would result in orphaned objects.

Figure 28:
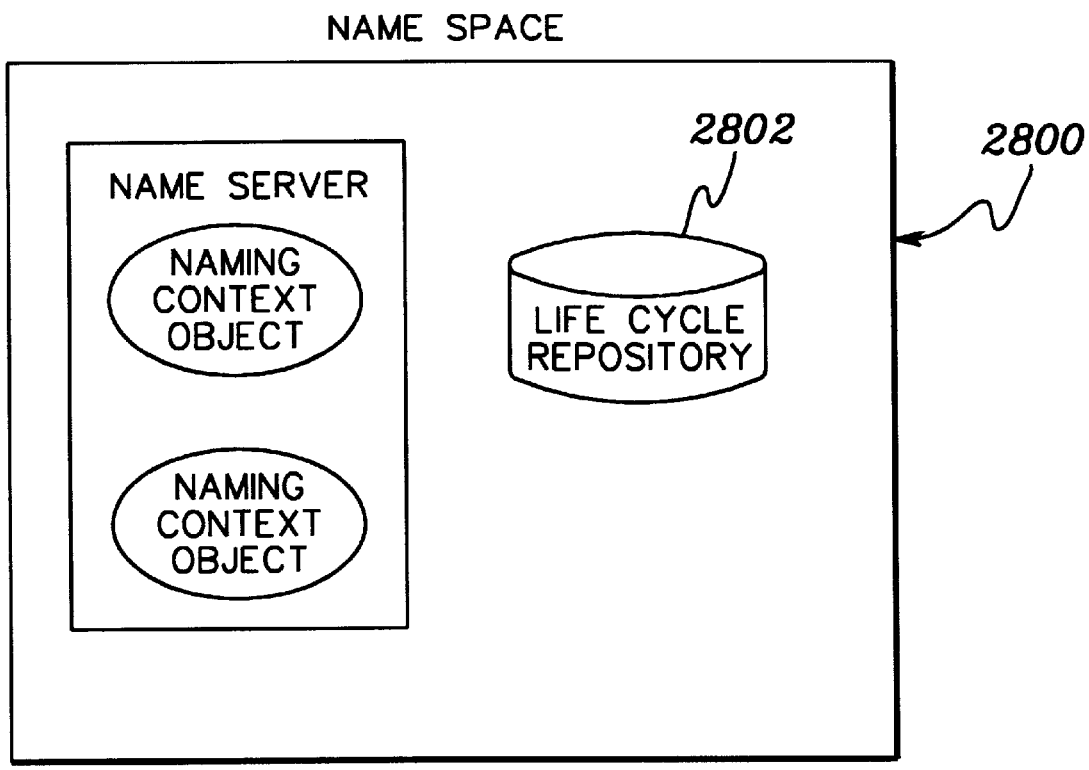
FIG. 28 depicts one embodiment of a name space, which includes a life cycle repository used in accordance with the principles of the present invention.

As described in detail above, a name space is provided, which manages naming context objects. In one aspect of the present invention, a name space 2800 (FIG. 28) also includes a repository, such as a Life Cycle Repository (LCR) 2802. The Life Cycle Repository is located within, for instance, a private portion of the name space, and includes a set of factories.

Factories provide a client (i.e., an invoker, a user) with specialized operations to create and initialize new object instances. A GenericFactory interface is defined by the Life Cycle Service. The Life Cycle Service is an OMG architected set of services that define conventions for creating, deleting, copying, and moving objects. These services allow remote clients to perform life cycle operations on objects in different locations. The GenericFactory serves as a creation service and provides a generic operation for object creation. To create an object in such a way, a client uses an object reference to a factory. The client can obtain the factory object reference through use of the Naming Services or through the use of a Life Cycle FactoryFinder service, described below. In addition, clients may be passed factory objects as parameters.

A client that wishes to delete an object issues a remove operation. To delete an object in such a way, that object is to support the LifeCycleobject interface. The LifeCycleobject interface also supports move and copy operations. The move and copy operations are passed an object reference to a FactoryFinder. The client is thereby specifying to move or copy the object using a factory within the scope of the FactoryFinder.

Figure 29:
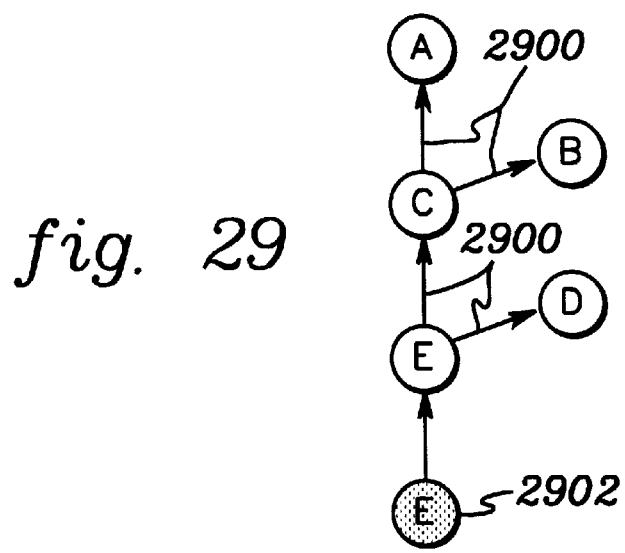
FIG. 29 depicts one example of inheritance relationships among various interfaces, in accordance with the principles of the present invention.

FactoryFinders support the find_factories operation, which returns a sequence of factories that meet the specified characteristics. The set of factories against which the FactoryFinder performs its search is contained in the Life Cycle Repository. An object may support multiple interfaces according to its inheritance hierarchy. As depicted in FIG. 29, an inheritance relationship 2900 is shown among various interfaces A-E. An object implementation 2902 is supplied for interface E (shaded area). Instances of that implementation support all of the interfaces A-E. The problem to be solved then is how to allow a client to locate a factory that produces instances of implementation E, when that client may be using any of interfaces A-E as the criteria for finding that factory. For example, the client may pass the name of interface A to the FactoryFinder and expect to receive one or more factories that support that interface. The factory for implementation E is to be included among those returned. Furthermore, the factory for implementation E is to be returned when the client passes the name of any of the interfaces A-E to the FactoryFinder.

In accordance with one aspect of the present invention, in order to locate a factory that produces instances of an implementation of a particular object (e.g., object E), interface names are registered for the factory of implementation E within the Life Cycle Repository.

Figure 30:
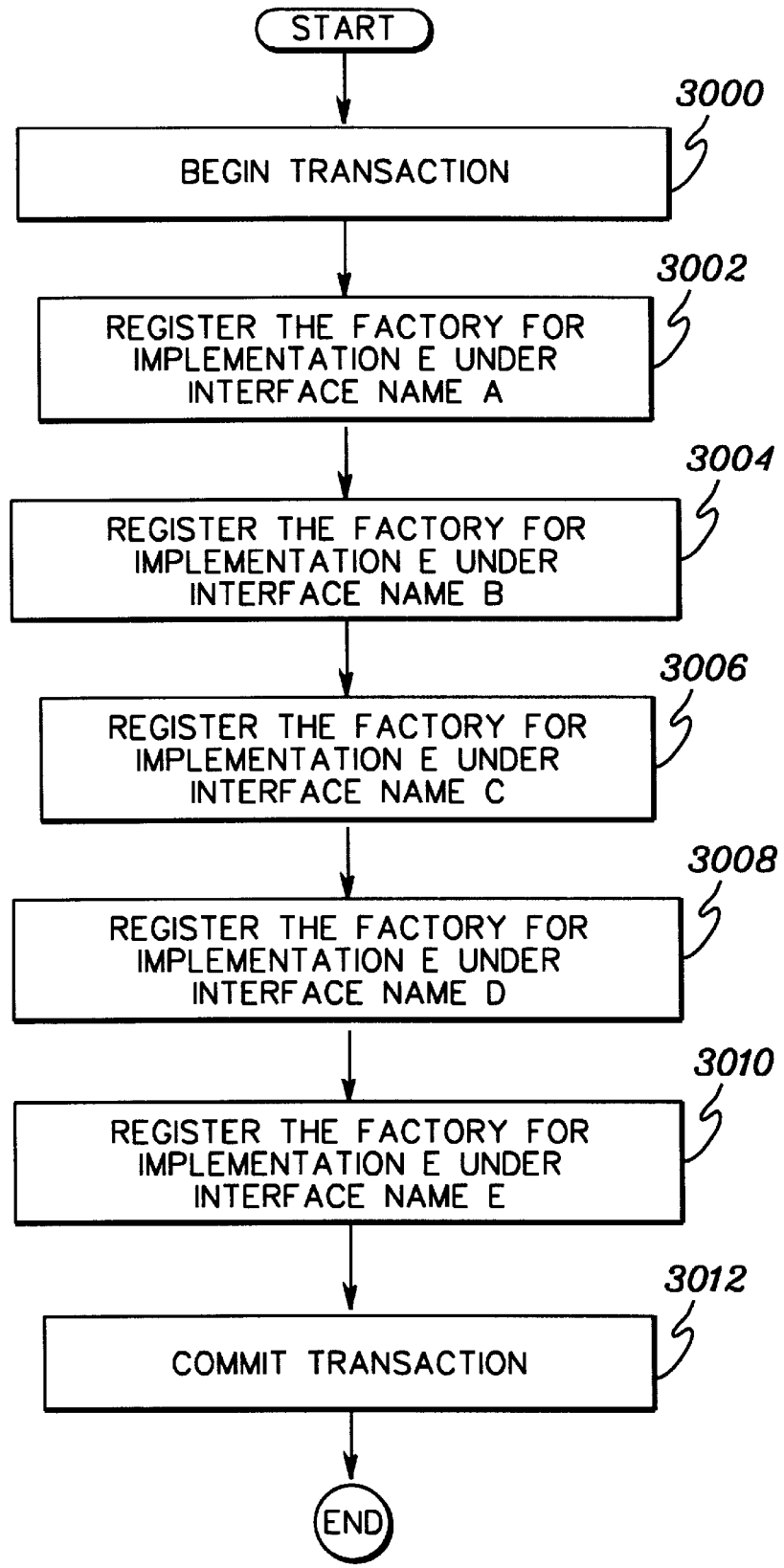
FIG. 30 depicts one embodiment of the logic associated with registering multiple interfaces for a particular implementation, in accordance with the principles of the present invention.

One embodiment of the logic associated with registering multiple interfaces for the factory of implementation E is described with reference to FIG. 30. Initially, a transaction is begun for performing the registrations, STEP 3000. Within the transactional unit of work, the factory for implementation E, in this example, is registered under interface Name A, STEP 3002. In particular, the factory object is bound in the name space under Name A.

Additionally, the factory for implementation E is registered under interface names B, C, D and E, STEPS 3004-3010. Thereafter, the transaction is committed, STEP 3012. (In other examples, there may be more or less interfaces. The above is only one example.) By using the above procedure, all of the interface names associated with the factory for a particular implementation (e.g., implementation E) are registered in the Life Cycle Repository. This allows a factory that produces instances of a particular implementation to be located no matter which interface is used as the criteria for finding the factory.

For example, assume that there is a factory that builds employee objects and another factory that builds person objects. Further, assume that a list of all factories that build people is desired. In accordance with this aspect of the present invention, the list includes the employee factory, since employees are people, as well as the person factory.

Figure 31:
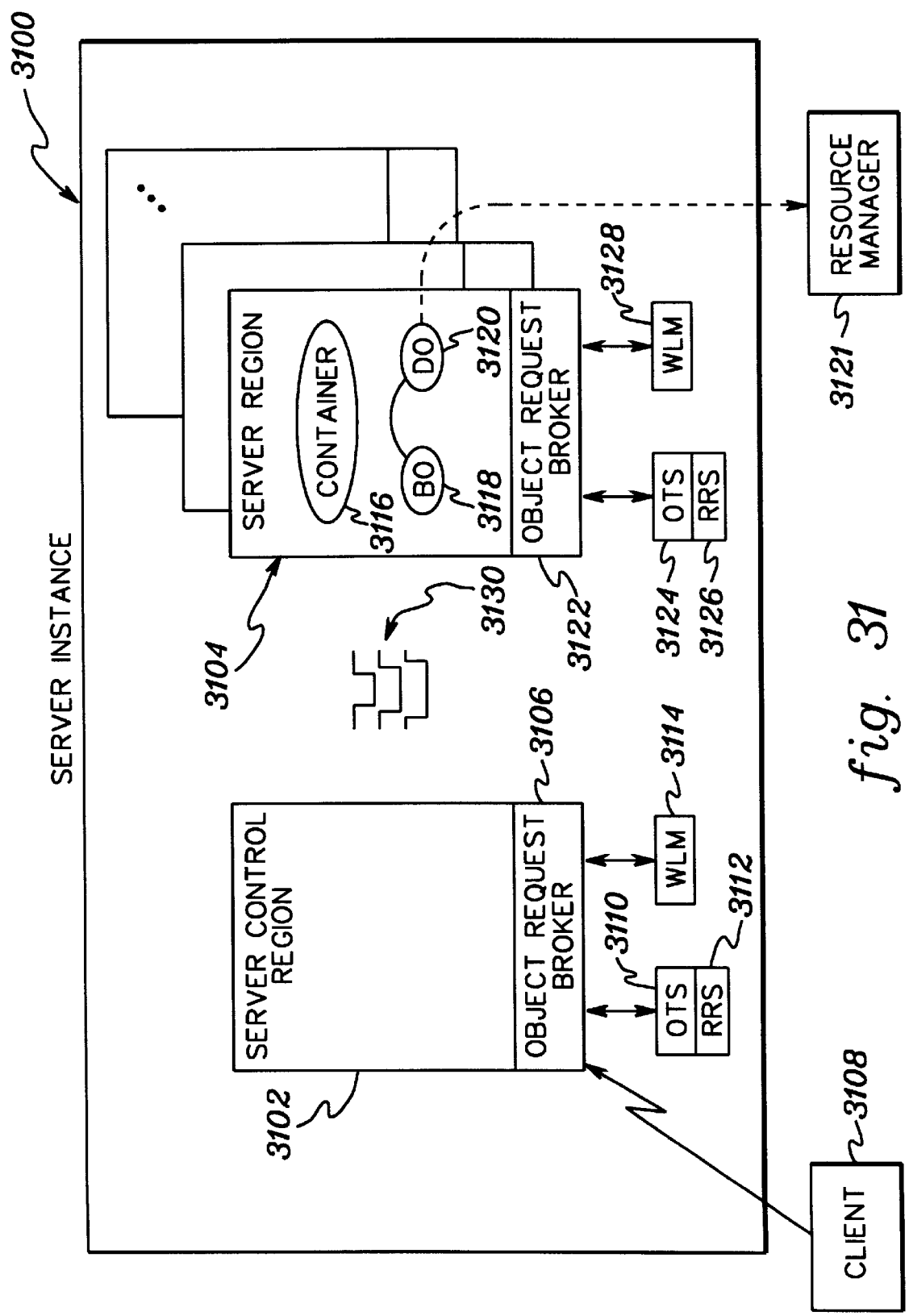
FIG. 31 depicts one embodiment of a server instance, which includes a server control region and one or more server regions, in accordance with the principles of the present invention.

As described above, a server system includes one or more server instances used to manage various objects. Further details regarding a server instance is described herein. In particular, in accordance with one aspect of the present invention, a server instance is provided that offers integrity (i.e., reliability), application isolation between privileged and non-privileged applications, enhanced transaction recovery time (i.e., restart/recovery scalability), and effective workload management. One embodiment of such a server instance is described with reference to FIG. 31.

In one aspect of the present invention, a server instance 3100 includes, for example, one or more control regions 3102 and one or more server regions 3104. Control region 3102 is an address space (separate and apart from the one or more server region address spaces), which executes in privileged mode. It does not provide a residence for any user written application code, but does provide various control functions, which are protected from the applications running in the one or more server regions. One control function provided in the control region includes, for example, the processing of security credentials. Most of the state data required to map security and transactional context for an inbound request is managed within the control region.

As one example, control region 3102 includes an ORB 3106, which communicates with clients, such as a client 3108; and is coupled to OTS 3110, RRS 3112 and workload manager 3114.

A server region 3104 is an address space that is used to execute non-privileged application code. It is the home for one or more containers 3116; one or more business objects 3118; and one or more data objects 3120, which communicate with at least one resource manager 3121. Additionally, server region 3104 includes an ORB 3122, which communicates with ORB 3106 of the control region, and is coupled to OTS 3124, RRS 3126 and workload manager 3128. This is where application processing takes place. A server region can be replicated to provide workload balancing.

Although ORB 3106 and 3122 are shown separately, they are logically one ORB, since they are located within the same server instance. Similarly, OTS 3110 and OTS 3124 are logically the same, as well as RRS 3112 and RRS 3126; and WLM 3114 and WLM 3128.

The separation of privileged and non-privileged functions into separate address spaces within a server instance provides integrity and isolation, not provided by the conventional single address space server instance. In particular, in a single address space structure containing both a runtime component and an execution space for business applications, the levels of integrity and isolation required by enterprise class applications are not provided. In such an execution space, it is not unusual for errant or misbehaved application code to modify the state of the runtime in such a way as to cause either integrity exposures or failure of the server. Examples of critical runtime state include shared dispatch queues, security contexts, transactional contexts, workload management contexts, and other runtime state required for the management and execution of the application server. In the case of handling security contexts, the problem of exposing security related data in the same domain in which the application is running, where the possibility of modification of the state data exists, represents a significant security exposure in the system.

Further, typical single process server structures allow the scheduling of multiple users executing under multiple transactions to be dispatched into the same virtual memory space on multiple threads of execution. This approach results in an environment where an application running under one transaction can affect the state of an application running under a different transaction, thereby violating the transactional principle of isolation.

However, in accordance with one aspect of the present invention, a server instance can be configured with one of two dispatching policies. The first, allows a given backend server region to accept multiple client requests, running in multiple transactional units of work, one on each thread of execution within the multi-threaded server region. This policy is referred to as "CICS like", since it most closely represents the type of dispatching performed within the CICS system. With this type of dispatching policy, no transaction application to application isolation is provided, since more than one transaction may be running within the server region address space at the same time.

The second option for dispatching policy restricts the scheduling of work to any given server region so that at any given point in time, there is at most one user, running in one transactional unit of work within the server region. This policy option is referred to as "IMS like" scheduling. This second option, although more consuming of physical address spaces, offers the desired transactional isolation and integrity.

Another flaw with single address space server instances is poor transaction recovery time. If the distributed application server provides the capability of managing work under a transactional unit of recovery, then the server is also obligated to provide well known recovery actions in the case of failure. One of the pieces of recovery after server failure is the re-establishment of the distributed communication channels that were in operation at the time of failure. This recovery action is used to determine whether or not any further recovery action is necessary or desired. In addition, the transaction log which provides information regarding the state of the transaction in the server at time of failure is read. This log is typically tied to the server address space that failed. This means that each and every address space is to be restarted, replay its transaction log, and then determine whether further action is required. As the number of server address spaces increase in the system, restart time becomes an inhibitor to the efficient and responsive recovery of the system.

However, in accordance with the server structure of this aspect of the present invention, the recoverable resources reside either in backend resource managers such as DB2, or in the control region. There are no resources in the server region that need to participate in transactional recovery. This means that the server regions do not have to be restarted and participate in recovery after a system failure. Since the recoverable object-oriented resources are associated with the control region, only the control region needs to be restarted after a failure, significantly improving restart time and scalability.

In many systems, such as the MVS system offered by International Business Machines Corporation, (Armonk, N.Y.), workload management decisions with respect to dispatching priority, memory management, I/O priority queue management, etc. are performed at the address space level. The address space is a convenient home under which these resources can be managed at the appropriate granularity. If a single address space is used to service work under a multiple and diverse set of performance classes, then an undesirable averaging of the workload management policies may result, since workload management is making adjustments at the address space level for all of the work running in that address space. Thus, in accordance with one aspect of the present invention, multiple workload management queues 3130 are used by workload manager 3114 to balance the workload of the server regions. For example, the workload manager may group work with similar performance goals on each of the queues and cause the dispatch of that work into a given server region or regions. In particular, when a server region is able to accept work, the ORB of that region pulls a piece of work from its respective queue into the region to be processed.

With the above approach, the workload manager effectively partitions different classes of work across different physical address spaces, so that the undesirable averaging of performance goal management does not occur, as in a single address space system. Further, with the above approach, the workload manager can dynamically expand and/or contract the number of server regions based on workload management criteria, such as those listed above.

In the above described implementation of a server instance, if a business object of one of the regions wants to communicate with a business object of another server instance, the business object flows an outbound object request, which proceeds from ORB 3122 to ORB 3106 across a link. In one example, the link is based on OS/390 cross-memory facilities described in detail in "Enterprise Systems Architecture/390 Principles of Operation," IBM Publication No. SA22-7201-05 (September 1998), which is hereby incorporated herein by reference in its entirety. ORB 3106 then communicates with the target server.

Described in detail above are aspects of the present invention, which provide an object-oriented computing environment that is reliable, secure, transactional and workload managed.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of resolving names of objects of a computing environment, said method comprising:

identifying a disjunction in an object name to be resolved, wherein said disjunction indicates at least two portions of said object name that are resolved differently;

obtaining an object associated with said disjunction; and performing a resolve operation on said object using at least a portion of said object name.

2. The method of claim 1, wherein said disjunction represents at least one of a foreign binding and an alias name of said object.

3. The method of claim 1, wherein said identifying comprises performing a search on a portion of said object name, wherein a finding of said portion indicates said disjunction.

4. The method of claim 3, wherein said performing comprises obtaining said portion of said object name, and wherein said obtaining comprises removing one or more components of said object name to obtain said portion.

5. The method of claim 1, wherein said resolve operation is insulated from mechanics of a directory supporting said resolve operation.

6. The method of claim 1, further comprising creating said disjunction, prior to identifying.

7. The method of claim 6, wherein said creating comprises:

resolving a given name to determine a target naming context to which a binding object associated with said disjunction is to be bound;

creating a key for said binding object;

creating said binding object using said key;

setting a binding type attribute of said binding object to indicate a disjunct binding; and setting a bound object attribute to said object.

8. The method of claim 1, wherein said obtaining comprises retrieving data for said object using a single call to a resource manager of said data.

9. The method of claim 1, wherein said resolve operation is performed on one system of said computing environment and said identifying said disjunction is performed on another system of said computing environment.

10. The method of claim 9, wherein said one system comprises a different implementation of a CORBA architecture than said another system.

11. A system of resolving names of objects of a computing environments, said system comprising:

means for identifying a disjunction in an object name to be resolved, wherein said disjunction indicates at least two portions of said object name that are resolved differently;

means for identifying a disjunction in an object associated with said disjunction; and means for performing a resolve operation on said object using at least a portion of said object name.

12. The system of claim 11, wherein said disjunction represents at least one of a foreign binding and an alias name of said object.

13. The system of claim 11, wherein said means for identifying comprises means for performing a search on a portion of said object name, wherein a finding of said portion indicates said disjunction.

14. The system of claim 13, wherein said means for performing comprises means for obtaining said portion of said object name, and wherein said means for obtaining comprises means for removing one or more components of said object name to obtain said portion.

15. The system of claim 11, wherein said resolve operation is insulated from mechanics of a directory supporting said resolve operation.

16. The system of claim 11, further comprising means for creating said disjunction, prior to identifying.

17. The system of claim 16, wherein said means for creating comprises:

means for resolving a given name to determine a target naming context to which a binding object associated with said disjunction is to be bound;

means for creating a key for said binding object;

means for creating said binding object using said key;

means for setting a binding type attribute of said binding object to indicate a disjunct binding; and means for setting a bound object attribute to said object.

18. The system of claim 11, wherein said means for obtaining comprises means for retrieving data for said object using a single call to a resource manager of said data.

19. The system of claim 11, wherein said means for resolving comprises one system of said computing environment and said means for identifying said disjunction comprises another system of said computing environment.

20. The system of claim 19, wherein said one system comprises a different implementation of a CORBA architecture than said another system.

21. A system of resolving names of objects of a computing environment, said system comprising:

at least one computing system of said computing environment adapted to identify a disjunction in an object name to be resolved, wherein said disjunction indicates at least two portions of said object name that are resolved differently, to obtain an object associated with said disjunction, and to perform a resolve operation on said object using at least a portion of said object name.

22. The system of claim 21, wherein said resolve operation is performed on one system of said at least one computing system and the identifying is performed on another system of said at least one computing system.

23. The system of claim 22, wherein said one system comprises a different implementation of a CORBA architecture than said another system.

24. An article of manufacture comprising:

at least one computer usable medium having computer readable program code means embodied therein for causing the resolving of names of objects of a computing environment, the computer readable program code means in said article of manufacture comprising:

computer readable program code means for causing a computer to identify a disjunction in an object name to be resolved, wherein said disjunction indicates at least two portions of said object name that are resolved differently;

computer readable program code means for causing a computer to obtain an object associated with said disjunction; and computer readable program code means for causing a computer to perform a resolve operation on said object using at least a portion on said object name.

25. The article of manufacture of claim 24, wherein said disjunction represents at least one of a foreign binding and an alias name of said object.

26. The article of manufacture of claim 24, wherein said computer readable program code means for causing a computer to identify comprises computer readable program code means for causing a computer to perform a search on a portion of said object name, wherein a finding of said portion indicates said disjunction.

27. The article of manufacture of claim 26, wherein said computer readable program code means for causing a computer to perform comprises computer readable program code means for causing a computer to obtain said portion of said object name, and wherein said computer readable program code means for causing a computer to obtain comprises computer readable program code means for causing a computer to remove one or more components of said object name to obtain said portion.

28. The article of manufacture of claim 24, wherein said resolve operation is insulated from mechanics of a directory supporting said resolve operation.

29. The article of manufacture of claim 24, further comprising computer readable program code means for causing a computer to create said disjunction, prior to identifying.

30. The article of manufacture of claim 29, wherein said computer readable program code means for causing a computer to create comprises:

computer readable program code means for causing a computer to resolve a given name to determine a target naming context to which a binding object associated with said disjunction is to be bound;

computer readable program code means for causing a computer to create a key for said binding object;

computer readable program code means for causing a computer to create said binding object using said key;

computer readable program code means for causing a computer to set a binding type attribute of said binding object to indicate a disjunct binding; and computer readable program code means for causing a computer to set a bound object attribute to said object.

31. The article of manufacture of claim 24, wherein said computer readable program code means for causing a computer to obtain comprises computer readable program code means for causing a computer to retrieve data for said object using a single call to a resource manager of said data.

32. The article of manufacture of claim 24, wherein said resolve operation is performed on one system of said computing environment and the identifying said disjunction is performed on another system of said computing environment.

33. The article of manufacture of claim 32, wherein said one system comprises a different implementation of a CORBA architecture than said another system.

* * * * *

UNITED STATES PATENT AND TRADEMARK OFFICE
CERTIFICATE OF CORRECTION

PATENT NO.    : 6,505,210 B1                                     Page 1 of 1
DATED         : January 7, 2003
INVENTOR(S)   : Frey et al.

It is certified that error appears in the above-identified patent and that said Letters Patent is hereby corrected as shown below:

<u>Column 45,</u>
Lines 1 and 2, delete "means for identifying a disjunction in an object associated with said disjunction; and" and insert -- means for obtaining an object associated with said disjunction; and --

Signed and Sealed this

Tenth Day of June, 2003

JAMES E. ROGAN
*Director of the United States Patent and Trademark Office*